United States Patent [19]

Li et al.

[11] Patent Number: 5,583,792

[45] Date of Patent: Dec. 10, 1996

[54] METHOD AND APPARATUS FOR INTEGRATION OF TRAFFIC MEASUREMENT AND QUEUEING PERFORMANCE EVALUATION IN A NETWORK SYSTEM

[75] Inventors: San-Qi Li, 5504 Cedro Trail, Austin, Tex. 78731; Chia-Lin Hwang, Austin, Tex.

[73] Assignee: San-Qi Li, Austin, Tex.

[21] Appl. No.: 251,742

[22] Filed: May 27, 1994

[51] Int. Cl.$^6$ .................................................. H04B 3/40
[52] U.S. Cl. ................... 364/514 C; 370/232; 370/253; 340/907
[58] Field of Search ........................ 364/514 A, 514 B, 364/514 C, 514 R; 370/17; 340/907

[56] References Cited

U.S. PATENT DOCUMENTS

| | | | |
|---|---|---|---|
| 5,274,625 | 12/1993 | Derby et al. | 370/17 |
| 5,343,465 | 8/1994 | Khalil | 370/17 |

OTHER PUBLICATIONS

S. Q. Li and C. Hwang, "Queue Response to Input Correlation Functions: Discrete Spectral Analysis," IEEE/ACM Trans. Networking, vol. 1, No. 5, Oct. 1993, pp. 522–533.

S. Q. Li and C. Hwang, "Queue Response to Input Correlation Functions: Continuous Spectral Analysis," IEEE/ACM Trans. Networking, vol. 1, No. 6, Dec. 1993, pp. 678–692.

H. D. Sheng and S. Q. Li, "Spectral Analysis of Packet Loss Rate at Statistic Multiplexer for Multimedia Services," IEEE Globecom '92, Dec. 1992, pp. 1524–1532.

H. D. Sheng and S. Q. Li, "Second Order Effect of Binary Sources on Characteristics of Queue and Loss Rate," Proc. IEEE Infocom '93, Apr. 1993, pp. 18–27.

J. Ye and S. Q. Li, "Folding Algorithm: A Computational Method for Finte QBD Processes with Level–Dependent Transitions" IEEE Trans. Commu., vol. 42, No. 2, Feb. 1994, pp. 625–639.

S. Q. Li, S. Chong, C. Hwang and X. Zhao, "Link Capacity Allocation and Network Control by Filtered Input Rate in High Speed Networks," proc. IEEE Globecom '93, pp. 744–750.

S. Chong, S. Q. Li and J. Ghosh, "ANN Based Forecasting of VBR Video Traffic for Dynamic Bandwidth Allocation in ATM Networks," Proc. of Artificial Neural Networks in Engineering (ANNIE '93), Nov. 14–17, 1993.

S. Q. Li and S. Chong, "Fundamental Limits of Input Rate Control in High Speed Network," Proc. IEEE Infocom '93, Apr. 1993, pp. 662–671.

K. Sriram and W. Whitt, "Characterizing Superposition Arrival Processes in Packet Multiplexes for Voice and Data," IEEE Selected Areas in Commu. vol. SAC–4, No. 6, Sep. 1986, pp. 833–846.

(List continued on next page.)

*Primary Examiner*—Ellis B. Ramirez
*Assistant Examiner*—Patrick J. Assouad
*Attorney, Agent, or Firm*—Jeffrey C. Hood; Conley, Rose & Tayon

[57] ABSTRACT

A method and apparatus which provides a general solution technique for the integration of traffic measurement and queueing analysis. The frequency-domain approach is used to combine the advanced techniques in two areas: signal processing and queueing analysis. The tool comprises three basic components: traffic measurement, statistical matching and queueing analysis. In the traffic measurement component, standard signal processing techniques are used to obtain the steady-state and second-order statistics of a traffic stream. In the statistical matching component, new techniques are used for the construction of a special class of Markov chain modulated rate processes, the so-called circulant modulated rate process, that can statistically match with each given traffic stream (or superposition of different traffic streams). In the queueing analysis component, both steady state and time dependent solutions of buffer size, link capacity, loss rate, overload control and queuing behavior are obtained by the generalized Folding-algorithm. Comprehensive numerical examples show the great potential of the present invention to solve measurement-based traffic management issues.

32 Claims, 31 Drawing Sheets

SMAQ diagram.

OTHER PUBLICATIONS

H. Heffes and D. M. Lucantoni, "A Markov Modulated Characterization of Packetized Voice and Data Traffic and Related Statistical Multiplexer Performance," IEEE Selected Areas in Commu., vol. SAC-4, No. 6, Sep. 1986, pp. 855-868.

W. E. Leland, M. Taggu, W. Willinger, D. V. Wilson, "On the Self-Similar Nature of Ethernet Traffic," Proc. SIG-COM'93, 1993, San Francisco, California, pp. 183-193.

D. L. Jagerman and B. Melamed, "The Transition and Autocorrelation Structure of TES Processes; Part I: General Theory," Stochastic Models, vol. 8, No. 2, 1992, pp. 193-219.

D. L. Jagerman and B. Melamed, "The Transition and Autocorrelation Structure of TES Processes; Part II: Sspecial Cases," Stochastic Models, vol. 8, No. 3, 1992, pp. 499-527.

D. Anick, D. Mitra and M. M. Sondhi, "Stochastic Theory of Data-Handling Systems with Multiple Sources," Bell System Techniccal Journal, vol. 61, No. 8, Oct. 1982, pp. 1871-1893.

K. W. Fendick, V. R. Saksena, and W. W. Whitt, "Investigating Dependence in Packet Queues with the Index of Dispersion for Work," IEEE Trans. Commu., vol. 39, No. 8, Aug. 1991, pp. 1231-1244.

A. I. Elwalid and D. Mitra, "Effective Bandwidth of General Markovian Traffic Sources and Admission Control of High Speed Networks," IEEE/ACM Trans. Networking, vol. 1, No. 3, Jun. 1993, pp. 329-343.

Anwar I. Elwalid, "Markov-Modulated Rate Processes for Modeling, Analysis and Control of Communication Networks".

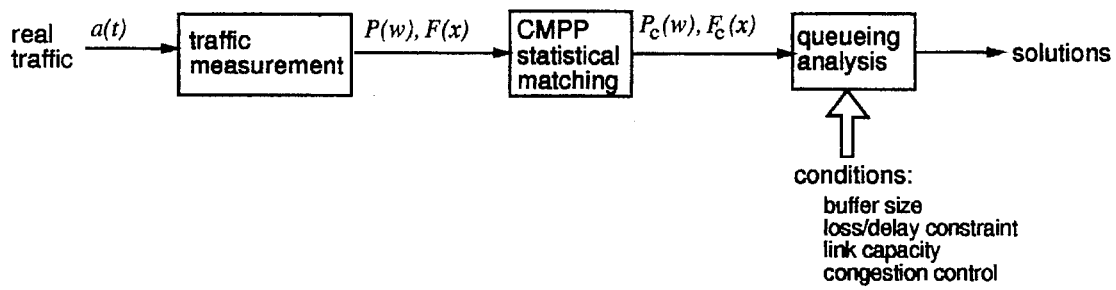
Figure 1: SMAQ diagram.
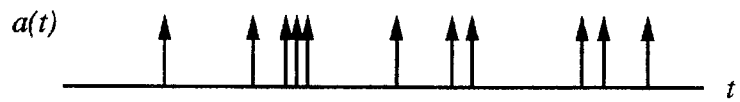
Figure 2: A generic traffic stream described by a train of impulses.
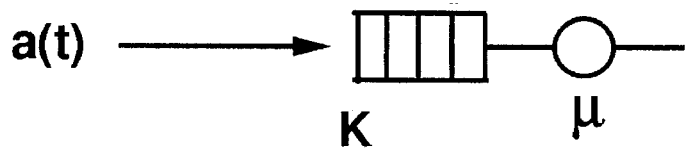
Figure 3: A single node system.
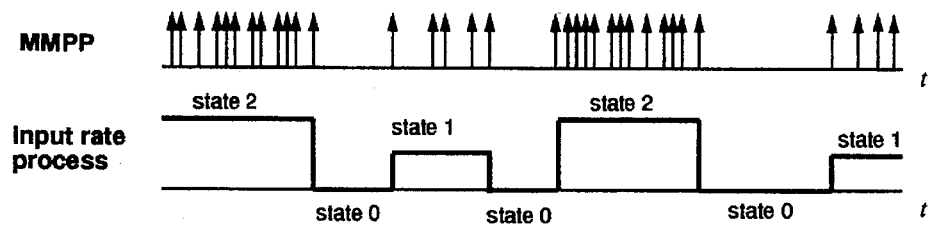
Figure 4: A three-state MMPP and input rate process.

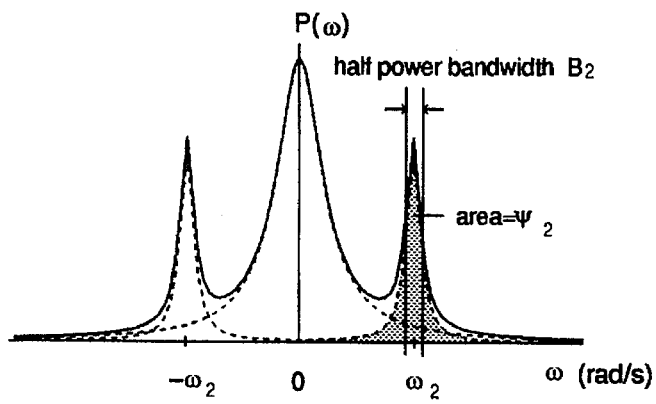
Figure 5: An example of input power spectrum.
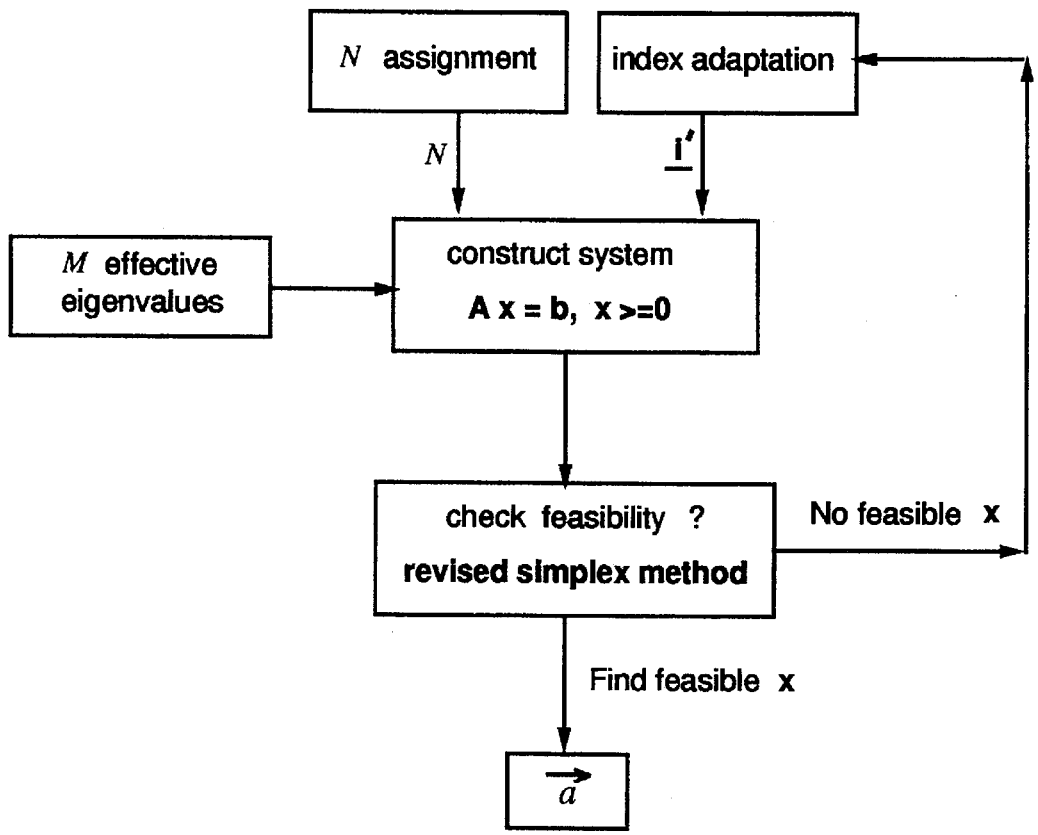
Figure 6: Construction of circulant from eigenvalues

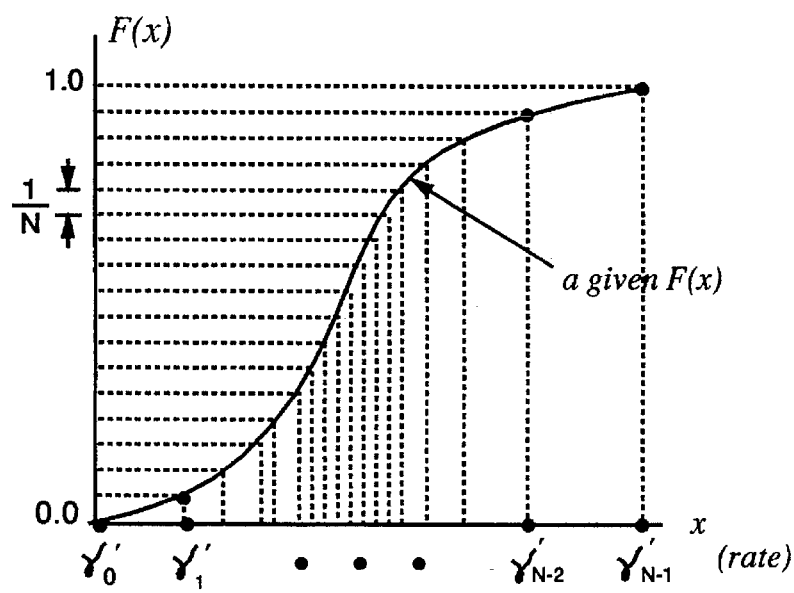
Figure 7: Partitioning $F(x)$ into a set of equal-probability rates.
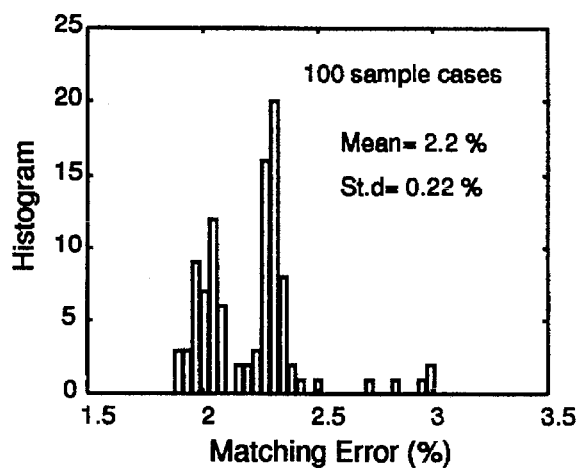
Figure 8: Histogram of matching errors with 100 randomly selected starting points.

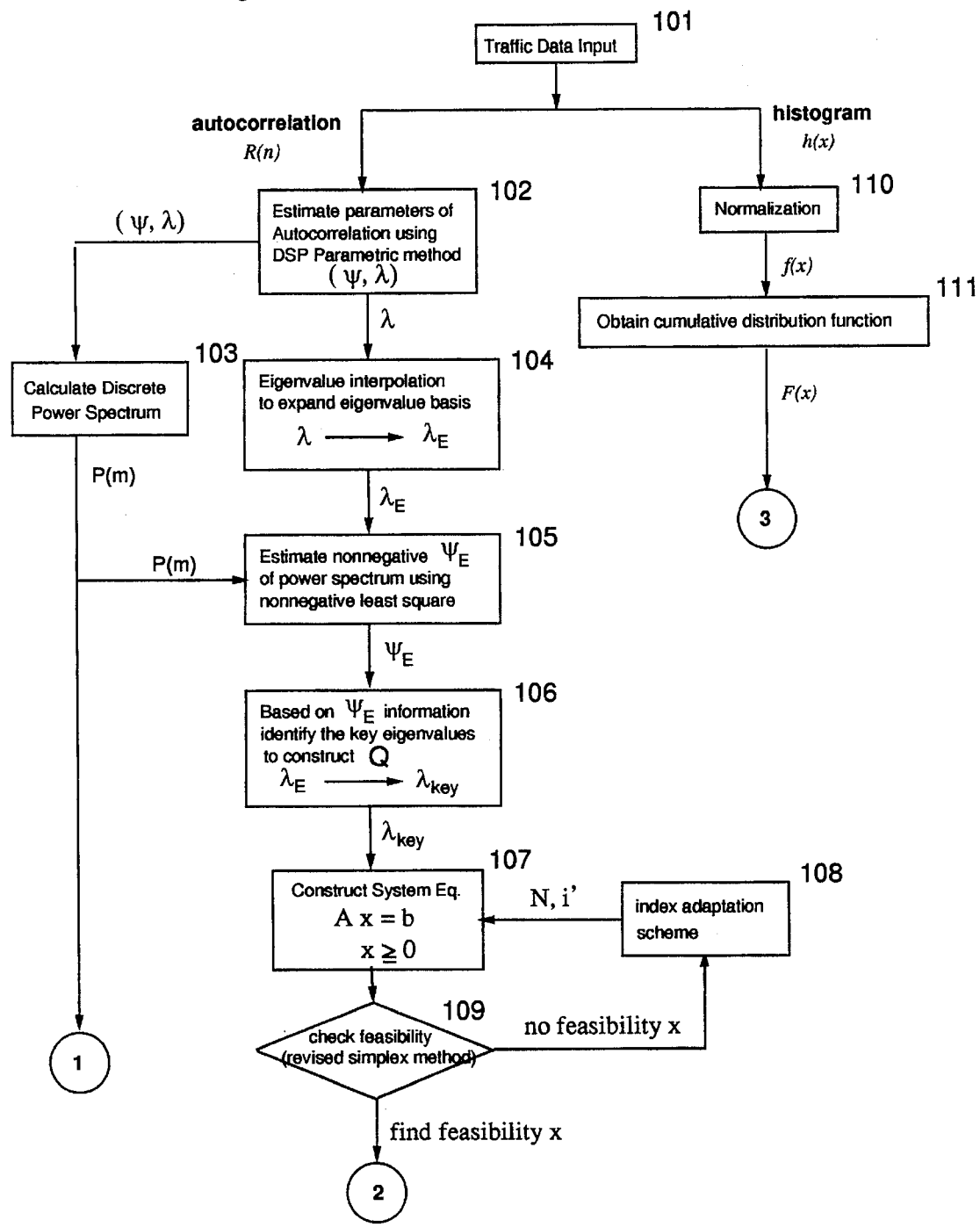
Figure 9: Software architecture of the traffic statistical matching algorithm.

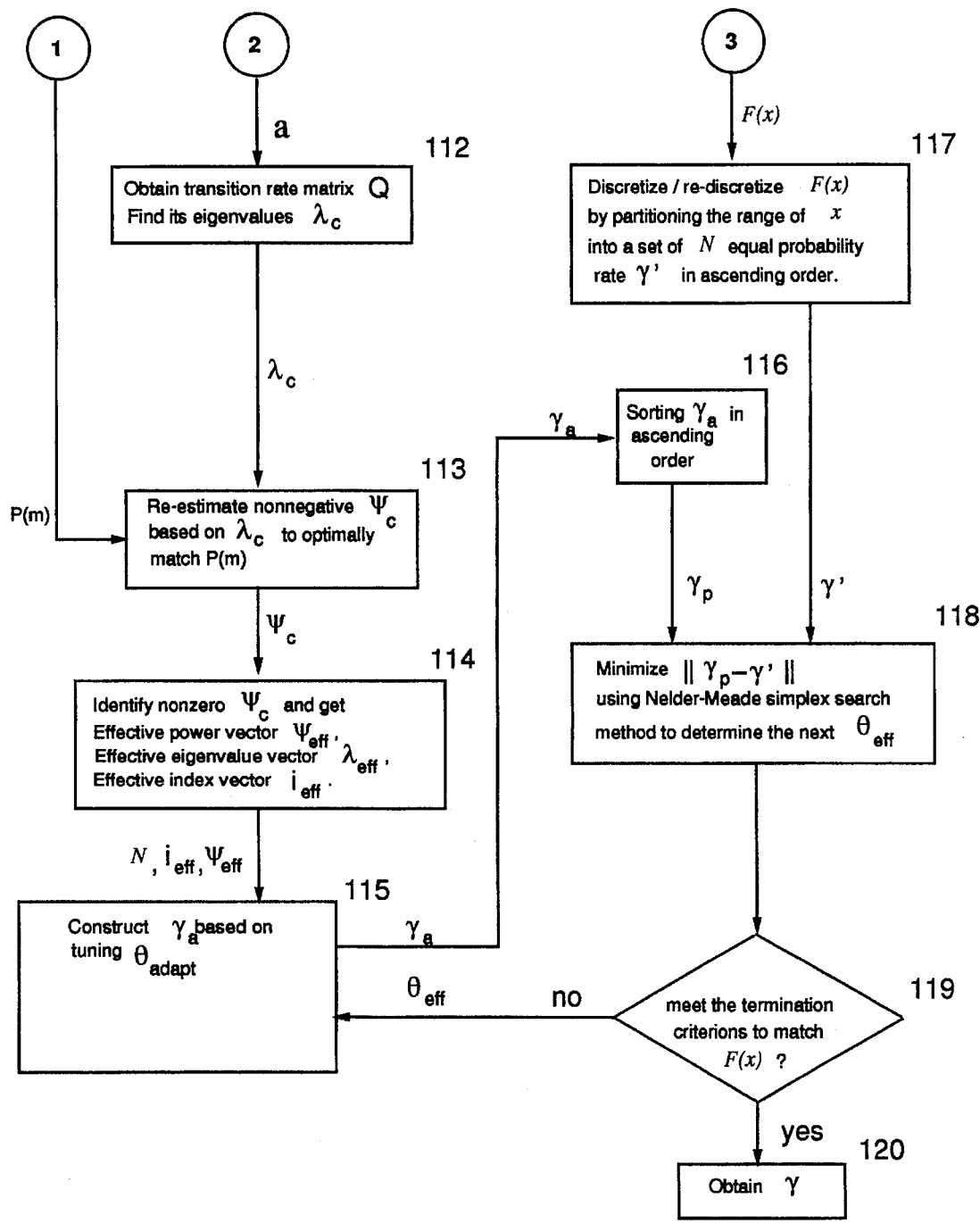
Figure 10: Software architecture of the traffic statistical matching algorithm (continued).

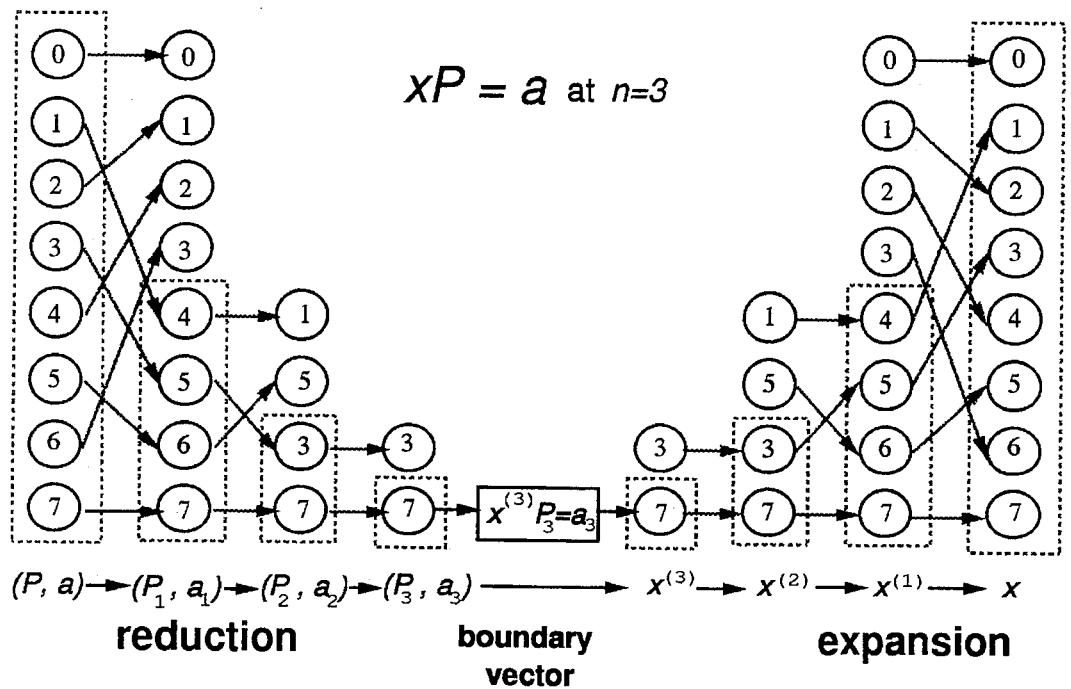
Figure 11: A level-transition diagram of the generalized Folding-algorithm at $n = 3$.

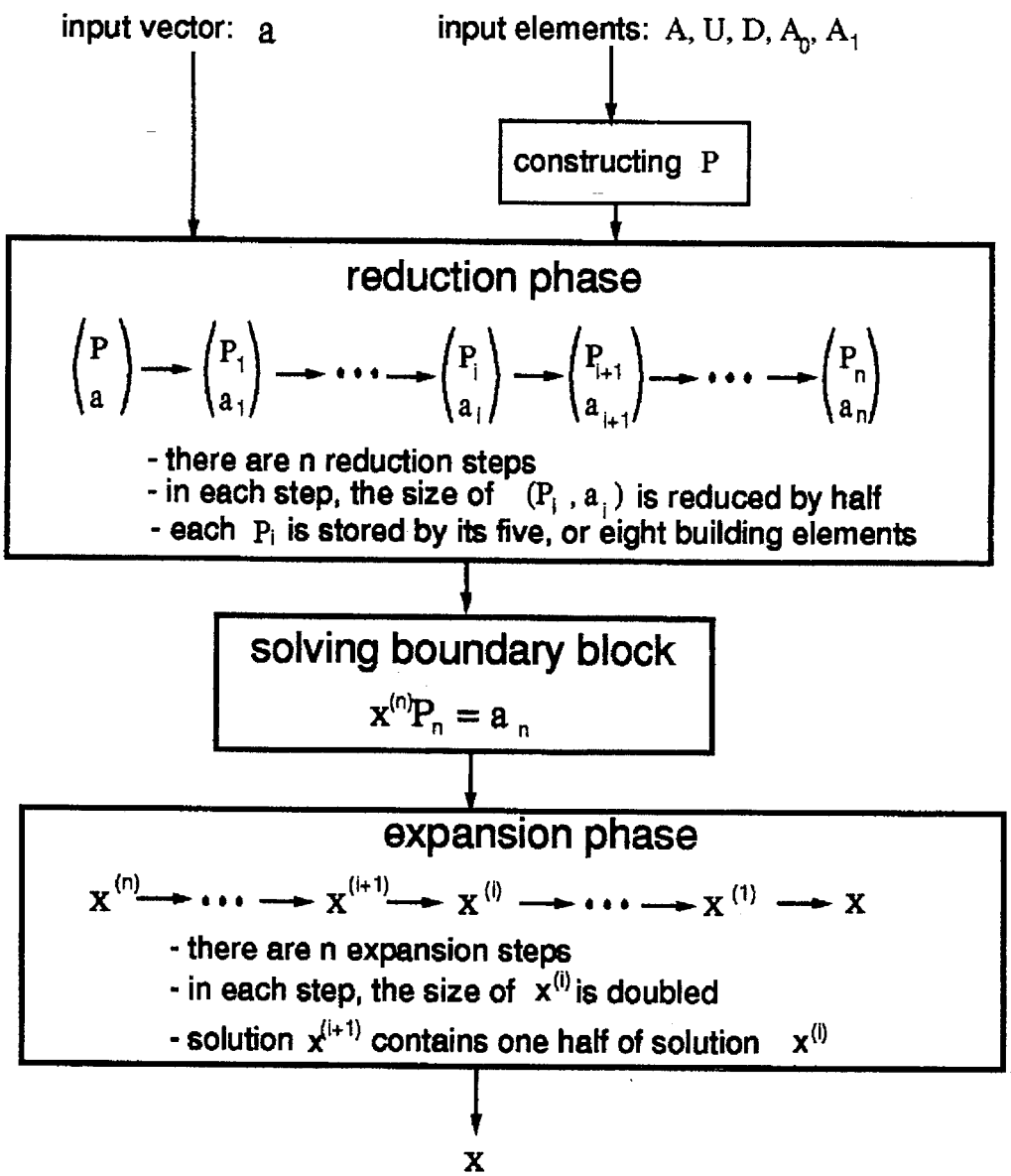
Figure 12: Main flow chart of generalized Folding-algorithm.

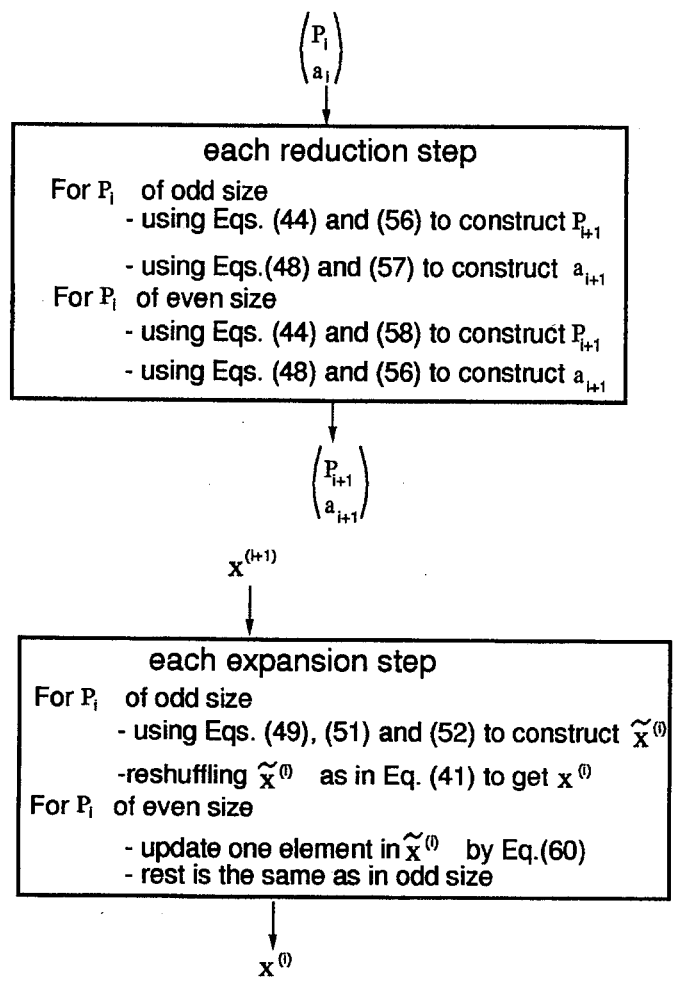
Figure 13: Flow chart for operations in reduction and expansion steps of generalized Folding-algorithm.

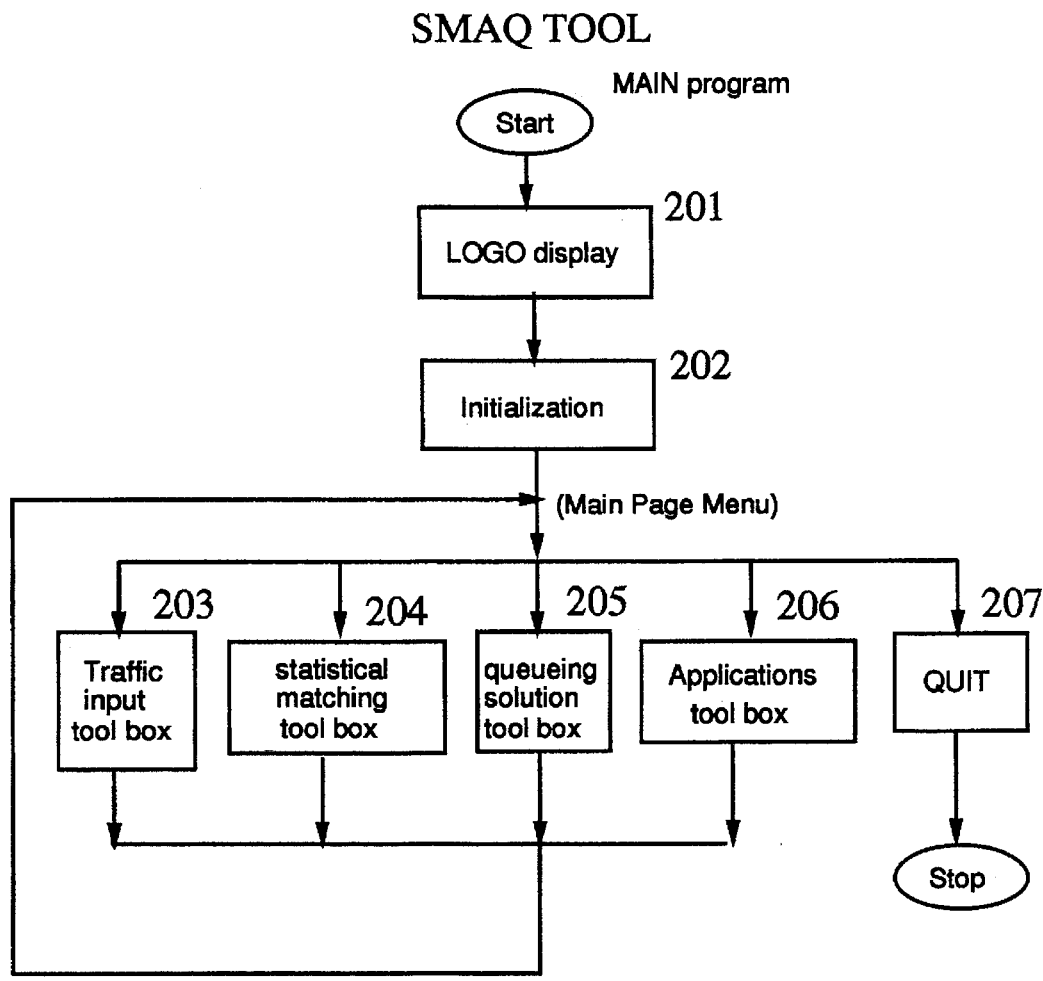
Figure 14: Flow chart of SMAQ main program with four tool boxes.

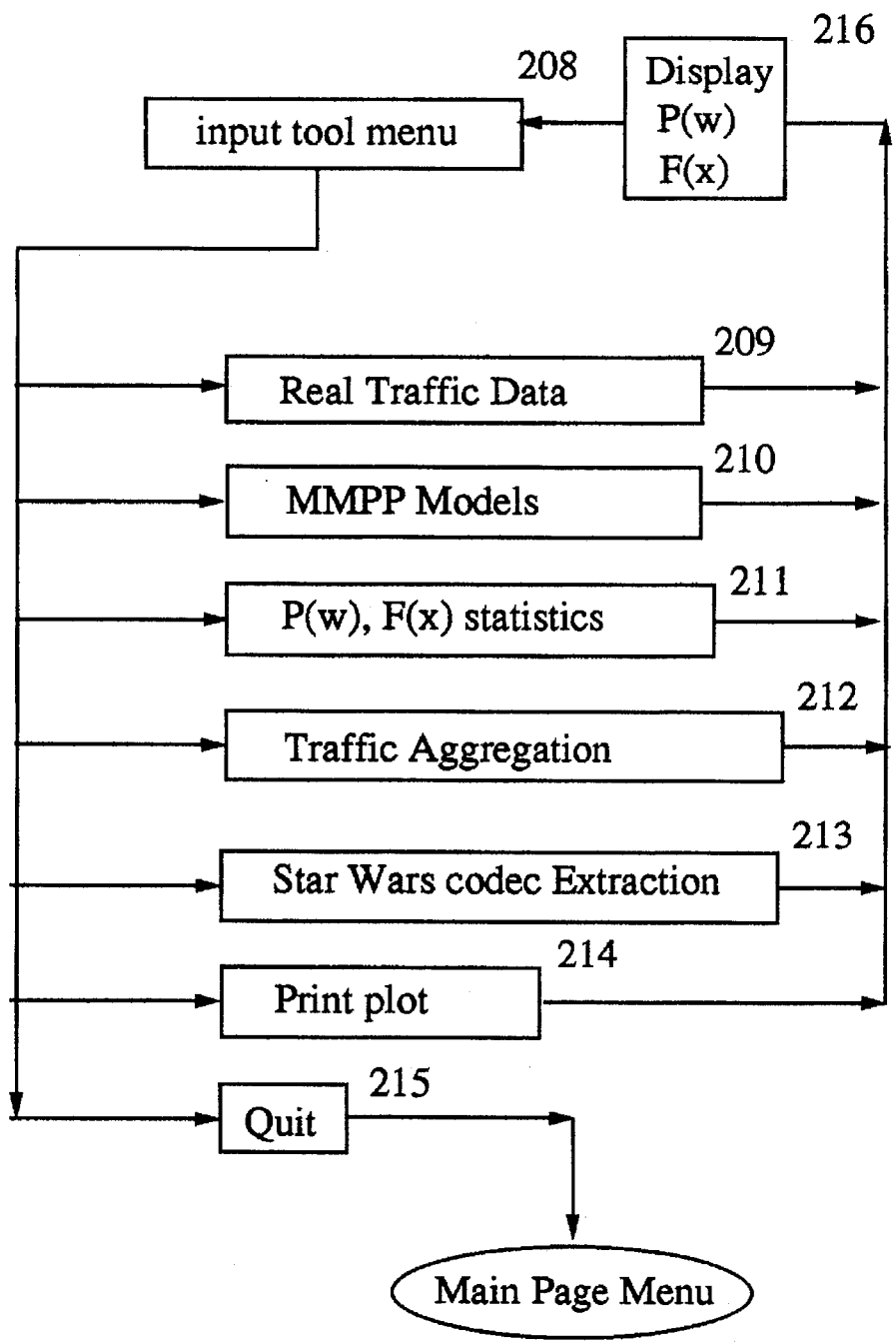
Figure 15: Functional block diagram of the traffic input tool box.

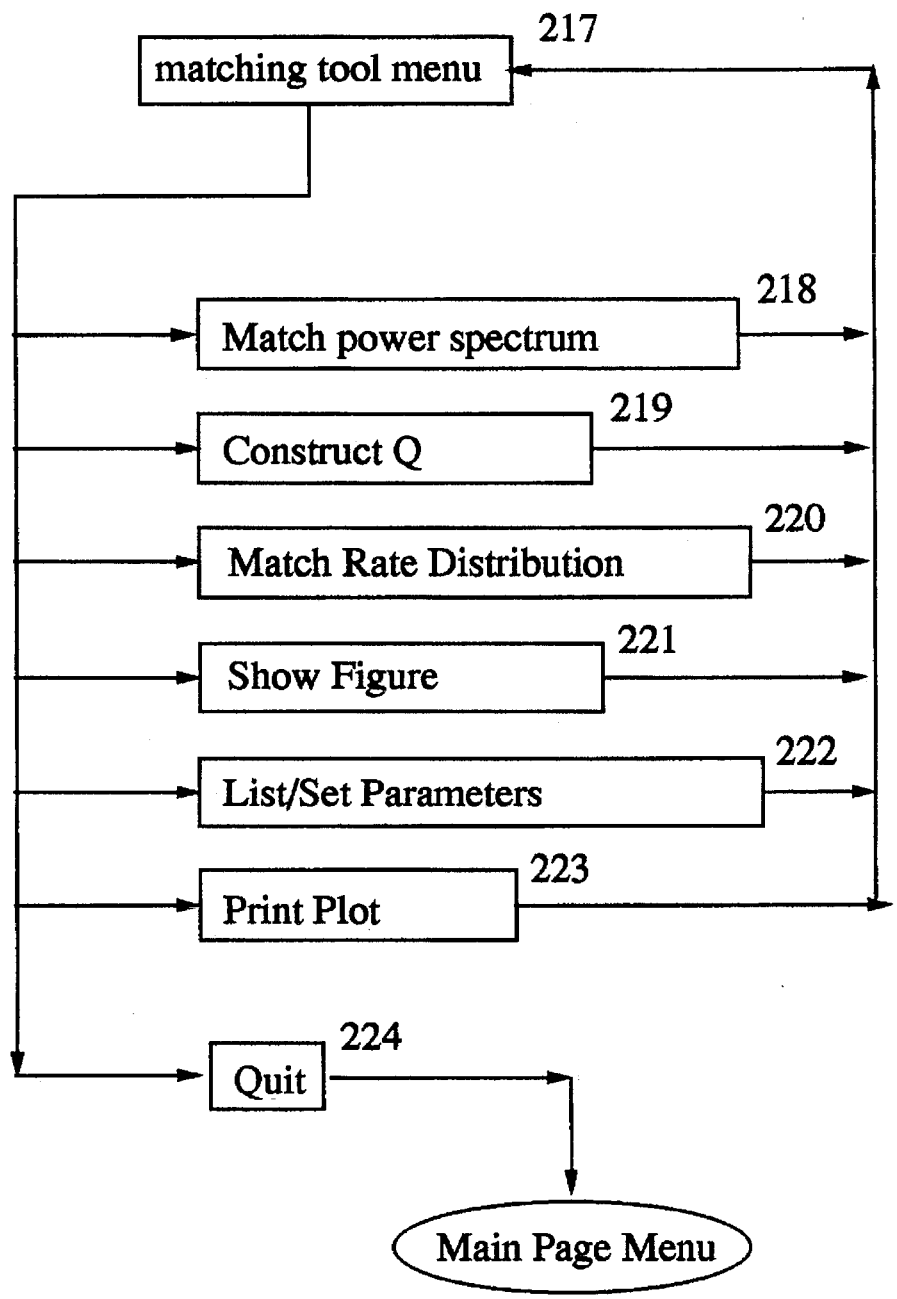
Figure 16: Functional block diagram of the statistical matching tool box.

Functional Block Diagram of Queueing Solution Tool Box
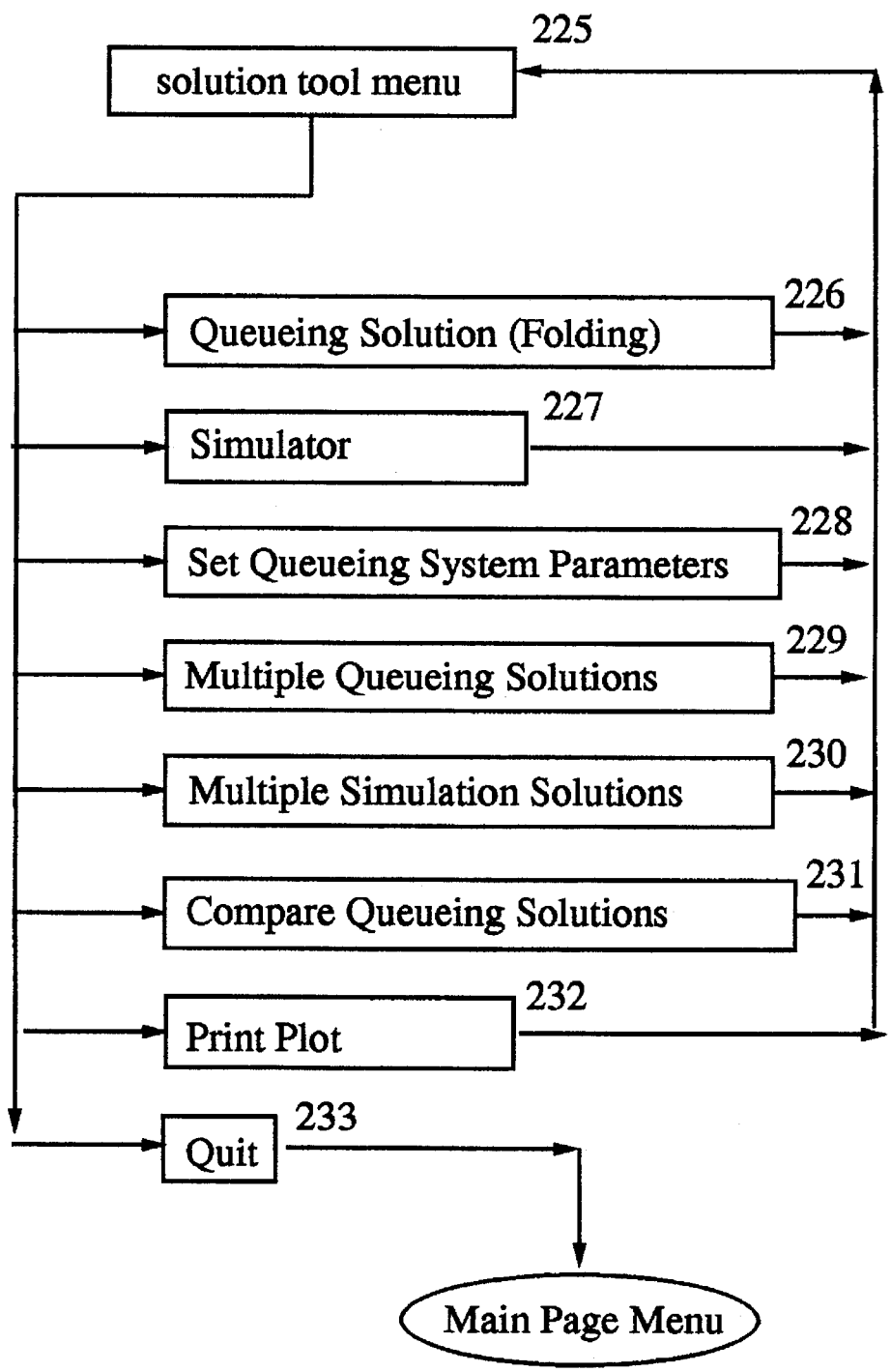
Figure 17: Functional block diagram of the queueing solution tool box.

Functional Block Diagram of Application Tool Box
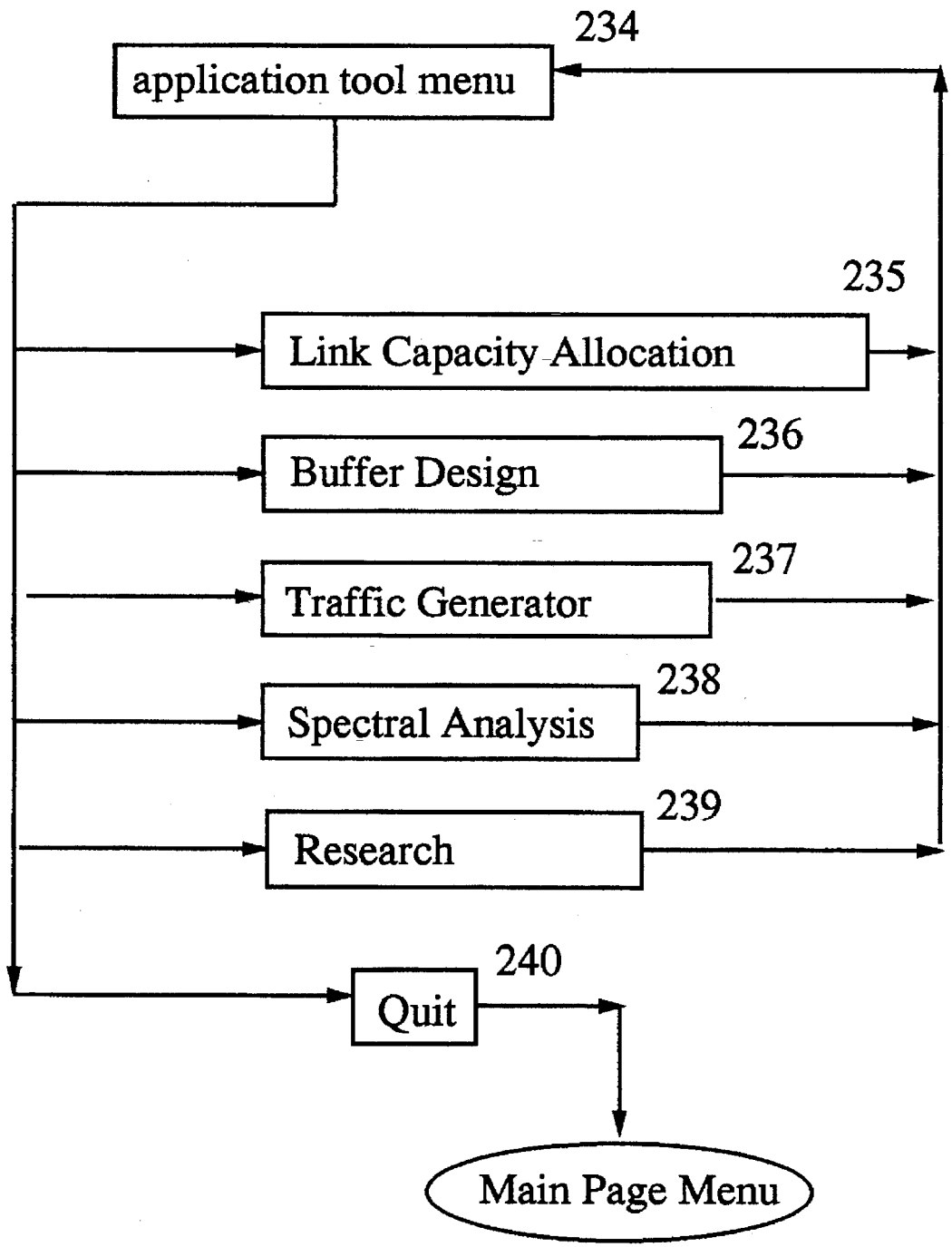
Figure 18: Functional block diagram of the application tool box.

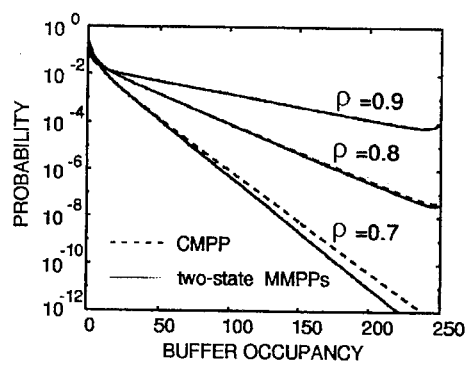
Figure 19: Comparison of queue distributions for superimposed heterogeneous two-state MMPPs and matched CMPP.
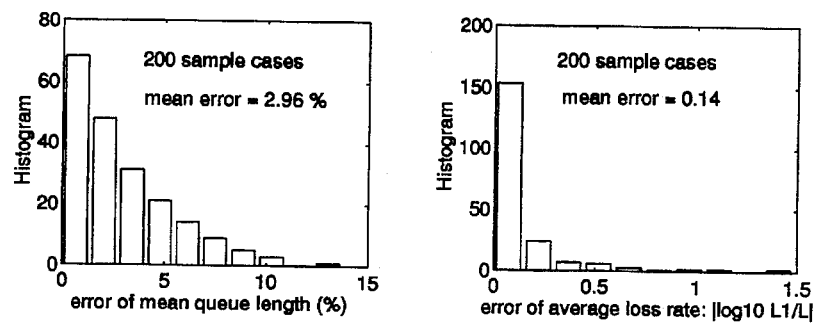
Figure 20: Queueing solution comparison of superimposed two-state MMPPs and matched CMPP: (a) histogram on relative difference of average queue; (b) histogram on logarithmic difference of average loss rate.

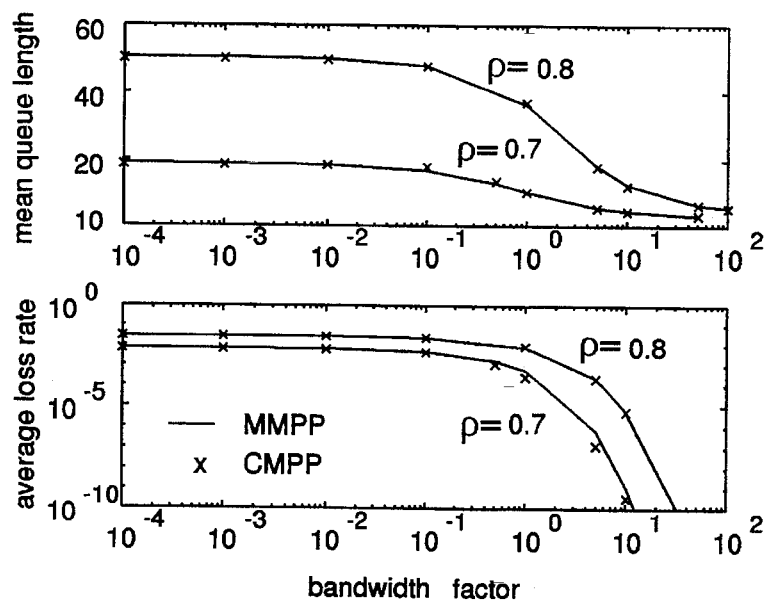
Figure 21: Queueing solution comparison of superimposed two-state MMPPs and matched CMPP as a function of bell-bandwidths.

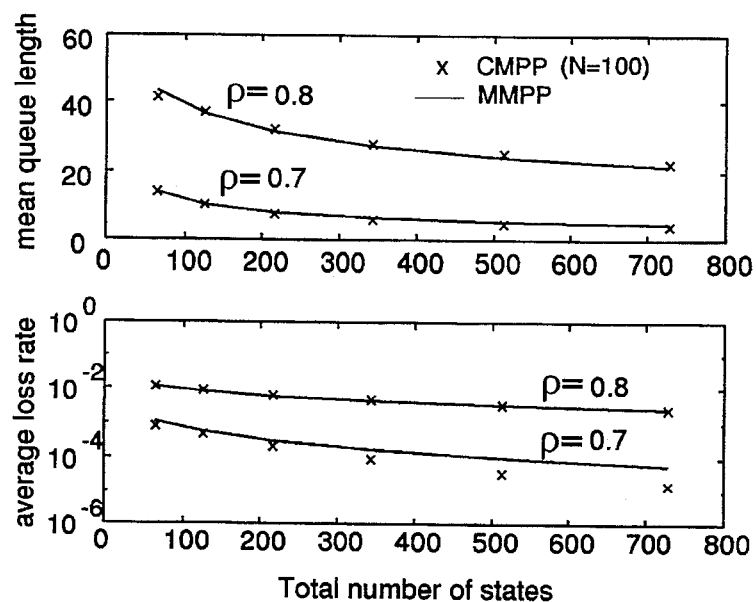
Figure 22: Queueing solution comparison of the superimposed two-state MMPPs and matched CMPP as a function of input state space.

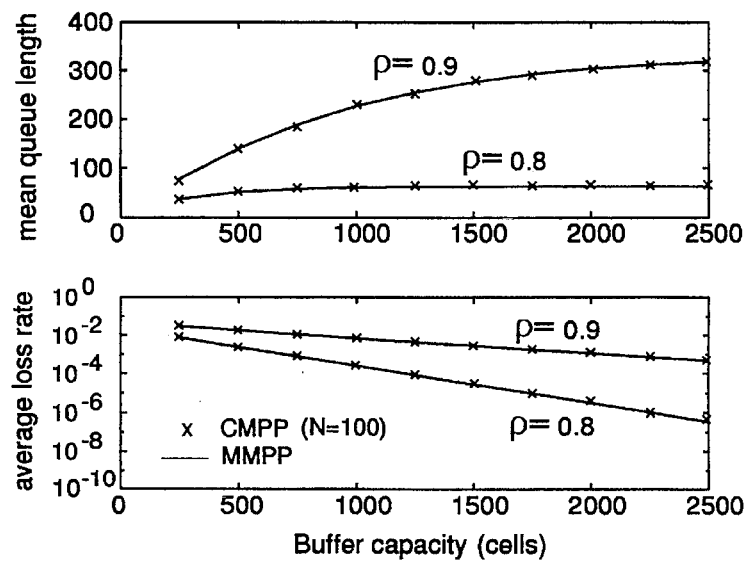
Figure 23: Queueng solution comparison of superimposed two-state MMPPs and matched CMPP as a function of buffer size.
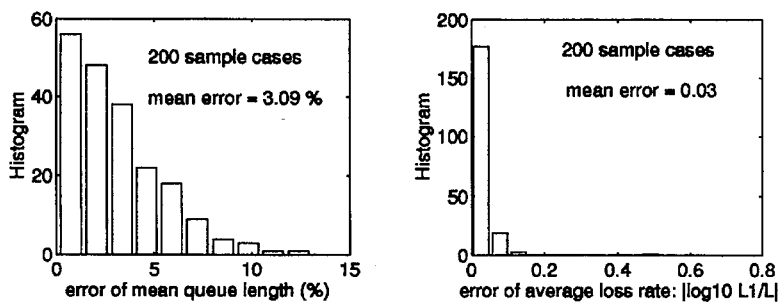
Figure 24: Queueing solution comparison of superimposed three-state MMPPs and matched CMPP: (a) histogram of relative difference of average queue; (b) histogram of logarithmic difference of average loss rate.

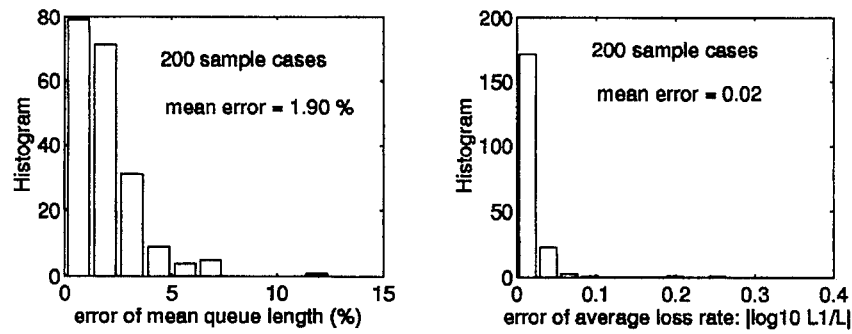

Figure 25: Queueing solution comparison of superimposed four-state MMPPs and matched CMPP: (a) histogram on relative difference of average queue length; (b) histogram of logarithmic difference of average loss rate.

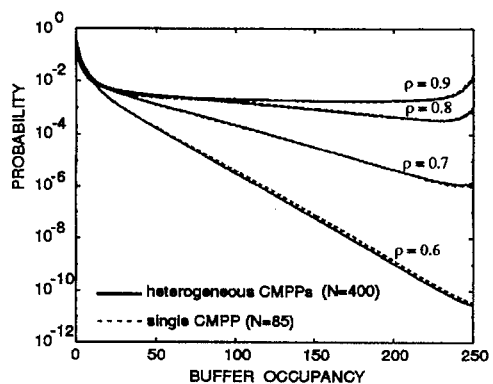

Figure 26: Queue length distribution of superimposed heterogeneous CMPPs and matched CMPP.

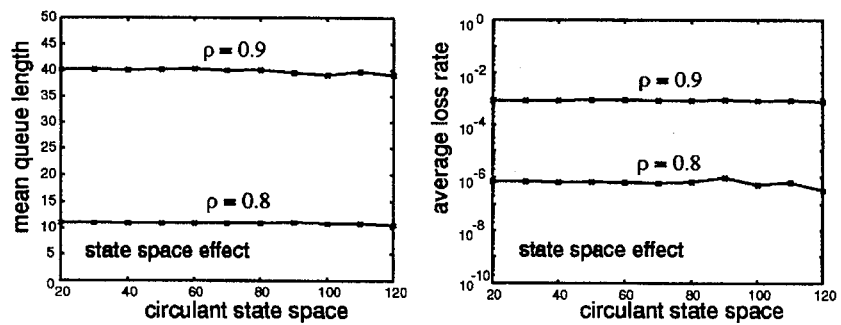

Figure 27: Queueing solution of matched CMPP as a function of input state space $N$

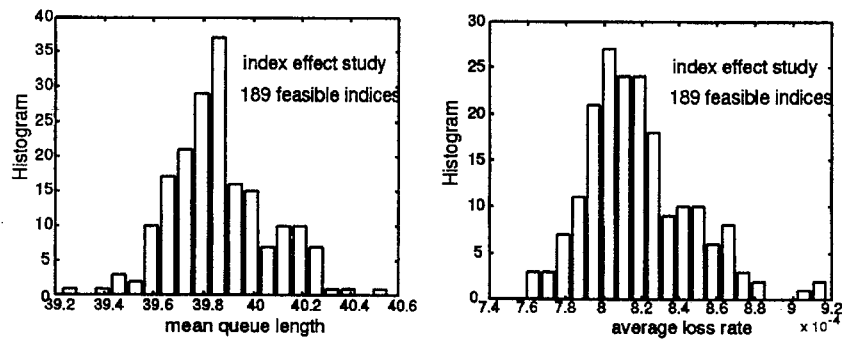
Figure 28: Queueing solution comparison of matched CMPP with different eigenvalue index vector $\underline{i}$'s.
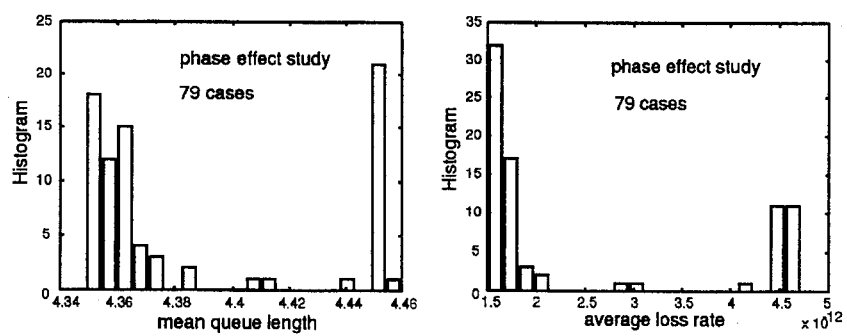
Figure 29: Queueing solution comparison of matched CMPP with different phase vectors.

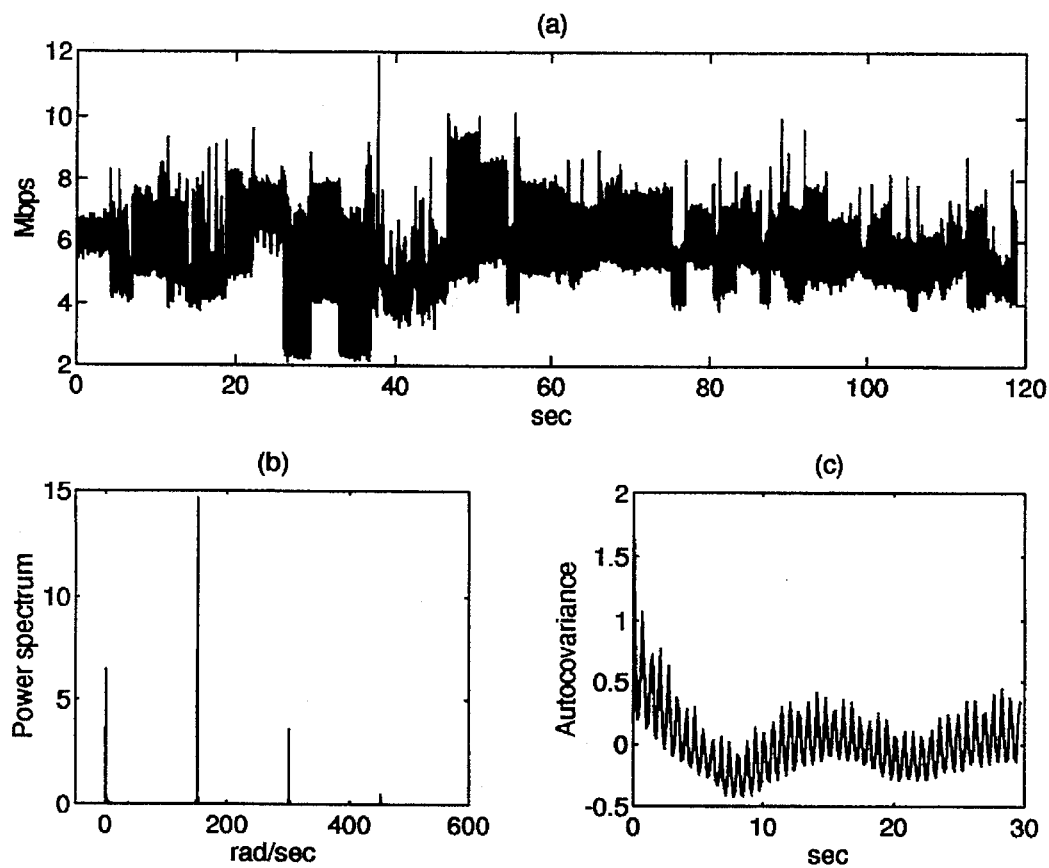
Figure 30: A 2-minute video sequence and its statistics (*Star Wars*, page 15).

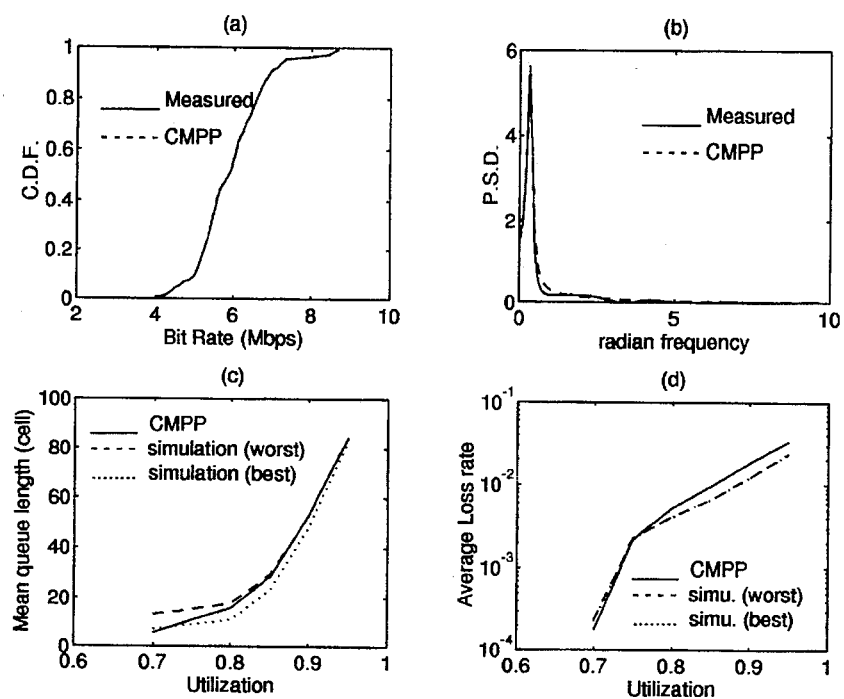
Figure 31: Input modeling and queueing analysis of a 2-minute video sequence (*Star Wars*, page 15).

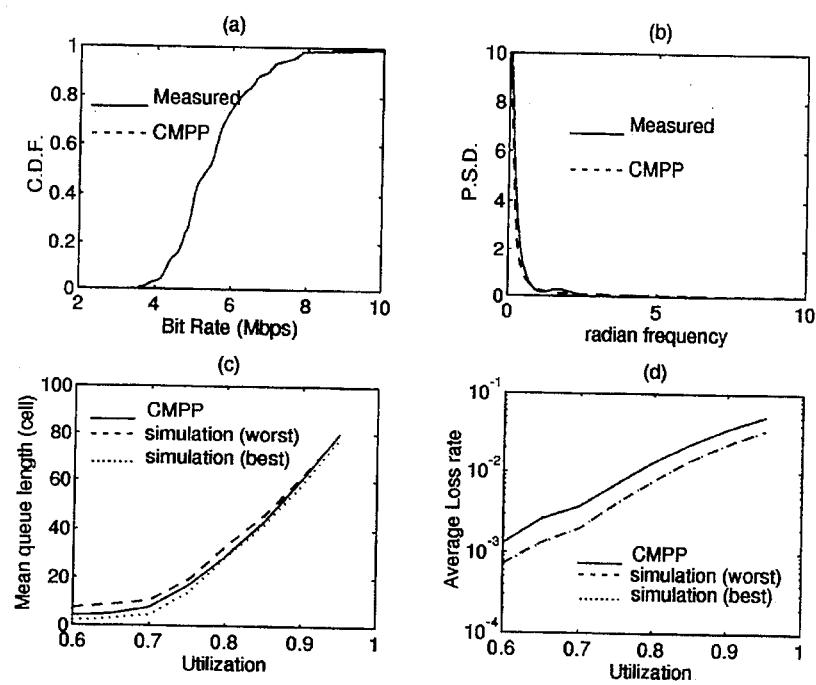
Figure 32: Input modeling and queueing analysis of another 2-minute video sequence (*Star Wars*, page 29).

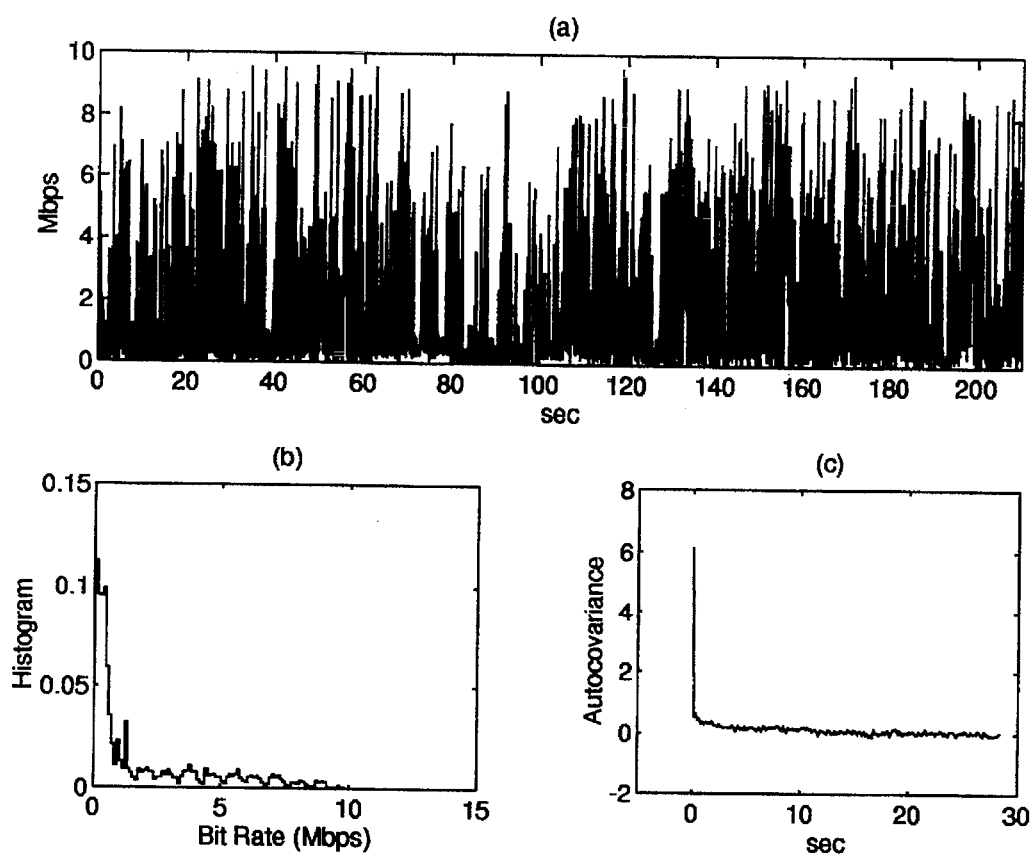
Figure 33: An Ethernet data stream and its statistics.

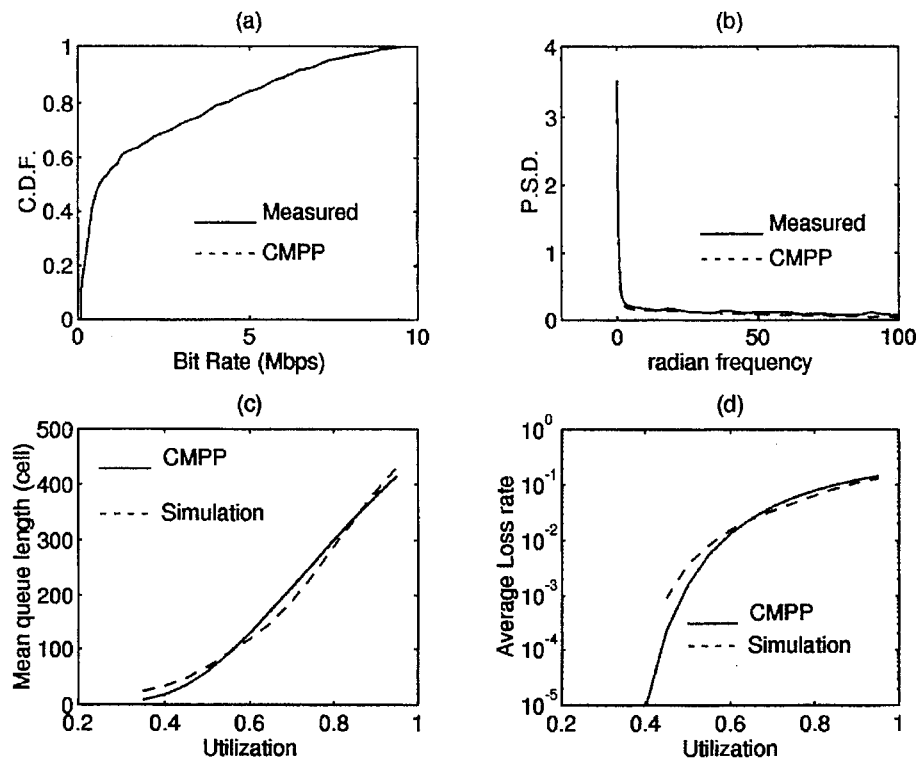
Figure 34: Input modeling and queueing analysis of a 3.5-minute Ethernet data sequence.
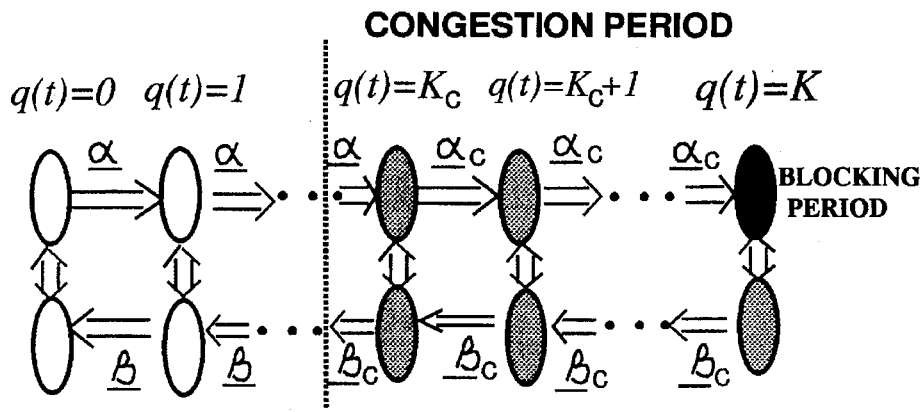
Figure 35: Abstracted state flow diagram of the controlled queueing system

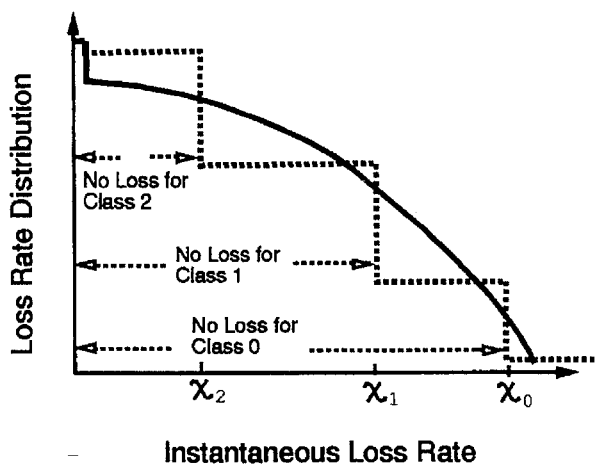
Figure 36: Loss rate distribution with and without control
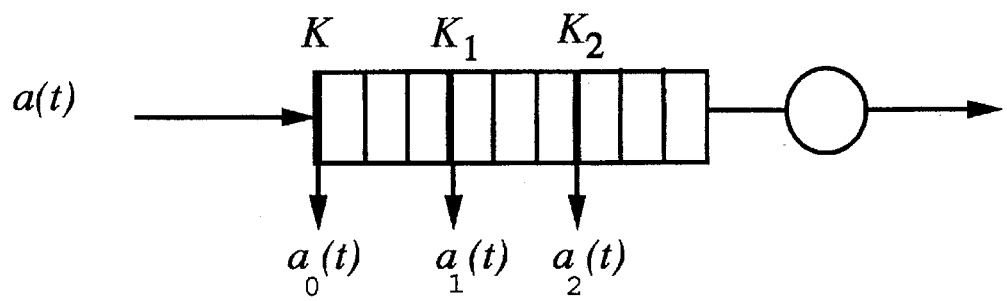
Figure 37: A multi-level buffer overload control system
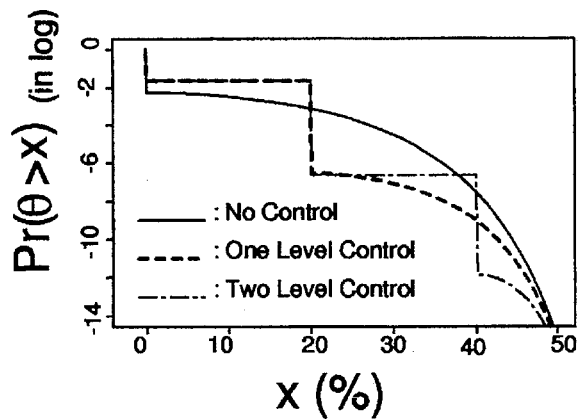
Figure 38: Example of loss rate distribution with and without control

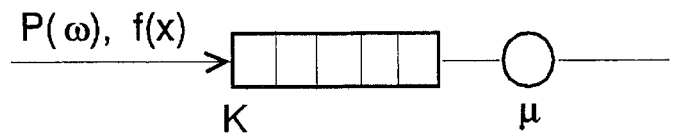
Figure 39: A network link modeled by a single-server finite-buffer system.
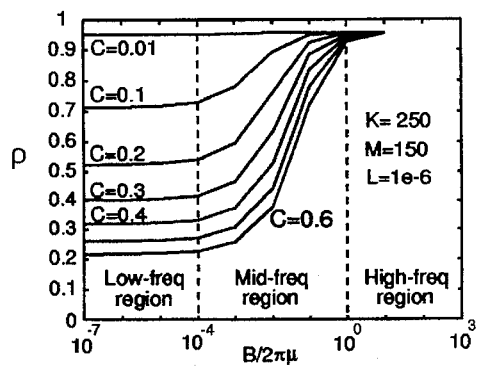
Figure 40: Link capacity allocation at $(K, L) = (250, 10^{-6})$.
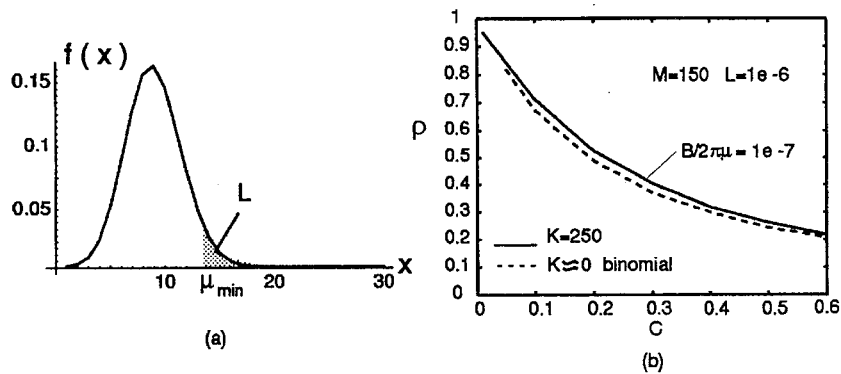
Figure 41: Link capacity allocation at $L = 10^{-6}$: (a) input rate density function; (b) comparison of $\rho$ at $K \approx 0$ and $K = 250$.

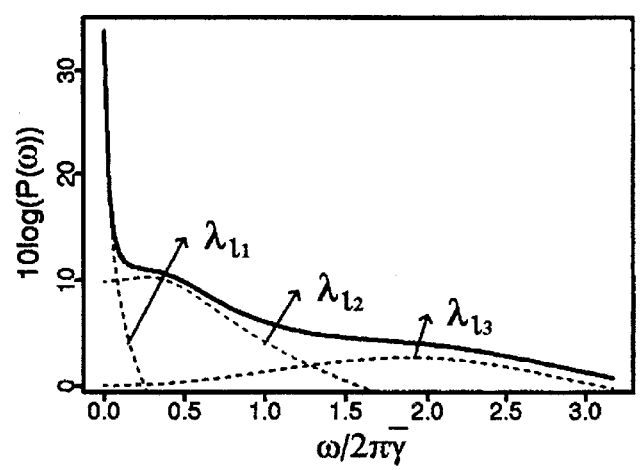
Figure 42: Superposition of input power spectrum with three eigenvalues

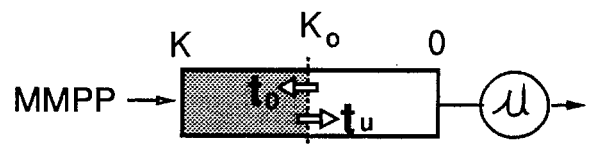
Figure 43: Division of overload and underload periods in a finite buffer system.
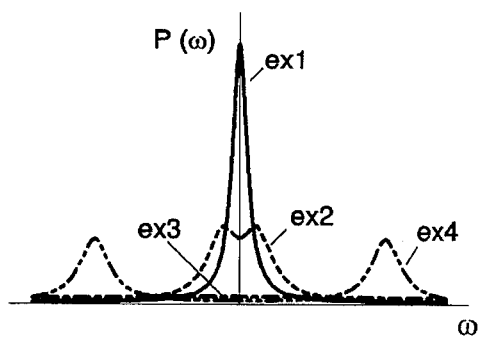
Figure 44: Four single-bell input power spectra with $\frac{1}{\mu}(\omega_o, BW)$ equal to $(0, 1.7e-3)$ in $ex1$, $(1.7e-3, 3.5e-3)$ in $ex2$, $(0, 7.0e-2)$ in $ex3$ and $(1.4e-2, 3.5e-3)$ in $ex4$, respectively.

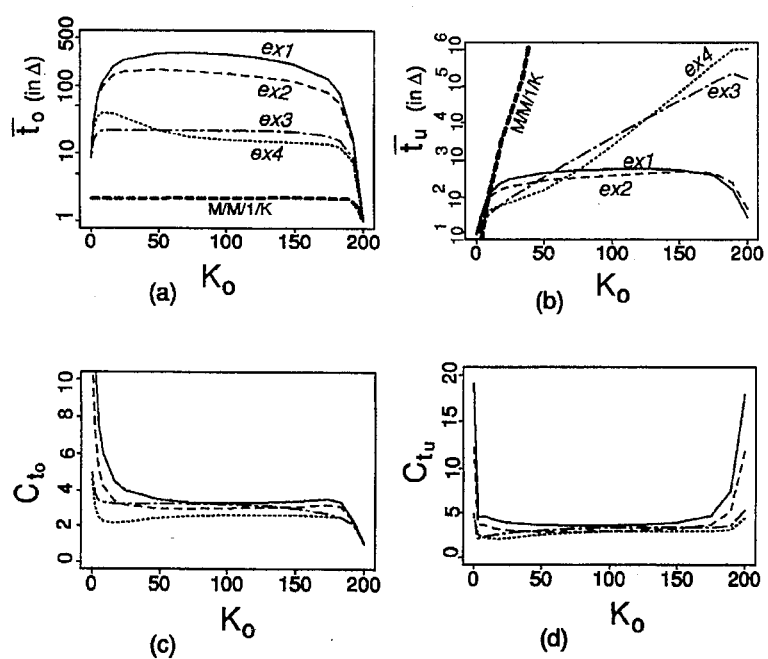
Figure 45: Mean and variation coefficient of $t_o$ and $t_u$ as a function of $K_o$ in response to four single-bell input power spectra.

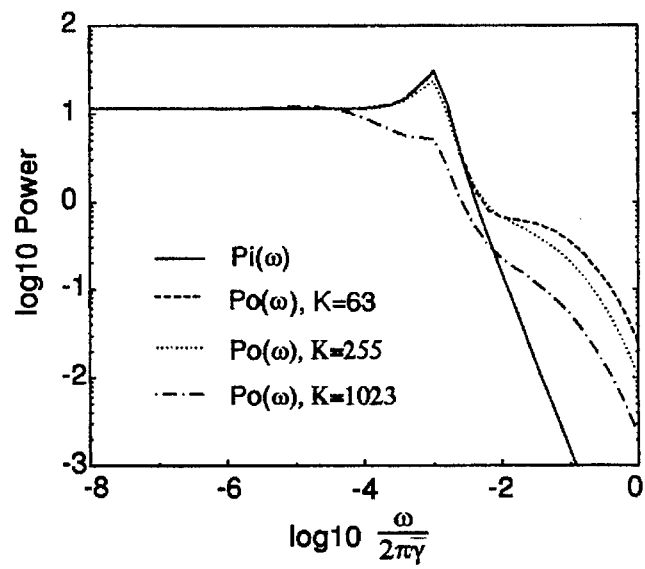
Figure 46: Output power spectrum.
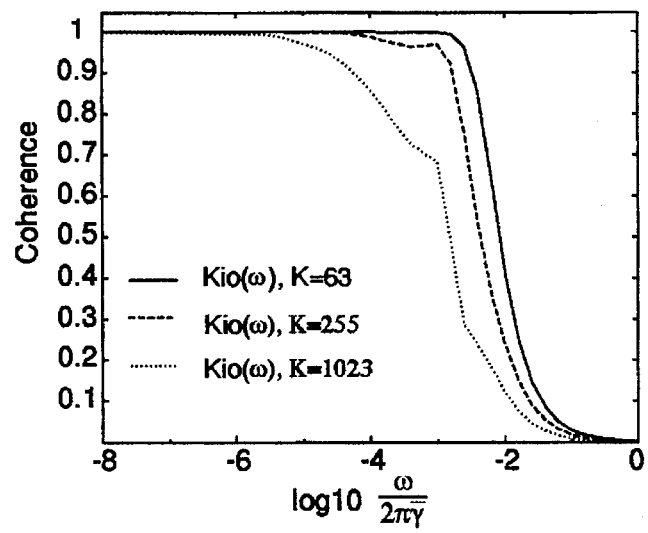
Figure 47: Input-output conherence.

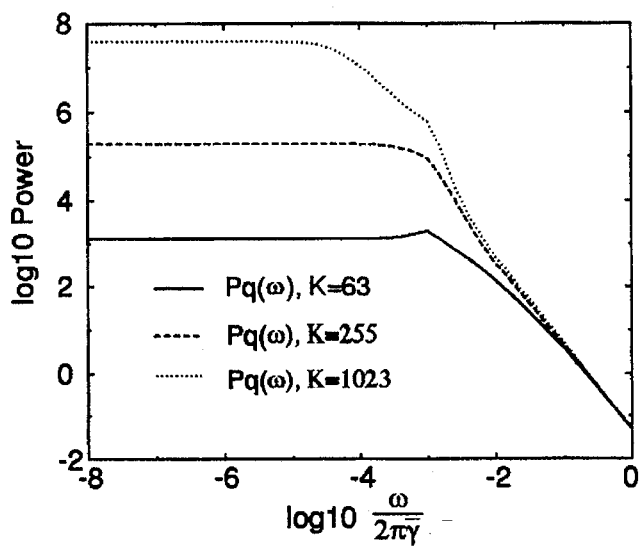
Figure 48: Queue power spectrum.
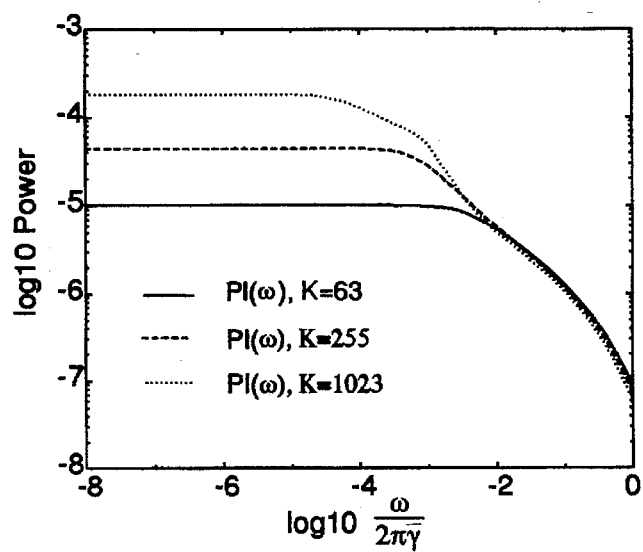
Figure 49: Loss rate power spectrum.

METHOD AND APPARATUS FOR INTEGRATION OF TRAFFIC MEASUREMENT AND QUEUEING PERFORMANCE EVALUATION IN A NETWORK SYSTEM

TABLE OF CONTENTS

Field of the Invention
Description of Related Art
Summary of the Invention
Brief Description of the Drawings
Detailed Description of the Disclosure
    Statistical Matching
        CMPP Traffic Model
        Statistical Matching by CMPP
            Matching Power Spectrum
            Matching Rate Distribution
        Software Architecture
    Queueing Analysis
        Transient Analysis
        Spectral Analysis
        Generalized Folding-Algorithm
            Principle
            Basic Procedure
            Extension to Arbitrary K
            Software Architecture
    A Method According to the Preferred Embodiment of the Invention
    Numerical Examples
    Applications
        Congestion Control
        Link Capacity Allocation
        Low Pass Filtering in Traffic Measurement
        Transient Performance
        Spectral Performance
Claims
Abstract
Figures

FIELD OF THE INVENTION

The present invention relates to network traffic analysis, and more particularly to a method and apparatus for integration of traffic statistical matching and improved queueing analysis to determine optimal buffer size, link capacity allocation, loss/delay constraints, congestion control, dynamic routing and call admission control for guaranteed quality services in a rich, heterogeneous multimedia traffic environment.

DESCRIPTION OF THE RELATED ART

There are currently two trends that are changing basic assumptions about network architectures. First, the growing number of network users and applications are requiring network designers to deal with ever increasing types of performance constraints and traffic characteristics. Second, breakthroughs in communication technologies, in particular optical communication, have made communication capacity relatively inexpensive. As a result, processing capacity at each network node has become a bottleneck for network throughput. One of the most challenging tasks in the design of the next century's information super-highway is to develop advanced tools for measurement, analysis and control multimedia traffic integration in a high speed network.

Traffic modeling comprises two basic components: traffic measurement and queueing analysis, which so far have not been well integrated. In particular, traffic measurement has long been neglected in the network performance evaluation field. A multimedia input stream is generally described by a stationary random process, and it is difficult to find an exact analytical model of random traffic, which is usually required by queueing analysis. Generally, only the steady-state, second-order and higher-order statistics of the random traffic are measurable. Steady-state statistics are defined by a distribution function (histogram). Second- and higher-order statistics are described by autocorrelation functions in the time-domain, or by equivalent spectral functions in the frequency-domain, such as the power spectrum, bispectrum and trispectrum. Some well-known signal processing techniques are available to measure traffic statistics, and the distribution and power spectrum can be measured by existing fast algorithms.

In contrast, input traffic in prior art queueing analysis is much less general than that used in signal processing. Classic queueing analyses generally ignore second-order and higher-order input statistics by making a renewal assumption on message interarrival time. In the signal processing area, the renewal input process is referred to as white noise due to its flat power spectrum in the frequency-domain. In advanced queueing theories, a Markov chain modulated rate process, defined by the transition rate matrix Q and input rate vector $\gamma$, has been commonly used to describe input traffic correlation behavior. Essentially, the eigenstructure of Q captures the input correlation functions. The construction of $(\gamma,Q)$ from input correlation functions, however, is rather difficult, involving the so-called inverse eigenvalue problem. So far, no sophisticated statistical matching techniques are available for construction of Markov chain modulated input models. Moreover, there is no queueing technique available that can be used to evaluate time dependent characteristics of queueing processes, loss rate processes and output processes, as well the cross-correlation characteristics among the three processes, in a finite-buffer system. These correlation characteristics are important for network traffic engineers to provide guaranteed quality services.

Because of these analytical difficulties, traffic measurement and queueing analysis so far have not been truly integrated in traffic modeling. As a result, no methods are available in the state of arts that can be used by traffic engineers to design effective buffer size, link capacity and congestion control for guaranteed quality transmission of multimedia traffic. Therefore, a method and apparatus is desired which provides integration of traffic measurement and queueing performance evaluation in a network system.

SUMMARY OF THE INVENTION

The present invention comprises a method and apparatus for integration of traffic measurement and queueing analysis for improved network analysis and design. The present invention utilizes a statistical-match queueing tool (SMAQ) to provide improved analysis and design over prior art methods. The present invention can be used by traffic engineers and network designers to determine optimal buffer size, link capacity allocation, loss/delay constraints, congestion control, dynamic routing and call admission control, to provide guaranteed quality services in a rich, heterogeneous multimedia traffic environment.

The method of the present invention utilizes the concept of traffic spectral representation, i.e., only the low frequencies in the traffic spectrum have a significant effect on queuing statistics. The existing discrete frequency-domain approach, however, has limited applications, since it does not capture the stochastic aspects of a prescribed traffic process. In the present invention, a continuous frequency-domain approach is used for the integration of traffic measurement and queueing analysis. The most significant advantage of the frequency domain approach is the combination of current advanced techniques in two areas: signal processing and queueing analysis. Working in the frequency domain, many current signal processing theories and techniques for spectral representation of random processes can be used in network traffic measurement.

In the present invention, the impact of higher-order input traffic statistics on queueing performance is generally neglected because they are deemed relatively insignificant. Hence it is sufficient to measure steady-state and second order statistics of traffic flow for network design and control analyses. In particular, the low frequency traffic statistics play a dominant role in queueing performance.

The SMAQ tool of the present invention comprises three basic components: traffic measurement, statistical matching and queueing solutions. In the preferred embodiment, the present invention focuses on a single node system with finite buffer size K and link capacity $\mu$. A real traffic stream, a(t), arriving at such a queueing system is generally described by a train of impulses corresponding to message arrivals. a(t) is generally considered to be a stationary random process. In practice, only the statistics of a(t) are measurable, and they are provided by the traffic measurement component using signal processing techniques. The steady-state statistics are represented by the accumulated rate histogram of a(t), denoted by F(x), which is typically expressed as a piecewise step function. The second-order statistics, denoted by a power spectral function P($\omega$) in the frequency-domain, are collected by using standard parametric signal processing methods such as Prony, MUSIC and ESPRIT, known as a class of eigenvalue-based algorithms. The measured P($\omega$) is generally described by ($\lambda,\psi$), where vector $\lambda$ contains a set of eigenvalues and vector $\psi$ provides a set of power factors. Each power factor in $\psi$ is associated with an eigenvalue in $\lambda$.

The statistical matching component constructs a special class of Markov chain modulated Poisson process (MMPP), called circulant modulated Poisson process (CMPP), which statistically matches with input traffic a(t), i.e., $$F_c(x) \approx F(x), \quad P_c(\omega) \approx P(\omega),$$

where $F_c(x)$ and $P_c(\omega)$ are the distribution and power spectral functions of the constructed CMPP. A CMPP process is defined by ($\alpha,\gamma$) where $\alpha$ is a rate transition vector which is used to generate Q matrix and $\gamma$ is an input rate vector which defines the input rate in each circulant state. The statistical matching algorithm, which is used for the construction of CMPP according to the present invention, is divided into two parts: construction $\alpha$ to match power spectrum and construction $\gamma$ to match distribution function, based on discrete Fourier transform and linear programming methods. As one will see, a wide range of F(x) and P($\omega$) statistical functions can be matched by the constructed CMPPs. The following steps summarize the statistical matching method of the present invention:

A first component of the statistical matching method of the present invention involves constructing $\alpha$ of a circulant-modulated process to statistically match the power spectral function P($\omega$), and comprises the following steps:

a. using parametric signal processing methods such as Prony, MUSIC and ESPRIT, known as a class of eigenvalue-based algorithm, to characterize second order statistics of traffic by ($\lambda,\psi$);

b. adjusting and expanding ($\lambda,\psi$) to ($\lambda_E,\psi_E$), where $\psi$ can be complex while $\psi_E$ must be read and non-negative, to minimize the difference between the power spectrum P($\omega$) of ($\lambda,\psi$) and the power spectrum $P_E(\omega)$ of ($\lambda_E,\psi_E$);

c. identifying a set of key eigenvalues, $\lambda_{key} \subset \lambda_E$, eliminating those bell components either in the high frequency band or with negligible power, in order to reduce the complexity;

d. expanding eigenspace from $\lambda_{key}$ to $\lambda_c$ with $\lambda_c \supset \lambda_{key}$ by introducing noneffective eigenvalues, in order to find a solution $\alpha$ of a discrete Fourier transform problem $$\alpha = \frac{1}{\sqrt{N}} \lambda_c F$$

subject to $$a_j \geq 0 \text{ for } j>0 \text{ and } a_0 = -\Sigma_{j=1}^{N-1} a_j;$$

e. transforming the above problem of finding $\alpha$ into a linear programming problem under the condition of $\lambda_{key}$;

f. adaptively changing the indices of the key eigenvalues in $\lambda_c$ and/or gradually expanding the dimension of $\lambda_c$, until a solution $\alpha$ is found;

g. obtaining several solutions of $\alpha$ until finding the one with a reasonable dimension;

h. finally, using the resulting $\lambda_c$ from the solution $\alpha$ to find a power vector $\psi_c$ that minimizes the difference between the original P9$\omega$) of ($\lambda,\psi$) and the constructed $P_c(\omega)$ of ($\lambda_c,\psi_c$).

The second component of the statistical matching method of the present invention involves construction $\gamma$ of a circulant-modulated-rate process to statistically match the steady state rate cumulative distribution function F(x), and this component comprises the following steps:

a. discretizing (or rediscretizing) F(x) by partitioning the range of x into a set of N equal-probability rates, denoted by $\gamma$ in ascending order;

b. finding $\gamma$ taking discret Fourier transform, $\gamma = \sqrt{N}\beta F$, subject to $\gamma_j \geq 0$, $\forall_j$ with $\beta_j = \sqrt{\psi_j} e^{\sqrt{-1}\theta_j}$, with respect to each selected $\theta_c$ for the given $\psi_c$;

c. adjusting $\theta_c$ c to find $\gamma$ that will minimize the difference between the original distribution function F(x) of $\gamma$ and the constructed $F_c(x)$ of $\gamma$, which can be formulated into a minimization problem: $\min_{\theta_c} ||\gamma - \gamma_p||$ subject to $\gamma_p \geq 0$ where $\gamma_p$ is a sorted vector of $\gamma$ in ascending order;

d. obtaining several solutions of $\theta_c$ until finding the one which gives an acceptable matching error;

e. further improving the matching result by readjusting the power of noneffective eigenvalues in $\psi_c$, which are originally set to zero, without causing significant impact on the power spectral matching;

f. achieving the perfect distribution matching if desired by simply letting $\gamma_p = \gamma$, which in some degree will alter the power vector $\psi_c$ without changing the phase vector $\theta_c$ obtained in step d, at the sacrifice of introducing extra power spectral matching errors;

g. dividing ($\psi_c,\theta_c$) into two parts (if desired): ($\psi_l, \theta_l$) in association with the low frequency power and ($\psi_h,\theta_h$)

in association with the high frequency power, such that one can use $(\psi_l, \theta_l)$ to match the input rate distribution in the low frequency band and $(\psi_h, \theta_h)$ to match the input rate distribution in the high frequency band.

The circulant-modulated-rate process $(\alpha, \gamma)$, constructed by the statistical matching method of the present invention, is a stochastic model of a non-negative rate random process, which matches the computed steady state rate distribution function and power spectrum of a random data sequence. It can also be applied in many other system, such as stock market systems, highway transportation systems, water dam systems, and so on.

The third component, the queueing solutions component, provides numerical solutions of the queue response to input traffic a(t). The steady state queueing analysis is based on the Folding-algorithm, a fast computational method for analysis of a finite quasi-birth-death (QBD) process with level-dependent transitions, The QBD process, regarded as a general and useful stochastic model for queueing analysis, has the features of Markov modulated arrival process, Markov modulated service process, finite buffer capacity, and multi-level overload control.

The present invention utilizes a generalized Folding-algorithm for both transient and spectral analyses of queue/loss/output. The generalized Folding-algorithm is a numerical method for the direct computation of xP=a where P is the QBD generator matrix in block tri-diagonal form. In contrast, the original non-generalized Folding-algorithm was developed for the solution of xP=0. The QBD state space is generally defined in two dimensions with N phases and K levels, so that $P \in R^{NK \times NK}$ and $x, a \in R^{J \times NK}$, $\forall J$. In the present invention, the time complexity of the generalized Folding-algorithm for solving xP=a is the greater of $O(N^3 \log_2 K)$ and $O(N^2 KJ)$. The algorithm operates in two phases; reduciton (fold and expansion (unfold). In the reduction phase, the size of (P,a) is reduced from the original K-level to one-level by a sequence of permutation-reduction steps. In each step, the size of (P,a) is reduced by half but the structure of the reduced matrix P is kept in the block tri-diagonal form. The finally reduced one-level (P,a) is solved to obtained a boundary solution vector. The expansion phase is a reverse process of the reduction phase to obtain a sequence of expansion factors. The solution vector x is then expressed as a simple product of the boundary solution vector and the expansion factors. The generalized Folding-algorithm used in the present invention is direct and stable with no restrictions on input and service Markov chains. Also, as described below, unlike the non-generalized Folding-algorithm, the generalized Folding-algorithm is useful for both transient and spectral analysis.

As mentioned above, the generalized Folding-algorithm can be directly applied to transient queueing analysis. Transient analysis is essential for system designers to understand the time-varying characteristics of queues, especially during congestion periods. One subject in transient queueing analysis of sojourn time behavior on a subset of the stationary queueing process, which is used to characterize the time behavior of the blocking period, the busy period, or the overload period in queueing systems. This provides an insight into the transient changes of the queueing delay of the network under different control schemes, such as how long it will take to bring down an overloaded queueing process and what kind of control will be more appropriate, with respect to various input traffic characteristics. The generalized Folding-algorithm used in the present invention provides a fast computational method for sojourn time analysis of a finite QBD process.

The generalized Folding-algorithm can also be used for spectral performance analysis. There are four random processes involved in a queueing system: input, queue, loss and output. Spectral analysis evaluates the time autocorrelation of these processes and cross-correlation among them (i.e., the second order statistics of a queueing system). The Fourier transform of these time correlation functions are used to derive the corresponding power spectral and coherence spectral functions in the frequency domain. One important application of the spectral analysis is to find the output power spectrum $P_o(\omega)$ and input-output coherence function $K_{io}(\omega)$. For instance, although it is well known that a queueing system is generally non-linear, spectral analysis according to the present invention shows that the input/output relationship in a certain low frequency band behaves linearly or nearly so. Mathematically, this is identified by $K_{io}(\omega) \approx 1$ when $\omega \leq \omega_c$ where $\omega_c$ is called the non-linear break frequency. In its physical implication, the low frequency traffic, defined by $\omega \leq \omega_c$, stays intact as it travels through a queueing system. Such an intrinsic I/O property in queueing systems plays an important role in characterizing the output process, which may form a partial input to some "downstream" queues of the network. Notice that it is the "upstream" output low frequency characteristics that will have a significant impact on the "downstream" queueing performance. On the contrary, the high frequency characteristics of traffic flow are certainly changed by the queueing system, but whose changes have relatively much less effect on the "downstream" queueing performance.

Therefore, the present invention comprises a system for the analysis and design of more efficient networks. The present invention includes steps of traffic measurement, statistical matching and queueing analysis to provide information on optimum network design. The present invention includes novel statistical matching and queueing analysis methods that utilize frequency domain analysis, in contrast to the time domain methods of the prior art. The statistical matching method constructs a stochastic model of non-negative rate random processes for a wide range of steady-state and second order statistical functions. The queueing analysis utilizes a generalized Folding-algorithm to provide time dependent performance evaluation of the network.

Comprehensive numerical examples in wide network design applications, provided in the following detailed description of the disclosure, indicate the great potential of the SMAQ tool for traffic engineers and network designers to solve many challenging issues in traffic management and network control on measurement basis. Solutions thereby determined by the method of present invention are used to construct or modify a network node design with respect to link capacity, buffer size, congestion control and service scheduling.

BRIEF DESCRIPTION OF THE DRAWINGS

FIG. 1 shows a block diagram of three basic components, which integrates traffic measurement and queueing analysis according to the present invention, to provide solutions of buffer size, link capacity, congestion control to network engineers;

FIG. 2 describes a typical traffic stream where each impulse corresponds to individual arrival;

FIG. 3 shows a single node system with finite buffer capacity K and service rate $\mu$ to support the transmission of traffic stream a(t);

FIG. 4 shows a typical analytical modeling of traffic stream by a multi-state Markov modulated Poisson process (MMPP);

FIG. 5 shows a typical example of power spectrum $P(\omega)$, constructed by standard parametric eigenvalue-based signal processing methods, which consists of multiple bell components with each bell component described by the half power bandwidth $B_i$, central frequency $\omega_i$ and average power $\psi_i$;

FIG. 6 shows a block diagram of basic functions to construct the solution $\alpha$ of circulant from a given set of effective eigenvalues $\lambda_{eff}$, where finding $\alpha$ is equivalent to solving a linear programming problem: $Ax=b$ subject to $x \geq 0$, with adaptation of eigenvalue indices i' and expansion of eigenspace N, until a solution $\alpha$ is found;

FIG. 7 shows the partition of a cumulative rate distribution function $F(x)$ into a set of N equal-probability rates, denoted by $\gamma=[\gamma_0, \gamma_1, \ldots, \gamma_{N-1}]$;

FIG. 8 shows the histogram of distribution matching errors when the programming search for solution $\gamma$ starts with 100 randomly selected phase vectors $\theta_c$.

FIG. 9 shows the software block diagram of the traffic statistical matching method to construct the solution $\alpha$, where the detail operation at each functional block is described in the Software Architecture subsection.

FIG. 10 is the continuation of the software block diagram in FIG. 9 for the construction of the solution $\gamma$.

FIG. 11 shows a level-transition diagram of the generalized Folding-algorithm for solution of $xP=a$ at $n=3$, where in each of the three reduction steps the size of $(P,a)$ is reduced (folded by shuffling) by half, the boundary solution $x^{(3)}$ is then obtained after the reduction, and then $x^{(3)}$ will be doubled (unfolded by reshuffling) in each of the three expansion steps, until the final solution x is obtained;

FIG. 12 shows a block diagram of the generalized Folding-algorithm, comprising the reduction phase, the boundary solution operation and the expansion phase, as explained in FIG. 11;

FIG. 13 shows a block diagram of the detail operations in each of the reduction and expansion step.

FIG. 14 shows the flow chart of SMAQ main program which consists of four tool boxes: traffic input tool box, statistical matching tool box, queueing solution tool box and application tool box;

FIG. 15 shows the functional block diagram of traffic input tool box, which can accept three types of input traffic (real sequence, MMPP model and statistical functions ($P(\omega)$, $F(x)$)), and also allows traffic aggregrations by superimposing homogeneous and/or heterogeneous traffic streams of different types.

FIG. 16 shows the functional block diagram of traffic statistical matching tool box, comprising three basic steps: power spectral matching, transition matrix Q construction and distribution matching, in addition to other supporting functions such as system parameter setting, displaying and printing;

FIG. 17 shows the functional block diagram of queueing solution tool box, which includes both analytical and simulation techniques for computation of queueing solutions under various system conditions;

FIG. 18 shows the functional block diagram of application tool box, consisting some basic network design functions such as link capacity allocation, buffer design, traffic generator, and spectral analysis, which can also be extended by every user to include its own functions through the standardized interface with the SMAQ software.

FIG. 19 compares the queue distributions with two input models, one of which is superimposed by heterogeneous two-state MMPPs and the other is a single CMPP constructed by the invented method, both of which share the same $P(\omega)$ and $F(x)$ functions;

FIGS. 20(a) and 20(b) show the queueing solution comparison of superimposed two-state MMPPs and matched CMPP in 200 randomly generated cases, including the histograms on relative difference of average queue and also on logarithmic difference of average loss rate;

FIG. 21 compares the queueing solutions of superimposed two-state MMPPs and matched CMPP when the bell-bandwidths of the power spectrum are adjusted;

FIG. 22 compares the queueing solutions of superimposed two-state MMPPs and matched CMPP by substantially increasing the number of two-state MMPPs in the superposition;

FIG. 23 compares the queueing solutions of superimposed two-state MMPPs and matched CMPP when the buffer size is adjusted;

FIGS. 24(a) and 24(b) show the queueing solution comparison of superimposed heterogeneous three-state MMPPs and matched CMPP in 200 randomly generated cases, including the histograms on relative difference of average queue and also on logarithmic difference of average loss rate;

FIGS. 25(a) and 25(b) show the queueing solution comparison of superimposed heterogeneous four-state MMPPs and matched CMPP in 200 randomly generated cases, including the histograms on relative difference of average queue and also on logarithmic difference of average loss rate;

FIG. 26 shows the queue length distribution of superimposed heterogeneous CMPPs and matched CMPP at different utilizations;

FIG. 27 shows the queue length distribution of matched CMPP as a function of its input state space N;

FIG. 28 shows the histograms of queue/loss solutions with 189 different CMPPs, each of which is generated by the invented method using different indices for the effective eigenvalues in $\lambda_c$, but all of which share the same $P(\omega)$ and $F(x)$;

FIG. 29 shows the histograms of queue/loss solutions with 79 different CMPPs, each of which is generated by the invented method using different phase vectors $\theta_c$ for the distribution matching, but all of which share the same $P(\omega)$ and $F(x)$;

FIG. 30 shows a 2-minute JPEG video sequence and its statistical functions $P(\omega)$ and $F(x)$ collected by the Fast Fourier Transform (FFT) method;

FIG. 31 shows the video statistics matched by CMPP and its queueing solutions of the 2-minute video sequence shown in FIG. 30, where FIGS. 31a,b compare $F(x)$ and $P(\omega)$ of the measured video sequence with $F_c(x)$ and $P_c(\omega)$ of the constructed CMPP while FIGS. 31c,d compare the simulated queue/loss solution of the real video sequence with the analytical queue/loss solution of the matched CMPP;

FIG. 32 is the same as FIG. 31 except using another 2-minute JPEG video sequence;

FIG. 33 shows a real 3.5-minute Ethernet data sequence and its statistical functions $P(\omega)$ and $F(x)$ collected by the Fast Fourier Transform (FFT) method;

FIG. 34 shows the data statistics matched by CMPP and its queueing solutions of the 3.5-minute Ethernet data sequence shown in FIG. 33, where FIGS. 34a, b compare $F(x)$ and $P(\omega)$ of the measured data sequence with $F_c(x)$ and $P_c(\omega)$ of the constructed CMPP while FIGS. 31c,d compare the simulated queue/loss solution of the real data sequence with the analytical queue/loss solution of the matched CMPP;

FIG. 35 shows a level-transition state flow diagram of one-level controlled queueing system, modeled by QBD process;

FIG. 36 shows the loss rate distribution of a noncontrolled queueing system vs. the loss rate distribution of a multi-level controlled system, where in the noncontrolled system the loss is purely caused by buffer blocking and in the controlled system the loss can also be caused by selective discarding;

FIG. 37 shows a block diagram of multi-level buffer overload control system, where a fraction of the input traffic stream, $a_i(t)$, are to be discarded whenever the buffer occupancy exceeds the threshold $K_i$;

FIG. 38 shows an example of the loss rate distributions when the system is noncontrolled, one-level controlled and two-level controlled;

FIG. 39 shows a network link model for the design of link capacity to support traffic with finite buffer size;

FIG. 40 shows the performance of the maximum link utilization ρ that can support the traffic, which is modeled by 150 i.i.d. two-state MMPPs, subject to the average loss rate $L=10^{-6}$ at the buffer size K=250, where the effect of the input bell-bandwidth $B/2\pi\mu$ on ρ is divided into three regions: in the high-frequency region ρ is close to 1 and independent of $B/2\pi\mu$, in the mid-frequency region ρ changes rapidly by $B/2\pi\mu$, and in the low-frequency region ρ is small and less dependent on $B/2\pi\mu$;

FIG. 41 shows that in the low-frequency region the maximum link utilization ρ, or the minimum link capacity $\mu_{min}$, is essentially determined by the tail portion of the input rate density function f(x) as if taking the buffer size K≈0;

FIG. 42 shows an example of input power spectrum superimposed by three eigenvalues which are used to characterize video correlations in three different time scales: between frames, lines and packets;

FIG. 43 shows a block diagram of finite-buffer system which is divided into overload period $t_o$ and underload period $t_u$ for transient analysis;

FIG. 44 shows four single-bell input power spectra, each of which has the identical average power;

FIG. 45 shows the average and variation coefficient of the overload and underload periods as a function of the buffer threshold $K_o$, in a queueing system described in FIG. 43 with its four input power spectra shown in FIG. 44;

FIG. 46 compares the output power spectrum $P_o(\omega)$ to a single-bell input power spectrum $P_i(\omega)$ in a queueing system designed with different buffer size under the same loss rate condition $L=^{-6}$;

FIG. 47 shows the input-output coherence function $K_{io}(\omega)$ for the same system described in FIG. 46, where the observation of $K_{io}(\omega) \approx 1$ in the low frequency band indicates the linearity of low frequency traffic flow, especially as the buffer size K reduces;

FIG. 48 shows the queue power spectrum $P_q(\omega)$ for the same system studied in FIGS. 46 and 47;

FIG. 49 shows the loss rate power spectrum $P_l(\omega)$ for the same system studied in FIGS. 46, 47 and 48.

DETAILED DESCRIPTION OF THE DISCLOSURE

The following publications are hereby incorporated by reference:

Li S. Q. and Hwang C. L., "Queue Response to Input Correlation Functions: Discrete Spectral Analysis."*IEEE/ACM Trans. Networking*, Vol. 1, No. 5, October 1993, pp. 522–533 (received the *IEEE Infocom '92* Conference Paper Award).

Li S. Q. and Hwang C. L., "Queue Response to Input Correlation Functions: Continuous Spectral Analysis," *IEEE/ACM Trans. Networking*, Vol. 1, No. 6, December 1993, pp. 678–692.

Ye J. and Li S. Q., "Folding Algorithm: A computational Method for Finite QBD Processes with Level-Dependent Transistions" *IEEE Trans. Commu.*, Vol. 42, No. 2, February 1994, pp. 625–639.

Neuts M. F., *Matrix-Geometric Solutions in Stochastic Models*, Johns Hopkins University Press, Baltimore, 1981.

Hwang C. L., and Li S. Q., "On Input State Space Reduction and Buffer Noneffective Region," *Proc. IEEE Infocom '94 Conference*, June 1994.

Li S. Q., "Overload Control in a Finite Message Storage Buffer," *IEEE Trans. Commu.*, Vol. 37, No. 12 December 1989, pp. 1192–1202.

The present invention comprises a method and apparatus for integration of traffic measurement and queueing analysis for improved network analysis and design. The present invention utilizes a statistical-match queueing tool (SMAQ) to provide improved analysis and design over prior art methods. The present invention can be used by traffic engineers and network designers to determine optimal buffer size, link capacity allocation, loss/delay constraints, congestion control, dynamic routing and call admission control, to provide guaranteed quality services in a rich, heterogeneous multimedia traffic environment.

The method of the present invention utilizes the concept of traffic spectral representation, which was originally introduced by the applicants to queueing analysis in "Queue Response to Input Correlation Functions: Discrete Spectral Analysis," *IEEE/ACM Transactions on Networking*, Vol. 1, No. 5, October 1993, pp. 522–533 (the same paper also received the *IEEE Infocom* 92 Conference Paper Award). The main finding in that paper is that only the low frequencies in the traffic spectrum have a significant effect on queuing statistics. The discrete frequency-domain approach used in that paper, however, has limited applications, since it does not capture the stochastic aspects of a prescribed traffic process. In this invention, a continuous frequency-domain approach is used for the integration of traffic measurement and queueing analysis. The most significant advantage of the continuous frequency-domain approach is the combination of current advanced techniques in two areas: signal processing and queuing analysis. Working in the frequency domain, many current signal processing theories and techniques for spectral representation of random processes can be used in network traffic measurement.

The applicants have reported in "Queue Response to Input Correlation Functions: Continuous Spectral Analysis," *IEEE/ACM Transactions on Networking*, Vol. 1, No. 6, December 1993, pp. 678–692 (hereafter this paper is cited as reference [2]) that the impact of higher-order input traffic statistics on queuing performance can generally be neglected, hence it is sufficient to measure steady-state and second-order statistics of traffic flow for network design and control analyses. In particular, as also reported in [2], the low frequency traffic statistics play a dominant role in queueing performance.

The SMAQ tool of the present invention comprises three basic components: traffic measurement, statistical matching and queueing solutions, as shown in FIG. 1. In the preferred embodiment, the present invention focuses on a single node system with finite buffer size K and link capacity μ, as described in FIG. 3. A real traffic stream, a(t), arriving at such a queueing system is generally described by a train of impulses corresponding to message arrivals, as described in FIG. 2. a(t) is generally considered to be a stationary random process. In practice, only the statistics of a(t) are measurable; they are provided by traffic measurement component in FIG. 1 using signal processing techniques. The steady-state statistics are represented by the accummulated rate histogram of a(t), denoted by F(x), which is typically expressed as a piecewise step function. The second-order statistics, denoted by a power spectral function P(ω) in the frequency-domain, are collected by using standard parametric signal processing methods such as Prony, MUSIC and ESPRIT, known as a class of eigenvalue-based algorithms. The measured P(ω) is generally described by (λ,ψ), where vector λ contains a set of eigenvalues and vector ψ provides a set of power factors. Each power factor in ψ is associated with an eigenvalue in λ.

The statistical matching component in FIG. 1 constructs a special class of Markov chain modulated Poisson process (MMPP), called circulant modulated Poisson process (CMPP), which statistically matches with input traffic a(t), i.e., $$F_c(x) \approx F(x), P_c(\omega) \approx P(\omega),$$

where $F_c(x)$ and $P_c(\omega)$ are the distribution and power spectrum of the constructed CMPP. A CMPP process is defined by (α,δ) where α is a rate transition vector which is used to generate Q matrix and γ is an input rate vector which defines the input rate in each circulant state. The statistical matching algorithm, which is used for the construction of CMPP according to the present invention, comprises two steps: construction α to match power spectrum P(ω) and construction γ to match distribution function F(x), based on discrete Fourier transform and linear programming methods. As one will see, a wide range of F(x) and P(ω) statistical functions can be matched by the constructed CMPPs.

The circulant-modulated-rate process (α,γ), constructed by the statistical matching method of the present invention, is a stochastic model of a non-negative rate random process, which matches the computed steady state rate distribution function and power spectrum of a random data sequence. It can also be applied in many other systems, such as stock market systems, highway transportation systems, water dam systems, and so on.

The third component, the queueing solutions component, in FIG. 1 provides numerical solutions of the queue response to input traffic a(t). The steady state queuing analysis is based on the Folding-algorithm, a fast computational method for analysis of a finite quasi-birth-death (QBD) process with level-dependent transitions, developed by Ye and Li in "Folding Algorithm: A Computational Method for Finite QBD Processes with Level-Dependent Transitions" *IEEE Transactions on Communication,* Vol. 42, No. 2, February 1994, pp. 625–639 (hereafter this paper is cited as reference [3]). The QBD process, regarded as a general and useful stochastic model for queueing analysis, has the features of Markov modulated arrival process, Markov modulated service process, finite buffer capacity, and multi-level overload control, as described in the book written by M. F. Neuts, entitled *Matrix-Geometric Solutions in Stochastic Models,* John Hopkins University Press, Baltimore, 1981.

The present invention utilizes a generalized Folding-algorithm for both transient and spectral analyses of queue/loss/output. The generalized Folding-algorithm is a numerical method for the direct computation of xP=a where P is the QBD generator matrix in block tri-diagonal form. In contrast, the original non-generalized Folding-algorithm [3] was developed for the solution of xP=0. Define the QBD state space in two dimensions with N phases and K levels, so that $P \in r^{NK \times NK}$ and $x, a \in R^{J \cdot NK}$, ∀J. In the present invention, the time complexity of the generalized Folding-algorithm for solving xP=a is the greater of $O(N^3 \log_2 K)$ and $O(N^2 KJ)$. The algorithm operates in two phases: reduction (fold) and expansion (unfold). In the reduction phase, the original size of (P,a) is reduced from K-level to one-level by a sequence of permutation-reduction steps. In each step, the size of (P,a) is reduced by half but the structure of the reduced matrix P is kept in the block tri-diagonal form. The finally reduced one-level (P,a) is solved to obtain a boundary solution vector. The expansion phase is a reverse process of the reduction phase to obtain a sequence of expansion factors. The solution vector x is then expressed as a simple product of the boundary solution vector and the expansion factors. The algorithm is direct and stable with no restrictions on input and service Markov chains. Also, as described below, unlike the non-generalized Folding-algorithm, the generalized Folding-algorithm is useful for both transient and spectral analysis.

As mentioned above, the generalized Folding-algorithm can be directly applied to transient queueing analysis. Transient analysis is essential for system designers to understand the time-varying characteristics of queues, especially during congestion periods. One subject in transient queueing analysis is the analysis of sojourn time behavior on a subset of the stationary queueing process, which is used to characterize the time behavior of the blocking period, the busy period, or the overload period in queueing systems. This provides an insight into the transient changes of the queueing delay of the network under different control schemes, such as how long it will take to bring down an overload queueing process and what kind of control will be more appropriate, with respect to various input traffic characteristics. The generalized Folding-algorithm used in the present invention provides a fast computational method for sojourn time analysis of a finite QBD process.

The generalized Folding-algorithm can also be used for spectral performance analysis. There are four random processes involved in a queueing system: input, queue, loss and output. Spectral analysis evaluates the time autocorrelation of these processes and cross-correlation among them (i.e., the second order statistics of a queueing system). The Fourier transform of these time correlation functions are used to derive the corresponding power spectral and coherence spectral functions in the frequency domain. One important application of the spectral analysis is to find the output power spectrum $P_o(\omega)$ and input-output coherence function $K_{io}(\omega)$. For instance, although it is well known that a queueing system is generally non-linear, spectral analysis according to the present invention shows that the input/output relationship in a certain low frequency band behaves linearly or very nearly so. Mathematically, this is identified by $K_{io}(\omega) \approx 1$ when $\omega \leq \omega_c$ where $\omega_c$ is called the non-linear break frequency. In its physical implication, the low frequency traffic, defined by $\omega \leq \omega_c$, stays intact as it travels through a queueing system. Such an intrinsic I/O property in queueing systems plays an important role in characterizing the output process which may form a partial input to some "downstream" queues of the network. Notice that it is the "upstream" output low frequency characteristics that will have a significant impact on the "downstream" queueing performance. On the contrary, the high frequency characteristics of traffic flow are certainly changed by the queueing system, but whose changes have relatively much less effect on the "downstream" queueing performance.

Therefore, the present invention comprises a system for the analysis and design of more efficient networks. The present invention includes steps of traffic measurement, statistical matching and queueing analysis to provide information on optimum network design. The present invention includes novel statistical matching and queueing analysis methods that utilize frequency domain analysis, in contrast to the time domain methods of the prior art. The statistical matching method constructs a stochastic model of non-negative rate random processes for a wide range of steady-state and second order statistical functions. The queueing analysis utilizes a generalized Folding-algorithm to provide time dependent performance evaluation of the network.

Comprehensive numerical examples in wide network design applications, provided in the following detailed description of the disclosure, indicate the great potential of the SMAQ tool for traffic engineers and network designers to solve many challenging issues in traffic management and network control on measurement basis. Solutions thereby determined by the method of present invention are used to construct or modify a network node design with respect to link capacity, buffer size, congestion control and service scheduling.

The detail description of this invention is organized as follows. The first section describes the statistical matching method of the present invention for the construction of CMPP to match with $P(\omega)$ and $F(x)$. The second section shows the generalized Folding-algorithm and its usage in both transient and spectral system performance analyses. The third section provides a functional block diagram of the preferred embodiment of the present invention. The comprehensive numerical studies in the fourth section show the strength of this statistical matching programming approach for integration of traffic measurement and queueing analysis. The fifth section provides the applications of the SMAQ tool in various aspects of network design.

STATISTICAL MATCHING

CMPP Traffic Model

The steady-state and second-order statistics of $a(t)$ can be characterized by MMPP, which is defined by $(Q,\gamma)$. $Q=[q_{ij}]$, $i, j \in \{0, 1, \ldots, N-1\}$, is the transition rate matrix of an N-state continuous-time discrete-state Markov chain (MC), and $\gamma=[\gamma_0, \gamma_1, \ldots, \gamma_{N-1}]$ is an input rate row vector for the Poisson arrival rate in each state. FIG. 4 shows a sample path of three-state MMPP and its associated input rate process. The input rate process $\gamma(t) \in \{\gamma_0, \gamma_1, \ldots, \gamma_{N-1}\}$ is defined upon the removal of Poisson local dynamics of the arrivals in $a(t)$. The second-order statistics of $a(t)$ are characterized by the autocorrelation function $R_a(\tau)=E\{a(t)a(t+\tau)\}$. For MMPP one can write $$R_a(\tau)=\bar{\gamma}\delta(\tau)+R(\tau), \quad (1)$$

where $\bar{\gamma}=E\{\gamma(t)\}$ is the average input rate, given by $\bar{\gamma}=\gamma\pi^T$. $\pi$ is the row vector of the steady-state probability of Q, i.e., $\pi Q=0$ and $\pi e=1$ where e is a unit column vector. $\delta(\tau)$ is the Dirac delta function, which is equal to infinity at $\tau=0$, and zero elsewhere. $R(\tau)=E\{\gamma(t)\gamma(t+\tau)\}$ is the autocorrelation function of the input rate process, as expressed by $$R(\tau)=(\pi\odot\gamma)e^{Q|\tau|}\gamma^T, \quad (2)$$

where $\odot$ denotes the element-by-element product of two vectors. $e^{Q|\tau|}$ is an exponential matrix of the MC transition probabilities at interal $\tau$. Note that the first term in (1), $\bar{\gamma}\delta(\tau)$, is a background white noise attributed to the local dynamics of Poisson arrivals in each input state, representing the non-correlated input property. The correlated property of $a(t)$ is solely represented by the correlated property of $\gamma(t)$.

The steady-state statistics of $\gamma(t)$ provide much more information than that of $a(t)$. The steady-state statistics of the input rate process are represented by its steady-state cumulative distribution function $F(x)$, which is determined by $(\gamma, \pi)$. One can express $F(x)$ in a piecewise multi-step incremental form, as defined by $$F(x) = \lim_{t \to \infty} \Pr(\gamma(t) \leq x),$$

according to $\gamma(t) \in \{\gamma_0, \gamma_1, \ldots, \gamma_{N-1}\}$ with $\lim_{t \to \infty} \Pr(\gamma(t)=\gamma_i)=\pi_i$, $\forall i$. finding $R(\tau)$ and $F(x)$ from $(Q, \gamma)$ of a given MMPP is straightforward. Our objective, however, is to design $(Q, \gamma)$ which statistically matches with desired $R(\tau)$ and $F(x)$. Assume that Q is diagonalizable: $Q=\sum_{l=0}^{N-1}\lambda_l g_l h_l$, where $\lambda_l$ is the l-th eigenvalue of Q and $g_l$ and $h_l$ are the right column eigenvector and left row eigenvector with respect to $\lambda_l$. Hence, $$R(\tau) = \sum_{l=0}^{N-1} \psi_l e^{\lambda_l |\tau|} \text{ with } \psi_l = \sum_i \sum_j \pi_i \gamma_i \gamma_j g_{li} h_{lj}, \quad (3)$$

where $\tau=[\tau_0, \tau_1, \ldots]$, $g_l=[g_{l0}, g_{l1}, \ldots]^T$ and $h_l=[h_{l0}, h_{l1}, \ldots]$. Taking the Fourier transform of $R(\tau)$, we derive the equivalent power spectral function in the frequency-domain:

$$P(\omega) = \sum_{l=0}^{N-1} \frac{-2\psi_l \lambda_l}{\lambda_l^2 + \omega^2}, \quad (4)$$

where each eigenvalue contributes a bell-shaped componets [2]. Each such component represents a bell-shaped curve located at the central frequency $\omega_l=\text{Im}\{\lambda_l\}$ and weighted by the average power $\psi_l$. The shape of each bell is measured by its half power bandwidth $B_l=-2\text{Re}\{\lambda_l\}$, as described in FIG. 5. The construction of $(Q, \gamma)$ involves a so-called inverse eigenvalue problem for which no general solution is available. To circumvent the inverse eigenvalue problem, we consider a special class of MMPP, called a circulant modulated Poisson process (CMPP), $$Q = \begin{bmatrix} \alpha_0 & \alpha_1 & \alpha_2 & \ldots & \alpha_{N-1} \\ \alpha_{N-1} & \alpha_0 & \alpha_1 & \ldots & \alpha_{N-2} \\ \alpha_{N-2} & \alpha_{N-1} & \alpha_0 & \ldots & \alpha_{N-3} \\ \vdots & \vdots & \vdots & & \vdots \\ \alpha_1 & \alpha_2 & \alpha_3 & \ldots & \alpha_0 \end{bmatrix}, \quad (5)$$

where each row circulates by one element to the right to form the next row. Define a as the first row of Q and $Q=\text{circ}(a)$. The second order statistics of CMPP are represented by $$\lambda_c = \sqrt{N} \, \alpha F^*, \psi_c = \frac{1}{N} |\gamma F^*|^2, \quad (6)$$

with $\lambda_c=[\lambda_0, \lambda_1, \ldots, \lambda_{N-1}]$ and $\psi_c=[\psi_0, \psi_1, \ldots, \psi_{N-1}]$ in (3) and (4). F is a Fourier matrix with its (i,j)-th element given by $$\frac{1}{\sqrt{N}} e^{-\frac{2\pi i j}{N} \sqrt{-1}}.$$

We have $F^{-1}=F^*$ where $F^*$ is the conjugate transpose of $F$. Denote the power spectrum of CMPP by $P_c(\omega)$.

The discrete Fourier transform of $\gamma$ is denoted by $\beta$, i.e., $$\beta = \frac{1}{\sqrt{N}} \gamma F^*.$$

Decompose $\beta$ is power vector $\psi_c$ and phase vector $\theta_c$:

$$\psi_c = |\beta|^2 = \frac{1}{N}|\gamma F^*|^2, \theta_c = \arg\{\beta\} = \arg\{\gamma F^*\}. \quad (7)$$

Hence, the input rate vector $\gamma$ is formed by $(\psi_c, \theta_c)$:

$$\gamma_i = \bar{\gamma} + \sum_{l=1}^{N-1} \sqrt{\psi_l} \cos(2\pi i l/N - \theta_l), \text{ for } i=0,1,\ldots,N-1. \quad (8)$$

Since the steady-state probability of each state in circulant is equally likely, i.e., $\tau_i=1/N$, $\forall i$, the input rate distribution function of CMPP, denoted by $F_c(x)$, is dependent only on $\gamma$. $F_c(x)$ is a piecewise multi-step function which jumps by $1/N$ at each individual value of $x \in \gamma$ in ascending order, as expressed by $$F_c(x) = \lim_{t \to \infty} \Pr(\gamma(t) \leq x) = n_x/N, \quad (9)$$

where $n_x$ represents the number of input rates in $\gamma$ less than or equal to $x$. From (8), each eigenvalue contributes a sinusoidal term to the input rate distribution. One can therefore describe a CMPP by $(\alpha,\gamma)$ in the time-domain, or equivalently by $(\lambda_c, \psi_c, \theta_c)$ in the frequency-domain. The second-order statistics of CMPP are defined by $(\lambda_c, \psi_c)$ and the steady-state statistics are defined by $(\psi_c, \theta\text{hd }c)$, respectively. The time-domain construction of CMPP is directly obtained by taking the constrained inverse discrete Fourier transform:

$$\alpha = \frac{1}{\sqrt{N}} \lambda_c F \text{ subject to } \alpha_j \geq 0 \text{ for } j > 0 \text{ and } \alpha_0 = -\sum_{j=1}^{N-1} \alpha_j, \quad (10)$$

$$\gamma = \sqrt{N} \beta F \text{ subject to } \gamma_j \geq 0, \quad j, \text{ with } \beta_j = \sqrt{\psi_j} e^{\sqrt{-1}\theta_j}.$$

Note that $\alpha$ is solely dependent on $\lambda_c$ and $\gamma$ is solely dependent on $(\psi_c, \theta_c)$. The construction of $\alpha$ and $\gamma$ is therefore well decomposed.

Statistical Matching by CMPP

In a study of a real traffic stream, only its steady-state and second order statistics are likely to be measured. The steady-state statistics are represented by the rate histogram of arrival traffic, denoted by $F(x)$, which is typically expressed as a piecewise step function. Second-order statistics are collected by using standard parametric signal processing methods such as Prony, MUSIC and ESPRIT. These techniques, known as a class of eigenvalue-based algorithms, provide a direct solution of $(\lambda, \psi)$ for the construction of the autocorrelation function $R(\tau)$, or power spectrum $P(\omega)$ defined in (3) and (4). In this subsection, we introduce techniques to construct a CMPP with $$F_c(x) \approx F(x), P_c(\omega) \approx P(\omega).$$

The construction of CMPP is made in two steps:
(a) composing $\alpha$ from $(\lambda, \psi)$;

(b) composing $\gamma$ from $F(x)$.

Q will be designed such that all eigenvalues in $\lambda$ are distinct. The complex eigenvalues in $\lambda$ always appear in conjugate pairs because $R(\tau)$ is a real function. The direct construction of $\alpha$ from $\lambda$ using (10), however, cannot guarantee the non-negative constraint $a_j \geq 0$ for $j \neq 0$. Our approach is to expand $\lambda$ to $\lambda_c$ in a greater dimension:

$$\lambda \subset \lambda_c.$$

Denote the dimension of $\lambda_c$ by N and $\lambda$ by D with $N > D$. For convenience, let us call the original D eigenvalues in $\lambda_c$ effective, and the rest of the newly added $(N-D)$ eigenvalues noneffective. According to (10), in principle the construction of $\alpha$ is solely dependent on $\lambda_c$ and independent of $\psi_c$. Hence, from (4) and (8) one can completely eliminate the effect of noneffective eigenvalues on both $P_c(\omega)$ and $F_c(x)$ simply by assigning the corresponding $\psi_l$'s equal to zero in $\psi_c$.

With extra $(N-D)$ dimiesions, not only can one arbitrarily design $(N-D)$ noneffective eigenvalues, but one can also selectively position the D effective eigenvalues in $\lambda_c$. According to $$\alpha = \frac{1}{\sqrt{N}} \lambda_c F,$$

both expanding eigen-space and positioning effective-eigenvalues play important roles in the construction of $\alpha$. As a result, a great freedom is introduced to the selection of $\alpha$ from $\lambda$ under the non-negative constraint. With $\lambda_c = [\lambda_0, \lambda_1, \ldots, \lambda_{N-1}]$, denote the position of D effective eigenvalues in $\lambda_c$ by index vector $\underline{i}$:

$$\underline{i} = [i_1, i_2, \ldots, i_D] \text{ with } i_1 \in \{0, 1, \ldots, N-1\}, \forall 1.$$

That is $\lambda_{il} \in \lambda$ if $\in \underline{i}$. Hence, we have two options in the design of $\alpha$ by $\lambda$: expanding the eigen space from D to N and adjusting the indices $\underline{i}$ of $\lambda$ in $\lambda_c$. Solution $\alpha$ is not unique with respect to each given $\lambda$. For instance, we construct a closed form solution of $\alpha$ when $\lambda$ contains only a single real eigenvalue or a pair of complex conjugate eigenvalues. $\alpha$ by two positive elements, described by $\alpha = [a_0 0, \ldots, a_{k1} 0, a_{k2}, \ldots 0]$ with $a_0 = -a_{k1} - a_{k2}$. The subscripts $k_1$ and $k_2$ are the index of the two elements in $\alpha$. For simplicity, assume $k_1=1$ and $k_2=N-1$, and so we get $$\alpha_k = \quad (11)$$

$$\frac{1}{2} \left\{ \frac{-\text{Re}\{\lambda_1\}}{1-\cos(2\pi l/N)} \pm \frac{\text{Im}\{\lambda_1\}}{\sin(2\pi l/N)} \right\}, \forall l \text{ at } k=1, N-1$$

where the sign $\pm$ is taken as plus at $k=1$ and minus at $k=N-1$. Of course, one can determine $a_{k1}$ and $a_{k2}$ from a desired single effective eigenvalue $\text{Re}\{\lambda_i\}$ and $\text{Im}\{\lambda_i\}$, subject to $a_{k1}, a_{k2} \geq 0$. from $\tan(\pi i/N) = [1-\cos(2\pi i/N)]/\sin(2\pi i/N)$, we obtain, for $a_1 a_{N-1} \geq 0$, $$\frac{-\text{Re}\{\lambda_i\}}{\text{Im}\{\lambda_i\}} \geq |\tan(\pi i/N)|$$

In our definition, $\text{Re}\{\lambda_i\} < 0$ and $\text{Im}\{\lambda_i\} > 0$. With $\omega_i = \text{Im}\{\lambda_i\}$ for central frequency and $B_i = -2\text{Re}\{\lambda_i\}$ for half-power bandwidth, the above bound becomes $$B_i \geq 2|\tan(\pi i/N)|\omega_i \quad (12)$$

Under this bound, one can always used (11) to construct $\alpha$ from any single effective eigenvalue $\lambda_i$, $\forall i$. For each given N, this bound sets a lower limit on the bell bandwidth at each central frequency. In other words, the circulant size N must be sufficiently large for a narrowband bell to appear in the high-frequency band. To minimize N, one should always choose i=1 for the eigenvalue index. From the viewpoint of queueing analysis, this bound may not be stringent since the queueing performance is dominated by low-frequency input power, whereas the high-frequency input power can generally by neglected. When λ contains multiple eigenvalues, one can construct a CMPP for each individual real eigenvalue or pair of complex conjugate eigenvalues, and superimpose all the CMPP's into a single multi-dimensional CMPP, i.e., $$Q=Q_1 \oplus Q_2 \oplus \ldots \oplus Q_k, \gamma=\gamma_1 \oplus \gamma_2 \oplus \ldots \oplus \gamma_k$$

where $Q_i$ and $\gamma_i$ represent the transition rate matrix and input rate vector of the i-th individual CMPP. The total number of individual CMPP's is denoted by k, and define the state space of the $i^{th}$ CMPP by $N_i$ with i=1,2, ..., k. The overall state space of the superimposed CMPP then becomes:

$$N=N_1 \times N_2 \times \ldots \times N_k. \quad (13)$$

In practice, such a superposition approach fails due to its rapid state space explosion. In order to make the numerical queueing analysis feasible with CMPP input models, the overall input state space N must be kept small. The computational complexity of the existing queueing techniques is at least proportional to $N^3$. In practice, few numerical examples are found in the literature when the input state space exceeds 1,000. In the next subsection we introduce a programming approach to satisfy the non-negative constraint in the construction of α by adjusting the indices $\underline{i}$ while keeping the state space N small. In the second step, γ is derived from F(x). In principle, $P_c(\omega)$ is independent of the input phase vector $\theta_c$. Hence, one can arbitrarily tune $\theta_c$ in the design of γ to achieve $F_c(x) \approx F(x)$ under the non-negative input rate constraint $\gamma_j \geq 0, \forall j$. According to (8), each effective eigenvalue $\lambda_{l_i} \in \gamma_c$ contributes a discrete sinusoidal term to γ with its amplitude, radian frequency and phase angle denoted by $\sqrt{\psi_{l_i}}$, $2\pi l/N$ and $\theta_{l_i}$, respectively. In the following, a simplex search method is used to find $\theta_c$, which minimizes the overall absolute different between $F_c(x)$ and F(x). Our experience shows that when the number of effective eigenvalues is suffient, namely when there are a sufficient number of sinusoidals in (8), one can always find γ with its $F_c(x)$ virtually identical to F(x) of any form.

Matching Power Spectrum

Provided λ is of dimension D, our objective here is to find a solution α of dimension N under the non-negative constraint, such that $\lambda \in \lambda_c$. The solution if sought through the adjustment of (N,i), where N represents the dimension of $\lambda_c$ and $\underline{i}$ identifies the position of λ in $\lambda_c$. For each selected (N, $\underline{i}$), we use a linear programming (LP) method to find a solution. If no solution exists, which can be verified within finite steps, we adaptively change the eigenvalue indices $\underline{i}$ and gradually expand dimension N, until a solution α is found. Since CMPP is stationary, one of the effective eigenvalues in $\lambda_c$ must be zero, denoted by $\lambda_0$. This is guaranteed under the condition $a_0=-\Sigma_{k=1}^{N-1} a_k$ in (10). Also, since the solution α is real, a complex $\lambda_j$ must be the conjugate of $\lambda_{N-j}$. Correspondingly, we have $\psi_j=\psi_{N-j}$ i $\psi_c$ if $\lambda_j$ and $\lambda_{N-j}$ are complex conjugate. In other words, only one complex effitive eigenvalue in each conjugate pair needs to be taken into account in the construction of α. For simplicity, we consider only those effective eigenvalues $\lambda_j$'s with Im{$\lambda_j$}≥0 in $\lambda_c$, including all zero and real eigenvalues. Assume M such effective eigenvalues, whose indices are denoted by $\underline{i}'=\{i_1, i_2, \ldots, i_M\}$ with $i_1=0$ and $\underline{i}' \subseteq \underline{i}$. Obviously, $\underline{i}$ can be directly constructed from $\underline{i}'$ because the indices of conjugate eigenvlaues are fixed by their counterpart.

For each given (N,$\underline{i}'$), one can write from (6)

$$\begin{cases} \lambda_j = \sum_{k=0}^{N-1} \alpha_k W^{jk} & \text{for } j = i_2, \ldots, i_M, \\ \alpha_0 = -\sum_{k=1}^{N-1} \alpha_k & \text{for } j = i_1 = 0, \\ \alpha_k \geq 0 & \text{if } k = 1, \ldots, N-1, \end{cases} \quad (14)$$

with $$W^{jk} = \cos(2\pi jk/N) + \sqrt{-1} \sin(2\pi jk/N).$$

with $$W^{jk}\cos(2\pi jk/N)+\sqrt{-1}\sin(2\pi jk/N).$$

Only the M effective eigenvalues in $\lambda_c$ are used in (14) since the remaining (N–M) eigenvalues are either fixed by their conjugate, or non-effective and thus can be arbitrarily assigned. Define $$x = [-\alpha_0, \alpha_1, \ldots, \alpha_{N-1}]^T,$$
$$b = [0, -Re\{\lambda_{i2}\}, Im\{\lambda_{i2}\}, \ldots, -Re\{\lambda_{iM-1}\}, Im\{\lambda_{iM-1}\}]^T,$$

$$A = \begin{bmatrix} -1 & 1 & 1 & \ldots & 1 \\ 1 & -C_{i_2,1} & -C_{i_2,2} & \ldots & -C_{i_2,N-1} \\ 0 & S_{i_2,1} & S_{i_2,2} & \ldots & S_{i_2,N-1} \\ \cdot & \cdot & \cdot & & \cdot \\ \cdot & \cdot & \cdot & & \cdot \\ \cdot & \cdot & \cdot & & \cdot \\ 1 & -C_{i_M,1} & -C_{i_M,2} & \ldots & -C_{i_M,N-1} \\ 0 & S_{i_M,1} & S_{i_M,2} & \ldots & S_{i_M,N-1} \end{bmatrix},$$

with $C_{j,k} \overset{def}{=} \cos(2\pi jk/N)$ and $S_{j,k} \overset{def}{=} \sin(2\pi jk/N)$. One can rewrite (14) by $$Ax=b \text{ and } x \geq 0. \quad (15)$$

Note that the solution x may not exist. If it exists, x will not be unique because the rank of A is less than N. (In (15) we assume all the effective eigenvalues are complex. When $\lambda_{i_j}$ is real the row associated with $S_{j,k}, \forall k$, in A is removed.)

In order to find a solution x for a given (N,i'), let us transform (15) into a standard linear programming problem:

$$\text{Minimize } cx \text{ subject to } Ax=b \text{ and } x \geq 0. \quad (16)$$

The objective function here is introduced simply because many LP tools requires it to find a solution. Since the solution is not unique, one may change the row vector c to construct different circulants. Because the solution set of LP is convex, new solutions can always be generated by using a linear combination of existing solutions. All the solutions have the same power spectrum, which is determined by the original input set (λ, ψ). They only differ by their higher order statistics, which have been found to be negligible in queueing analysis [2]. For simplicity, we take c=[1, 1, ..., 1]. The revised simplex method, which is able to determine the solution existence in finite steps, is used to solve (16). FIG. 6 shows a block diagram for construction of α from λ. The index vector $\underline{i}'$ is adaptively changed in the search of a feasible solution α at each given N. If no feasible solution is obtained after a finite number of $\underline{i}$ adaptations, we need to properly expand N and then start the next cycle of $\underline{i}'$ adaptations. The whole process of adapting $\underline{i}'$ and expanding N is repeated until a feasible solution is found. The size of the solution set expands rapidly with N. Obviously, the computation time to solve $\alpha$ depends on the design of the $\underline{i}'$ adaptation scheme.

In the worst case, one can implement a complete index search to find $\alpha$ at each given N, which is definitely time consuming (especially when M or N is large). On the other hand finding an optimal $\underline{i}'$ adaptation scheme is difficult since we do not have general knowledge of $\underline{e}'$ distribution for solutions. By optimal, we means that $\alpha$ can be found from $\lambda$ by a minimum number of $\underline{i}'$ adaptations. As we have found, the performance of an $\underline{i}'$ adaptation scheme is strongly dependent on the distribution of effective eigenvalues, i.e., a scheme found to work better than other schemes for certain $\lambda$'s may not be so for other $\lambda$'s. In practice, the effective eigenvalues can change significantly depending on multimedia traffic characteristics.

In our design, we assume that all the elements in $\underline{i}'=\{i_1, i_2, \ldots, i_M\}$ must be arranged in ascending order, i.e., $i_j > i_k$ iff $j > k$, such as $\{0, 1, 4, 7, 10, \ldots\}$, $\{0, 2, 4, 8, 11, \ldots\}$ and so on.

Note that we always have $i_1=0$ for the normalization. Define the norm of $\underline{e}'$ by $|\underline{i}'|=\Sigma_{l=1}^{M} i_l$. Hence, the minimum norm is equal to $\Sigma_{l=2}^{M}(l-1)$ and maximum equal to $\Sigma_{l=2}^{M}(N-l+1)$. Our index search starts with the minimum norm, i.e., $\underline{i}'=\{0, 1, 2, \ldots, M-1\}$, then changes the norm incrementally until a feasible solution $\alpha$ is obtained or the maximum allowable number of adaptations is reached. At each given norm, a complete $\underline{i}'$ search will be conducted. There are two advantages to this scheme. First, our study shows a fundamental limit on the construction of circulants for small $$\left| \frac{Re\{\lambda_{il}\}}{Im\{\lambda_{il}\}} \right|'s,$$

namely, when narrowband bells appear in $P(\omega)$. Especially in the single effective eigenvalue case, (12) indicates that a narrowband bell is more difficult to construct with a large index $i_l$ than with a smaller one. Similarly many cases, tried with different combinations of effective eigenvalues, solution $\alpha$ is more likely to be found with small $|\underline{i}'|$'s than with larger ones. Secondly, the number of possible $\underline{i}'$ adaptations at each given norm $|\underline{i}|$ increases rapidly with the size of the norm. Hence, it is more computationally efficient to start the adaptations with small norms.

For example, consider six pairs of complete effective eigenvalues, assigned by $$\lambda=\{0, -1\pm 5i, -3\pm 10i, -6\pm 15i, -12\pm 20i, -15\pm 25i, -18\pm 30i\},$$

where the zero eigenvalue is inherent for the normalization and hence is not counted. As above mentioned, one can construct an individual CMPP for each eigenvalue pair. The corresponding minimum state space $N_l$ for each of them, as found by (12) at $i=1$, is equal to 16, 11, 8, 6, 6, 6, respectively. If we take only the first M pairs in the above eigenvalue set for the construction of $\lambda$, the overall state space of the superimposed CMPP will be equal to $N_1 \times N_2 \times \ldots \times N_M$, which can become extremely large as seen in Table 1 for M=1, 2, ..., 6. In contrast, one can use the LP method to construct a single CMPP with much smaller state space, e.g., 83 versus 304,128 at M=6 as found in Table 1. The number of adaptations and the selected $\underline{i}'$ at each given M are also provided in Table 1. Clearly, one can effectively eliminate the state space explosion by using the LP method to construct a single CMPP.

The above proposed index adaptation scheme has been successfully used in most applications which we have encountered in our research, including more than one thousand cases studied in Section 4. In our experience with this scheme, some difficulty may arise when the traffic power is well separated into high and low frequency regions. In most such cases, however, the eigenvalues associated with high frequency power can be neglected (i.e. filtered out) because the queueing performance is largely dominated by the low frequency input statistics [2]. Once the solution $\alpha$ is

TABLE 1

State Space comparison between superimposed CMPP's and single CMPP generated by LP method.

| no. eff. eigenvalues | no. of adaptations | feasible $\underline{i}'$ | N (LP method) | N (super-position) |
|---|---|---|---|---|
| M = 1 | 1 | 0 1 | 16 | 16 |
| M = 2 | 1 | 0 1 2 | 23 | 176 |
| M = 3 | 1 | 0 1 2 3 | 28 | 1,408 |
| M = 4 | 70 | 0 2 4 6 7 | 62 | 8,448 |
| M = 5 | 250 | 0 2 4 6 7 9 | 68 | 50,688 |
| M = 6 | 982 | 0 2 4 6 7 9 11 | 83 | 304,128 | obtained, we need to construct $\psi_c$ from $\psi$. The only constraint of using CMPP is that $\psi_c$ has to be positive real in the construction of $P_c(\omega)$, whereas $\psi$ can be complex for general $P(\omega)$. If $\psi$ is positive read, $P_c(\omega)$ will be able to match with $P(\omega)$ exactly. This is simply achieved by $\psi \subset \psi_c$ in which all the newly added non-effective $\psi_l$'s must be zero. Otherwise, one can obtain $\psi_c$ from $(\lambda, \psi)$ using nonnegative least square method to minimize $\int_0^\infty |P(\omega)-P_c(\omega)|^2 d\omega$. According to (4), $P(\omega)$ is constructed from $(\lambda,\psi)$ and so $P_c(\omega)$ is from $(\lambda_c, \psi_c)$.

Many alternative ways are available to improve the above stated power spectral matching technique, which comprises the following steps:

a. using parametric signal processing methods such as Prony, MUSIC and ESPRIT, known as a class of eigenvalue-based algorithm, to characterize second order statistics of traffic by $(\lambda, \psi)$;

b. adjusting and expanding $(\lambda, \psi)$ to $(\lambda, \psi)$ to $(\lambda_E, \psi_E)$, where $\psi$ can be complex while $\psi_E$ must be real and non-negative, to minimize the difference between the power spectrum $P(\omega)$ of $(\lambda,\psi)$ and the power spectrum $P_E(\omega)$ of $(\lambda_E, \psi_E)$;

c. identifying a set of key eigenvalues, $\lambda_{key} \subset \lambda_E$, by eliminating those bell components either in the high frequency band or with negligible power, in order to reduce the complexity;

d. expanding eigenspace from $\lambda_{key}$ to $\lambda_c$ with $\lambda_c$ with $\lambda_c \supset \lambda_{key}$ by introducing noneffective eigenvalues, in order to find a solution $\alpha$ of a discrete Fourier transform problem $$a = \frac{1}{\sqrt{N}} \lambda_c F$$

subject to $\alpha_j \geq 0$ for $j > 0$ and $\alpha_0 = -\Sigma_{j=1} N-1 \alpha_j$;

e. transforming the above problem of finding a into a linear programming problem under the condition of $\lambda_{key}$;

f. adaptively changing the indices of the key eigenvalues in $\lambda_c$ and/or gradually expanding the dimension of $\lambda_c$, until a solution $\alpha$ is found;

g. obtaining several solutions of $\alpha$ until finding the one with a reasonable dimension;

h. finally, using the resulting $\lambda_c$ from the solution $\alpha$ to find a power vector $\psi_c$ that minimizes the difference between the original $P(\omega)$ of $(\lambda,\psi)$ and the constructed $P_c(\omega)$ of $(\lambda_c,\psi_c)$.

Matching Rate Distribution

In this subsection we compose an input rate vector $\gamma$ to match with the original input rate cumulative distribution function $F(x)$. $F(x)$ can be either a continuous or discrete function, collected from a real data sequence (histogram) or expressed in analytical form. In contrast, $F_c(x)$ must be a piecewise multi-step incremental function, which jumps by $1/N$ at each individual value of $x \in \gamma$ in ascending order, as defined in (9). This is because $\gamma$ is an equal-probability rate vector with $Pr(\gamma k) = \pi_k = 1/N$, $\forall k$.

In order for $F(x)$ to be matched by $F_c(x)$, we need to discretize, or re-discretize, $F(x)$ by partitioning the range of $x$ into a set of N equal-probabilty rates. FIG. 7 shows such a partition of input rate function $F(x)$. The partitioned $F(x)$ is denoted by $\gamma'=[\gamma_1', \gamma_2', \ldots, \gamma_{N-1}']$ in ascending orde with $Pr(\gamma_k')=1/N$, $\forall k$. Obvioiusly, when N is sufficiently large, one can have $\gamma'$ arbitrarily close to the original $F(x)$. It is found that taking N=100 is sufficient in most cases in our study. In other words, once $N \geq 100$, the queue and loss performance are insensitive to the selection of N is distribution matching. $\gamma$ is sorted out in ascending order and the sorted $\gamma$ is denoted by $\gamma_p=[\gamma_{P0}, \gamma_{P1}, \ldots, \gamma_{P_{N-1}}]$, subject to $\gamma_{Pi} \leq \gamma_{Pk}$ with index $i<k$. The distribution matching can therefore be formulated as a minimization problem:

$$\min_{\theta_i} \frac{1}{N} \sum_{k=0}^{N-1} |\gamma_k' - \gamma_{P_k}|, \tag{17}$$

$$s.\ t.\ \gamma_{P_k} \geq 0, \quad k.$$

According to (8), $\gamma$ can only be tuned by the phase vector $\theta_c$, whereas $(\psi_c, \underline{e}, \overline{\gamma}, N)$ are already fixed by power spectral matching. Further, only those phase angles associated with the effective eigenvalues, i.e., $\theta_{i_l}$'s with $i_l \in \underline{i}$, $\forall l$, have an impact on distribution matching. This is because $\psi_{i_l}=0$ if $i_l \notin \underline{i}$. We then get $\theta_l$ iff $l \in \underline{i}$, $\forall l$. The sorting in (17) is a non-linear operation and the objective function (17) may not be differentiable. Therefore, to solve (17) the Nelder-Meade simplex search method, which is a direct search method without requirement of gradients or other derivative information, is selected Our numerical study shows that the above scheme is highly stable in finding a solution $\theta_i$ for the distribution matching $F_c(x) \approx F(x)$. The solution $\theta_i$ is not unique. The matching error is measured by $$\epsilon_d = \frac{1}{\gamma N} \sum_{k=0}^{N-1} |\gamma_k' - \gamma_{P_k}|, \tag{18}$$

which is dependent on the starting point of $\theta_i$ for each given (N, M, F(x)). Obviously, the matching error $\epsilon_d$ can always be reduced as M or N increases. In most cases, we found $\epsilon_d \leq 3\%$ ounce $N \geq 100$ and $M \geq 3$; such a small estimation error has a negligible impact on the queue length and loss rate performance. In addition, our study indicates the $\epsilon_d$ tends to be relatively insensitive to the staring point of $\theta_i$. For instance, let us consider $F(x)$ to be a convoluted binomial distribution function and choose 100 randomly selected staring point $\theta_i$. FIG. 8 shows the histogram of the collected matching errors with N=100 and M=3. All the matching errors are less than or equal to 3%, most of which are in the range of 2% to 2.5%.

Many alternative ways are available to improve the above stated rate distribution matching technique, which comprises the following steps:

a. discretizing (rediscretizing) $F(x)$ by partitioning the range of $x$ into a set of N equal-probability rates, denoted by $\gamma'$ in ascending order;

b. finding $\gamma$ by taking discrete Fourier transform, $\gamma=\sqrt{N}\beta F$, subject to $\gamma_j \geq 0$, $\forall_j$ with $\beta_j=\sqrt{\psi_j}e^{\sqrt{-1}\theta_j}$, with respect to each selected $\theta_c$ for the given $\psi_c$;

c. adjusting $\theta_c$ to find $\gamma$ that will minimize the difference between the original distribution function $F(x)$ of $\gamma'$ and the constructed $F_c(x)$ of $\gamma$, which can be formulated into a minimization problem: $\min_{\theta_c} ||\gamma'-\gamma_p||$ subject to $\gamma_p \geq 0$ where $\gamma_p$ is a sorted vector of $\gamma$ in ascending order;

d. obtaining several solutions of $\theta_c$ until finding the one which gives an acceptable matching error;

e. further improving the matching result by readjusting the power of noneffective eigenvalues in $\psi_c$, which are originally set to zero, without causing significant impact on the power spectral matching;

f. achieving the perfect distribution matching if desired by simply letting $\gamma_p=\gamma'$, which in some degree will alter the power vector $\psi_c$ without changing the phase vector $\theta_c$ obtained in step d, at the sacrifice of introducing extra power spectral matching errors;

g. dividing $(\psi_c,\theta_c)$ into two parts (if desired): $(\psi_l,\theta_l)$ is association with the low frequency power and $(\psi_h, \theta_h)$ in association with the high frequency power, such that one can use $(\psi_l,\theta_l)$ to match the input rate distribution in the low frequency band and $(\psi_h,\theta_h)$ to match the input rate distribution in the high frequency band.

Software Architecture

FIGS. 9 and 10 show a block diagram of the software design for the invented method of traffic statistical matching. The following describes the basic function of each individual block. Block 101 accepts three types of input traffic: (a) a real finite traffic sequence sampled at a constant time interval $\Delta t$, (b) an MMPP analytical model described by transition matrix Q and input rate vector $\gamma$, or (c) input statistical functions $P(\omega)$ and $F(x)$. If the input is a real sequence, one can use any well-known DSP methods to collect its rate autocorrelation function $R(n)$ and histogram $h(x)$. If the input is an MMPP model, one can use standard analytical techniques to derive the corresponding $R(n)$ and $h(x)$.

Block 102 uses standard eigenvalue-based parametric signal processing methods, such as Prony, MUSIC and ESPRIT to express the sampled correlation function $R(n)$ by the following analytical form, $$R(n)=\Sigma_{l=1}^L \psi_l e^{\lambda_l |n| \Delta t}, n=0,1,\ldots, n_s-1,$$

where both $\Delta t$ and $n_s$ are determined from the traffic dynamic properties. Denote $R(n)$ by $(\lambda,\psi)$.

Block 103 first takes the Fourier transform of $R(n)$ to derive the continuous power spectrum $P(\omega)$, which is then discretized into the following form:

$$P(m) = \sum_{l=0}^{L} \frac{-2\psi_l \lambda_l}{\lambda_l^2 + (m\Delta\omega)^2}$$

with $\Delta\omega=2\pi/N_s/\Delta t$ and $m=0,1,\ldots,N_s-1$. $N_s$ is the number of samples in power spectrum in the frequency interval $[0,2\pi/\Delta t]$.

Block 104 expands the eigenvalue basis from $\lambda$ to $\lambda_E$, $\lambda \subset \lambda_E$, by introducing additional eigenvalues which can be generated by various interpolations of the existing $\lambda$. Such as expansion is needed because $\psi$ of measured $P(\omega)$ is generally complex but $\psi$ of constructed $P_c(\omega)$ for circulant must be nonnegative real.

Block 105 applies the nonnegative lease square method to find $\psi_E$ which will minimize the mean square error between $P(m)$ and $P_c(m)$, where $P_c(m)$ is the discrete version of $P_c(\omega)$ expressed by $$P_c(m) = \sum_{k=1}^{L'} \frac{2\psi_{E_k}\lambda_{E_k}}{\lambda_{E_k}^2 + (m\Delta\omega)^2}$$

on basis of $\lambda_{Ed} \in \lambda_E$ and $\psi_{Ek} \in \psi_E$, where L' is the expanded eigenspace.

Block 106 selects a set of key eigenvalues, $\lambda_{key} \subset \lambda_E$. the importance of each eigenvalues in $\lambda_E$ can be measured either by its relative power percentage in $\psi_E$, or by its relative weighted power percentage based on the weighting function $$\frac{1}{|\lambda_{E_k}|} .$$

The selection of key eigenvalues by the weighted power gives high priority to the bell components located in the low frequency band. M such key eigenvalues will be selected and denoted by $\lambda_{key} \subset \lambda_E$ The parameter M is adjustable and preset by user.

Blocks 107, 108 and 109 search for the solution $\alpha$ by linear programming methods under the condition of the key eigenvalues $\lambda_{key}$, the circulant dimension N and the key eigenvalue indices $\underline{i}'$, as formulated by (15) and (16). The feasibility of solution $\alpha$ is verified in finite steps using the linear programming method. If no feasible solution exists, the indices $\underline{i}'$ will be adapted by Block 108. If no feasible solution is found after a finite number of $\underline{i}'$ adaptations, the circulant dimension N will be gradually increased. Based on each new N, the solution search will start all over again by the adaptation of $\underline{i}'$, until a final solution is obtained. Many alternative index adaptation schemes can be selected in Block 108. One of them is described in the first section. Blocks 110 and 111 first normalize the histogram h(x) and then derive the corresponding cumulative rate distribution function F(x).

Block 112 first constructs the transition rate matrix Q of the circulant from the solution $\alpha$ obtained in Block 109 and then expresses all the eigenvalues of Q, by $\lambda_c$ with $\lambda_{key} \subset \lambda_c$. Block 113 re-estimates the power factor $\psi_c$ to minimize the mean square eror between the measured P(m) and the constructed $P_c(m)$. This step will further reduce the matching error since the minimization is designed on the expanded eigenvalue basis $\lambda_c$.

Block 114 identifies a subset of eigenvalues $\lambda_{eff} \subset \lambda_c$, whose power factors in $\psi_c$ are nonzero, so-called the effective eigenvalues. The corresponding power vector is then denoted by $\psi_{eff} \subset \psi_c$. The indices of the effective eigenvalues in $\lambda$ are represented $\underline{i}_{eff}$, the so-called index vector of $\lambda_{eff}$.

Block 115 applies (8) to construct an input rate vector $\gamma_\alpha$ from the given conditions N, $\psi_{eff}$ and $\underline{i}_{eff}$, at each adaptively changed phase vector $\theta_{eff}$. Note that each effective eigenvalue in $\lambda_{eff}$ contributes a sinusoidal term to the input rate vector $\gamma_\alpha$, and the distribution matching is achieved through the adaptation of the phase vector $\theta_{eff}$.

Block 116 sorts the input rate vector $\gamma_\alpha$ in ascending order. The sorted $\gamma_\alpha$ is denoted by $\gamma_p$. The distribution of the CMPP, $F_c(x)$, can then be expressed as a piecewise multi-step incremental function, which jumps by 1/N at each individual input rate $x \in \gamma_p$. Block 117 discretizes F(x), or rediscretizes F(x) if it is already in discrete form, by partitioning the entire range of input rate x into a set of N equal probability rates, denoted by $\gamma'$. Such a partitioning process is described in FIG. 7. Block 118 calculates the mean square error between F(x) and $F_c(x)$, i.e., $\|\gamma_p - \gamma'\|$. The Nelder-Meade simplex search method is then applied to find the next adapted phase vector $\theta$ which will lead to the minimization of the mean square error. Block 119 checks the mean square error $\|\gamma_p - \gamma'\|$. If the error satisfies the present criterion or distribution matching, Block 120 will be executed. Otherwise, Block 115 will be called again with the newly adapted phase vector $\theta_{eff}$ for the next selection of $\gamma_p$.

Block 120 saves the final solution $\gamma_\alpha$, which is generally denoted by $\gamma$.

Queueing Analysis

Consider a finite buffer system with MMPP input; such a system is typically modeled by a quasi-birth-death (QBD) process. The QBD process, regarded as a general and useful stochastic model for queueing analysis, has the features of Markov modulated arrival process, Markov modulated service process, finite buffer capacity, and multi-level overload control. Define the state space of a finite QBD process in two dimensions with N phases and K levels. In queue modeling, each phase represents a state of a Markov chain which modulates the arrival and service processes, while each level corresponds a to a buffer content. The Folding-algorithm is computational method which was developed in [3] for steady-state analysis of finite QBD processes with level-dependent transitions. The algorithm exploits the QBD structure to diminish buffer-induced complexity. The time and space complexities of the Folding-algorithm for QBD steady-state analysis are $O(N^3 \log_2 K)$ and $O(N^2 \log_2 K)$, respectively. In contrast, a direct application of the block Gaussian elimination will yield a time and space complexity of $O(N^3 K)$ and $O(N^2 K)$.

The steady-state analysis of a QBD process entails obtainging a solution vector x from the linear equation xP=O, where P is the generator matrix of the QBD process. The Folding-algorithm operates in two phases: reduction (fold) and expansion (unfold). In the reduction phase, the original K-level block tri-diagonal matrix, P, is reduced to one-level matrix by a sequence of permutation-reduction steps. In each step, the matrix size is reduced by half but the matrix structure is kept in the block tri-diagonal form. The finally reduced one-level matrix is solved to obtain a boundary solution vector. The expansion phase is a reverse process of the reduction phase to obtain a sequence of expansion factors. The solution vector x is then expressed as a simple product of the boundary solution vector and the expansion factors. The algorithm is direct and stable with no restrictions on input and service Markov chains.

In this invention, we introduce a generalized Folding-algorithm for transient and spectral analyses of a finite QBD process. As we will show, both transient and spectral analyses of a QBD process entail the solution of xP=a, where a is a boundary condition vector. Hence, in the reduction phase the vector a is to be permuted and reduced along with that of the matrix P. Since the vector reduction takes much less computation time and storage space than the matrix reduction,. the increased complexity by such a generalization is negligible.

Transient Analysis

Transient analysis is essential for system designers to understand the time-varying characteristics of queues, especially during congestion periods. There are two main subjects in transient queueing analysis. One is to find the moments of the queue length as functions of time, which helps us to understand how long it will take for the queue transient solutions to approach their steady-state limit. The other subject is the analysis of sojourn time behavior on a subset of the stationary queueing process, which is used to characterize the time behavior of blocking period, busy period, or overload period in queueing systems. It helps us to gain insight into the transient changes of the queueing delay under various control schemes, such as how long it will take to bring down an overloaded queueing process and what kind of control will be more appropriate.

Define the transition rate matrix of a finite transient QBD process by G. The probability of the sojourn time less than or equal to t in the transient QBD process, starting at each state, is then given by $[I-e^{Gt}]e$ where I is an identity matrix and $e=[1,\ldots 1]^T$ is a unit column vector. Taking the first derivative of $[I-e^{Gt}]e$ with respect to t, one can express the density function of the sojourn time by $-e^{Gt}Ge$. Thus the generating function of the sojourn time distribution is the Laplace transform of $-e^{Gt}Ge$, which is equal to $$[v(s)]^T = -(sI-g)^{-1}Ge, \qquad (19)$$

where v(s) is a row vector and $[\cdot]^T$ represents the transpose of $[\cdot]$. The mean sojourn time row vector is then given by the negative of the first derivative of v(s) at s=O: $\bar{v}=-v'(O)$, which leads
The overall means sojourn time is obtained by $\bar{v}\pi(O)$, wherein $\pi(O)$ is a probablity column vector of initial state. Similarly, the second moment sojourn time row vector is defined by $\underline{v^2}=v''(O)$, which for a given $\bar{v}$ leads to $$\overline{v^2}G^T = -2\bar{v}. \qquad (21)$$

the overall second moment sojourn time is equal to $\overline{v^2}\pi(O)$. In general, we have $$\overline{v^i}G^T = -i\overline{v^{i-1}} \qquad (22)$$

for the higher moment sojurn time. The sojourn time analysis of a finite QBD process therefore requires solving a linear equation of the following form $$xP=a, \qquad (23)$$

where P has the structure of block tri-diagonal form and a is a constant vector of nonpositive values. When $P=G^T$, we get $x=\bar{v}$ with $a=-e^T$ and $x=\overline{v^2}$ with $a=-2\bar{v}$.

The generalized Folding-algorithm provides us a fast computational method for sojourn time analysis of finite QBD processes.

Spectral Analysis

There are four random processes involved in a queueing system: input, queue, loss and output. Spectral analysis evaluates the time autocorrelation of these processes and cross-correlation among them (i.e., the second order statistics of a queueing system). Taking the Fourier transform of these time correlation functions, we derive the corresponding power spectral and coherence spectral functions in the frequency domain.

The state transition probability matrix in time interval t is described by $e^{Gt}$. Denote a QBD state in level j at phase k by (j,k). The transition probability from j,k) to (n,m) in time interval t is then defined by $[e^{GT}]_{(j,k),n,m)}$. Introduce two random processes x(t) and y(t) defined on the QBD state space. The cross-correlation function between x(t) and y(t+τ) will then be expressed by $$R^+_{xy}(\tau) = \sum_{j,k}\sum_{n,m} x(j,k)y(n,m)\,[e^{G\tau}]_{(j,k),(n,m)}\lambda_{j,k} \quad \tau \geq 0, \qquad (24)$$

$$R^-_{xy}(\tau) = \sum_{j,k}\sum_{n,m} x(j,k)y(n,m)\,[e^{-G\tau}]_{(n,m),(j,k)}\pi_{n,m} \quad \tau < 0,$$

where $\pi_{j,k}$ is the steady-state probability in state (j,k), i.e., $\pi_{j,k} \in \pi$.

Obviously, the direct computation of $R_{xy}^+(\tau)$ and $R_{xy}^-(\tau)$ requres the eigenvalue decomposition of G, which is infeasible because of the very large matrix size and also repeated eigenvalues. Rewrite (24) in vector/matrix form as $$R_{xy}^+(\tau)=(x\odot\pi)e^{G\tau}y^T\geq 0 \quad R_{xy}^-(\tau)=(y\odot\pi)e^{-G\tau}x^T \quad \tau<0 \qquad (25)$$

where $\odot$ denotes the element-by-element product of two vectors and T represents the transpose of vector or matrix. One can then show that the Fourier transform (25), i.e., the cross-power spectrum of x(t) and y(t+τ), becomes $$P_{xy}(\omega)=(y\odot\pi)(-Ij\omega-G)^{-1}x^T+[(x\odot\pi)(-Ij\omega-g)^{-1}y^T]^*, \qquad (26)$$

$[\cdot]^*$ denotes the complex conjugate of its argument. Let $$(y\odot\pi)(-Ij\omega-g)^{-1}=v(\omega)$$

$$(x\odot\pi)(-Ij\omega-G)^{-1}=u(\omega),$$

or $$v(\omega)(-Ij\omega-G)=y\odot\pi, \qquad (27)$$

$$u(\omega)(-Ij\omega-g)=x\odot\pi. \qquad (28)$$

Then (26) reduces to $$P_{xy}(\omega)=v(\omega)x^T+(u(\omega)y^T)^* \qquad (29)$$

The remaining computational challenge is to solve for u(ω) and v(ω). Once again we run into numerical problems if we attempt to invert (Ijω+G) because of the very large matrix size. However, because of the special QBD strcture of (Ijω+G), one can use the generalized Folding-algorithm to solve for (27) and (28) which are in the form of $xP=\alpha$ at each given ω. Define x and y on the QBD state space to represent the output rate, queue length, and loss rate processes, respectively. For simplicity, we consider a finite buffer system with MMPP input and a single exponential server, which is modeled by MMPP/M1/K queue. The average service rate is defined by μ and the average arrival rate by $\bar{\gamma}$. The Poisson arrival rate while in input phase k is denoted by γk. The power spectral functions of these processes are then characterized by output rate spectrum $P_o(\omega)$:

y=x with $x(j,k)=\mu(1-\delta_j)-\bar{\gamma}-L)$, $\forall j,k$, where $\delta_j=1$ at j=0 and zero elsewhere;

queue spectrum $P_q(\omega)$: y=x with $x(j,k)=j-\bar{q}, \forall j, k$;

loss rate spectrum $P_l(\omega)$: y=x with $x(j,k)=\gamma k\delta jK-L$, $\forall j,k$, where $\delta_{jk}=1$ at j=K and zero elsewhere;

input-output coherence $K_{io}(\omega)Lx(j,k)=\gamma k-\bar{\gamma}$ and $y(n,m)=\mu(1\delta_n)-(\bar{\gamma}-L), \forall j, k,n,m$.

It is necessary to center the processes (remove the DC component) in order for the computational method of the present invention to converge at frequencies near 0. This becomes intuitively clear when one consider that the DC term contributes an impulse, at zero frequency, to the Fourier transform. The DC term is $\bar{\gamma}-L$ for the output rate , $\bar{q}$ for the queue and L for the loss rate. Note that the actual output process is a point process, which is Poisson at rate μ when the buffer is nonempty. The input-output coherence function is defined by $$K_{io}(\omega) = \frac{|P_{io}(\omega)|}{\sqrt{P_i(\omega)P_o(\omega)}}, \quad (30)$$

where $P_i(\omega)$ is the input spectrum and $P_{io}(\omega)$ is the cross spectrum. The coherence function is a measure of linear relationship between two random processes. $K_{io}(\omega)$ near 1 indicates a strong linear relationship between input and output processes. Similarly, we can introduce the cross power spectral functions among input rate, queue length and loss rate.

Generalized Folding-Algorithm

Principle

Based on the Markov chain reduction principle, one can partition the states in xP=a so that $$[x_s, x_t] \begin{bmatrix} P_s & P_{st} \\ P_{ts} & P_t \end{bmatrix} = [a_s, a_t]. \quad (31)$$

Upon factorization, $$\begin{bmatrix} P_s & P_{st} \\ P_{ts} & P_t \end{bmatrix} = \begin{bmatrix} P_s & 0 \\ P_{ts} & P_t^* \end{bmatrix} \begin{bmatrix} I & P_s^{-1}P_{st} \\ 0 & I \end{bmatrix} \quad (32)$$

with $$P_t^* = P_t + P_{ts}(-P_s^{-1})P_{st}. \quad (33)$$

Since the second matrix factor in (32) is invertible, we further derive $$\begin{bmatrix} I & P_s^{-1}P_{st} \\ 0 & I \end{bmatrix}^{-1} = \begin{bmatrix} I & -P_s^{-1}P_{st} \\ 0 & I \end{bmatrix}.$$

Hence, $$[x_s, x_t] \begin{bmatrix} P_s & 0 \\ P_{ts} & P_t^* \end{bmatrix} = [a_s, a_s(-P_s^{-1})P_{st} + a_t], \quad (34)$$

which is equivalent to $$x_t P_t^* = a_s(-P_s^{-1})P_{st} + a_t \quad (35)$$

$$x_s = x_t P_{ts}(-P_s^{-1}) + a_s P_s^{-1}. \quad (36)$$

Equation (35) describes a typical reduction step, i.e., $$xP = a \Rightarrow x_t P_t^* = a_t^* \quad (37)$$

with $$a_t^* = a_t + a_s(-P_s^{-1})P_{st}, \quad (38)$$

where $x_t$ is a subset of the solution x. $-P_s^{-1}$ is strictly positive since it represents the average sojourn times. Since both $a_s$ and $a_t$ are non-positive $a_t^*$ must remain non-positive with increased magnitude. Similarly, the reduced $P_t^*$ remains a transition rate matrix with reduced diagonal magnitude (see [3]). Accordingly, (36) represents a typical expansion step, in which the solution of $x_s$ is uniquely determined by $x_t$. The general difficulty of the reduction from (P,a) to $P_t^*$, $a_t^*$) is to find $(-P_s)^{-1}$ in (33) and (38). For the QBD process, however, the time and space complexity of such a reduction operation is greatly simplified by the Folding-algorithm as described in the next subsection. For the steady-state analysis of a finite QBD process, we have a=0 and P=G as done in [3]. In contrast, the only additional computations required for the transient analysis are as follows:

● Take the reduction of a, along with that of P, based on (38); p1 ● Store the vector $a_s P_s^{-1}$ in each reduction for the construction of $x_s$ from $x_t$ in the expansion phase described by (36).

Consider a finite QBD process, which originally is stationary with its generator in the following standard block tri-diagonal form:

$$P_{orig} = \begin{bmatrix} A_0 & U & & & & \\ D & A & U & & & \\ & . & . & . & & \\ & & . & . & . & \\ & & & . & . & . \\ & & & D & A & U \\ & & & & D & A_1 \end{bmatrix}, \quad (39)$$

where $A_0$ and $A_1$ are the two boundary blocks, reflecting the transitions when the buffer is full or empty. A finite transient QBD process describes the random sojourn time spent on a subset of the original state space, hence its generator P is defined by a primary submatrix of $P_{orig}$. Without loss of generality, we assume P has the same structural form as $P_{orig}$, except that P must be a full rank matrix. This assumption is made for convenience to directly "copy" the stationary version of the Folding-algorithm to a transient one.

Basic Procedure

The basic procedure of the generalized Folding-algorithm is now described. Define P as a K-level transient Markov chain matrix and a as a K-level nonpositive constant vector. For simplicity, we assume $K=2^n$. The principle of the Folding-algorithm is to take n binary reduction steps to reduce $\{P,a\}$ of K-level size to $\{P_n,a_n\}$ of one level size, generating a finite sequence of matrices and vectors $$P_0 \rightarrow \ldots \rightarrow P_i \rightarrow P_{i+1} \rightarrow \ldots \rightarrow P_n, a_0 \rightarrow \ldots \rightarrow a_i \rightarrow a_{i+1} \rightarrow \ldots \rightarrow a_n.$$

At the beginning, we have $\{P_0,a_0\}=\{P,a\}$. Then in each step, a child pair $\{P_{i+1}, a_{i+a}\}$ is generated with only half the size of its parent $\{P_i,a_i\}$. After n steps, the size of $\{P_n,a_n\}$ will be reduced to one-level. Consider the $i^{th}$ reduction step. Let the parent matrix $P_i$ be represented by $$P_i = \begin{bmatrix} A_0^{(i)} & U^{(i)} & & & & \\ D^{(i)} & A^{(i)} & U^{(i)} & & & \\ & . & . & . & & \\ & & . & . & . & \\ & & & . & . & . \\ & & & D^{(i)} & A^{(i)} & U^{(i)} \\ & & & & D^{(i)} & A_1^{(i)} \end{bmatrix}, \quad (40)$$

where $A_O^{(i)}$, $A^{(i)}$, $A_1^{(i)}$, $U^{(i)}$ and $D^{(i)}$ are five building blocks in $P_i$. A key property of the reduction is that, by taking a proper block permutation on $P_i$, the child matrix $P_{i+1}$ will inherit the QBD structure from its parent matrix $P_i$. Assume $P_i$ has size 2l. The permutation on $P_i$ is defined by $$\begin{pmatrix} 0 & 1 & 2 & \ldots & 2k-1 & \ldots & 2j & \ldots & 2l-1 \\ 0 & l & 1 & \ldots & l-1+k & \ldots & j & \ldots & 2l-1 \end{pmatrix}, \quad (41)$$

$k=1,2,\ldots,l$ and $j=0,1,\ldots,l-1$. Upon the matrix permutation, for instance, the $(1,2)^{th}$ block moves to the $(1,1)^{th}$ position, the $(2j,2l-1)^{th}$ block moves to the $(j,2l-1)^{th}$ position, and so on. Taking the permutation and partition operations on $P_i$ leads to $$\tilde{P}_i = \begin{bmatrix} A_0^{(i)} & & & & U^{(i)} & & & \\ & A^{(i)} & & & D^{(i)} & U^{(i)} & & \\ & & \ddots & & & \ddots & \ddots & \\ & & & A^{(i)} & & & D^{(i)} & U^{(i)} \\ \hline D^{(i)} & U^{(i)} & & & A^{(i)} & & & \\ & D^{(i)} & \ddots & & & \ddots & & \\ & & \ddots & U^{(i)} & & & A^{(i)} & \\ & & & D^{(i)} & & & & A_1^{(i)} \end{bmatrix} \quad (42)$$

$$= \begin{bmatrix} P_s & P_{st} \\ \hline P_{ts} & P_t \end{bmatrix}.$$

Based on (33) we reduce $\tilde{P}_i$ to $P_{i+1}$ and obtain $$P_{i+1} = \begin{bmatrix} A_0^{(i+1)} & U^{(i+1)} & & & \\ D^{(i+1)} & A^{(i+1)} & U^{(i+1)} & & \\ & \ddots & \ddots & \ddots & \\ & & D^{(i+1)} & A^{(i+1)} & U^{(i+1)} \\ & & & D^{(i+1)} & A_1^{(i+1)} \end{bmatrix} \quad (43)$$

$P_{i+1}$ retains the original QBD structure form. The five building blocks in $P_{i+1}$ are recursively obtained from the building blocks in $P_i$ using the following formulae:

$A_0^{(i+1)} = A^{(i)} - D^{(i)} A_0^{(i)-1} U^{(i)} - U^{(i)} A^{(i)-1} D^{(i)}$, $A^{(i+1)} = A^{(i)} - D^{(i)} A^{(i)-1} U^{(i)} - U^{(i)} A^{(i)-1} D^{(i)}$, $A_1^{(i+1)} = A_1^{(i)} - D^{(i)} A^{(i)-1} U^{(i)}$, (44)

$U^{(i+1)} = -U^{(i)} A^{(i)-1} U^{(i)}$, and $D^{(i+1)} = -D^{(i)} A^{(i)-1} D^{(i)}$.

The initial five building blocks at $i=0$ are given by the original $A_0, A, A_1, U$ and $D$ in (39). In the last two steps, we get $$P_{n-1} = \begin{bmatrix} A_0^{(n-1)} & U^{(n-1)} \\ D^{(n-1)} & A_1^{(n-1)} \end{bmatrix} \text{ and } P_n = [A_1^{(n)}],$$

wherein each block is recursively obtained from (44). $P_n$ is the finally reduced, one block, transient Markov chain matrix. Refer to [3] for detailed operation of the P reduction. Along with the permutation-reduction of matrix $P_i$, we need to permute and reduce the corresponding vector $a_i$. Similarly, let $a_i$ be a vector of size $2l$ in blocks, denoted by $a_i = (b_0^{(i)}, b_1^{(i)}, b_2^{(i)}, b_3^{(i)}, \ldots, b_{2l-2}^{(i)}, b_{2l-1}^{(i)})$, (45)

wherein each block represents a vector of size N. Upon the permutation defined by (41), the vector $a_i$ shall be shuffled to the following form:

$\tilde{a}_i = (b_0^{(i)}, b_2^{(i)}, \ldots, b_{2l-2}^{(i)}, b_1^{(i)}, b_3^{(i)}, \ldots, b_{2l-1}^{(i)})$. (46)

Then taking the binary reduction operation on $\tilde{a}_i$ will generate the next child vector $a_{i+1}$, expressed by $a_{i+1} = (b_0^{(i+1)}, b_1^{(i+1)}, \ldots, b_{l-1}^{(i+1)})$. (47)

According to (38), one can readily obtain the following recursive formulae $$b_k^{(i+1)} = \quad (48)$$

$$\begin{cases} b_{2k+1}^{(i)} - b_{2k}^{(i)} A_0^{(i)-1} U^{(i)} - b_{2k+2}^{(i)} A^{(i)-1} D^{(i)} & \text{if } k = 0 \\ b_{2k+1}^{(i)} - b_{2k}^{(i)} A^{(i)-1} U^{(i)} - b_{2k+2}^{(i)} A^{(i)-1} D^{(i)} & \text{if } l-1 > k > 0 \\ b_{2k+1}^{(i)} - b_{2k}^{(i)} A^{(i)-1} U^{(i)} & \text{if } k = l-1. \end{cases}$$

Hence, the reduction of $a_i$ to $a_{i+1}$ involves only simple manipulations. The final reduction of $a_n$ will be a vector of one block size. The solution $x^{(n)}$ from $x^{(n)} P_n = a_n$ is called the boundary solution vector. It can be solved directly by any effective method. The expansion phase will then start with $x^{(n)}$, step by step, in the reverse order:

$x^{(n)} \to x^{(n-1)} \to \ldots \to x^{(i+1)} \to x^{(i)} \to \ldots \to x^{(1)} \to x$.

From (34) and (35) we knows that $x^{(i+1)}$ must be a partial solution of $x^{(i)}$, and so $x^{(n)} \in x^{n-1} \in \ldots \in x^{i+1} \in x^{(i)} \in \ldots \in x^{(1)} \in x$.

Since $P_{i+1}$ has half the size of $P_i$, $x^{(i+1)}$ must provide one half of the solution $x^{(i)}$.

Consider the $i^{th}$ expansion step. Recall that both $P_i$ and $a_i$ are first shuffled to $\tilde{P}_i$ and $\tilde{a}_i$ in the $(i+1)^{th}$ reduction step. Let $\tilde{x}^{(i)}$ represent the shuffled solution $x^{(i)}$, i.e., $\tilde{x}^{(i)} \tilde{P}_i = \tilde{a}_i$. Based on (34) and (42), one can see that the reduced solution vector $x^{(i+1)}$ must be the second half of $\tilde{x}^{(i)}$. Denote the complementary half by $x_c^{(i+1)}$, i.e., $\tilde{x}^{(i)} = [x_c^{(i+1)}, x^{(i+1)}]$. (49)

Then, from the reduction operation on $\tilde{x}^{(i)} \tilde{P}^{(i)} = \tilde{a}^{(i)}$, as described by (36), we have $x_c^{(i+1)} = -x^{(i+1)} P_{ts} P_s^{-1} + \tilde{a}_{ie} P_s^{-1}$, (50)

where both $P_{ts}$ and $P_s$ are defined in (42) based on the partition of $\tilde{P}_i$. $\tilde{a}_{ie}$ is the first half of $\tilde{a}_i$ in (46), consisting of the even-numbered elements. Again, assume $P_i$ has size $2l$. Let us further decompose $\tilde{x}^{(i)}$ in block form $x^{(i+1)} = [y_0^{(i+1)}, y_1^{(i+1)}, \ldots y_{l-1)}^{(i+1)}], x_c^{(i+1)} = [y_{0c}^{(i+1)}, y_{1c}^{(i+1)}, \ldots y_{(l-1)c}^{(i+1)}]$. (51)

(50) will then be equivalent to the following block operations $$y_{jc}^{(i+1)} = \quad (52)$$

$$\begin{cases} -y_0^{(i+1)} D^{(i)} A_0^{(i)-1} + b_0^{(i)} A_0^{(i)-1} & \text{for } j = 0 \\ -y_{j-1}^{(i+1)} U^{(i)} A^{(i)-1} - y_j^{(i+1)} D^{(i)} A^{(i)-1} + b_{2j}^{(i)} A^{(i)-1} & \text{else.} \end{cases}$$

Therefore, in the $i^{th}$ expansion step, first $x_c^{(i+1)}$ is computed from $x^{(i+1)}$, which is obtained in the previous expansion step; then $\tilde{x}^{(i)}$ is reshuffled to $x^{(i)}$. The reshuffling is the reverse process of the permutation defined in (41). As described by (52), only simple manipulations are involved in each expansion step. The final solution vector x will then be constructed, step by step, through the entire expansion phase.

FIG. 11 shows the level-transition diagram of the generalized Folding-algorithm at n=3. Let us summarize the operations required to solve xP=a. In the reduction phase, (44) and (49) are the two basic recursive formulae for the reduction of $\{P,a\}$ to $\{P_n, a_n\}$. The boundary solution vector $x^{(n)}$ will then be obtained by solving $x^{(n)}P_n=a_n$. In the expansion phase, (52) is the recursive formulae for the expansion $x^{(n)}$ to the final solution vector x. Note that the shuffling process in the reduction phase is implicitly carried out by (44) and (49), while the reshuffling in the expansion phase needs to be implemented explicitly. As compared to the original Folding-algorithm, the increase in time and space complexity by the generalization is negligible. This is mainly because the binary reduction of the $a_i$ vector takes much less compilation time and storage space than that of the $P_i$ matrix. Note that all the intermediate blocks involved in the reduction of $a_i$, as defined by (49), will be available from the reduction of $P_i$ in (44),(49) and (52) are to be carried out through the LU factored form of $A_0^{(i)}$ and $A^{(i)}$. Also indicted in [3], the stability of the P reduction process, as well as the stability of LU decomposition of $A^{(i)}$ in each step, are ensured by the Folding-algorithm. In our case, $a_i$ will remain nonpositive and increase in magnitude by each reduction. Since $-A^{(i)^{-1}}$ and $-A_0^{(i)^{-1}}$ are strictly positive and $D^{(i)}$ and $U^{(i)}$ are nonnegative, all subtractions in (49) will be replaced by additions. The algorithm will thus have superior error performance.

The time complexity in the i-th reduction step is about $8\frac{2}{3}N^3$ for (44). and $2^{n-i+1}N^2$ for (49), measured in FLOPs. One FLOP equals one ADD plus one MULTIPLY in floating point. The time complexity of the overall reduction phase is then given by $8\frac{2}{3}N^3\log_2 I + \Sigma_{i=1n} 2^{n-i+1}N^2$, which is upper bounded by $8\frac{2}{3}N^3\log_2 K + 2N^2 K$. According to (52), the time complexity of the overall expansion phase is $3N^2K$ FLOPs.

Extension to Arbitrary K

So far we have assumed $K=2^n$, such that the size of $P_i$, $a_i$ and $x^{(i)}$ in blocks is always even in each reduction step and expansion step. The extension of the algorithm to an arbitrary buffer size K is straightforward. One can always factor an arbitrary positive integer K uniquely as:

$$K=2^n \cdot (2m+1), \quad m, n=0,1,2,\ldots \quad (53)$$

If n>0, the first n steps of reduction and the last n steps of expansion will be exactly as previously described, since $\{P_i, a_i\}$ for $i=0,1,\ldots,n-1$ are all of even sizes and all $P_i$'s retain the original QBD structure as in (40). At the beginning of the $n^{th}$ step, $P_n$ will be of odd size 2 m+1. From then on, as shown in [3], the structure of $P_i$'s for i>n will change to the following form:

$$P_i = \begin{bmatrix} A_0^{(i)} & U^{(i)} & & & & \\ D^{(i)} & A^{(i)} & U^{(i)} & & & \\ & \ddots & \ddots & \ddots & & \\ & & D^{(i)} & A^{(i)} & U^{(i)} & \\ & & & D^{(i)} & A_1^{(i)} & U_b^{(i)} \\ & & & & D_b^{(i)} & A_b^{(i)} \end{bmatrix}, \quad (54)$$

where the three new boundary blocks, $A_b^{(i)}$, $D_b^{(i)}$ and $U_b^{(i)}$, are introduced by the permutation-reduction on an odd-sized $P_n$. In general, the permutation-reduction of $P_i$ of odd size 2 l+1 is implemented only on its first 2 l rows and first 2 l columns, leaving its last row and last column unchanged. Its permutation is represented by $$\begin{pmatrix} 0 & 1 & 2 & \ldots & 2k-1 & \ldots & 2j & \ldots & 2l-1 & 2l \\ 0 & l & 1 & \ldots & l-1+k & \ldots & j & \ldots & 2l-1 & 2l \end{pmatrix}, \quad (55)$$

with $k=1,2,\ldots,l$ and $j=0,1,\ldots,l-1$. The only difference from (41) is in supplement of the last non-permuted item. Therefore, in addition to the five basic block update given by (44), we have $$A_b^{(i+1)}=A_b^{(i)}, \quad D_b^{(i+1)}=D_b^{(i)}, \quad U_b^{(i+1)}=U_b^{(i)}. \quad (56)$$

Similarly for the permutation-reduction of $a_i$ of odd size 2 l+1, the reduced $a_{i+1}$ will be of size l+1 with its last block equal to the last block of $a_i$, i.e., $$b_l^{(i+1)}=b_{2l}^{(i)}. \quad (57)$$

The rest of the blocks in $a_{i+1}$ are updated by the original formula (49). Initially at the $n^{th}$ step, $P_n$ is in the form of (40), but will be re-labeled as in the form of (54) to reflect the forward structural change. The above reduction step repeats as long as $P_i$ is of odd size. For $P_i$ of even size 2 l, i>n, the permutation-reduction operation is carried out exactly as before. As a result, the four boundary blocks at the bottom will be updated by $$A_1^{(i+1)}=A^{(i)}-D^{(i)}A^{(i)^{-1}}U^{(i)}-U^{(i)}A_1^{(i)^{-1}}D^{(i)},$$
$$A_b^{(i+1)}=A_b^{(i)}-D_b^{(i)}A_1^{(i)^{-1}}U_b^{(i)},$$
$$D_b^{(i+1)}=-D_b^{(i)}A_1^{(i)^{-1}}D^{(i)},$$
$$U_b^{(i+1)}=-U^{(i)}A_1^{(i)^{-1}}U_b^{(i)}. \quad (58)$$

The remaining four basic blocks are obtained by the update formula (44). Correspondingly, $a_{i+1}$ will be updated by (49), except for its last two elements which are updated by $$b_{l-2}^{(i+1)}=b_{2l-3}^{(i)}-b_{2l-4}^{(i)}A^{(i)^{-1}}U^{(i)}-b_{2l-2}^{(i)}A_1^{(i)^{-1}}D^{(i)}, \quad b_{l-1}^{(i+1)}=b_{2l-1}^{(i)}-b_{2l-2}^{(i)}A_1^{(i)^{-1}}U_b^{(i)}. \quad (59)$$

In the expansion phase, if $P_i$ is of odd size 2 l+1, the expanded solution subvector $x_c^{(i+1)}$ defined in (51) will be exactly updated by (52). This is because the partition-permutation of $P_i$ in the reduction step has excluded its last row and last column, so based on (49) and (50) $x_c^{(i+1)}$ will not be affected by the three boundary blocks $A_b^{(i)}, D_b^{(i)}$ and $U_b^{(i)}$ in $P_i$. Of course, the reshuffling from $\tilde{x}^{(i)}=[x_c^{(i+1)}, x^{(i+1)}]$ to $x^{(i)}$ also needs to exclude the last element of $\tilde{x}^{(i)}$, as described by (55).

For $P_i$ of even size 2 l, the last element of $x_c^{(i+1)}$ will be updated by $$y_{(l-1)c}^{(i+1)}=-y_{l-2}^{(i+1)}U^{(i)}A_1^{(i)^{-1}}-y_{l-1}^{(i+1)}D_b^{(i)}A_1^{(i)^{-1}}+b_{2l-2}^{(i)}A_1^{(i)^{-1}}. \quad (60)$$

The update for the rest of elements remains unchanged, as defined in (52). The solution vector $\tilde{x}^{(i)}$ is then reshuffled to $x^{(i)}$ in the reverse form of (41).

The Folding-algorithm has also been applied to QBD processes with level-dependent transitions (see [3]. The level-dependent transitions reflect the underlying structure of various control policies to be implemented on a queueing system. One effective control technique is to regulate both arrival and service rates based on instantaneous buffer occupancy. The same approach applies to transient analysis with level-dependent transitions in P. One can therefore use the generalized Folding-algorithm to evaluate the first-passage time performance between any two levels of the controlled QBD system. Note that P is an NK×NK matrix, denoted by $P \in C^{NK \times NK}$. So far we have assumed that both a and x are row vectors with $a, x \in C^{1 \times NK}$. It is straightforward to generalize the above Folding-algorithm to solve $xP = a$ when $a, x \in C^{J \times M}$ for some integer $J \geq 1$. All three basic update formulae in (44),(49) and (52) should remain unchanged. The time complexity is then extended to $8\frac{2}{3}N^3\log_2 K + 2N^2KJ$ for the reduction phase, and $3N^2KJ$ for the expansion phase. At J=1, the generalized Folding-algorithm will have the same time complexity as the original one, equal to $O(N^3\log_2 K)$. Similarly, the space complexity of the generalized Folding-algorithm is basically unchanged and equal to $O(N^2\log_2 K)$.

In contrast, a direct application of the block Gaussian elimination at J=1 will yield a time and space complexity of $O(N^3K)$ and $O(N^2K)$. Perhaps more important than time and space complexity, the Folding-algorithm is much less prone to round-off errors than the block Gaussian elimination method. One reason is that the Folding-algorithm has only $\log_2 K$ iterations, while the block Gaussian elimination requires K iterations. Each iteration introduces a round-off error. The numerical stability of both methods is strongly affected by the accumulation of round-off errors in a sequence of iterations. That is why, as we have found, the block Gaussian elimination method can only be applied to a small buffer system. Of course, in the extreme case where the transitions change with each level (which is unlikely in a real system), the two methods become algorithmically equivalent.

Software Architecture

FIG. 12 shows the main flow chart of the software design for the generalized Folding-algorithm, comprising the reduction phase, the boundary solution operation and the expansion phase. The reduction phase consists of n steps; the size of (P,a) in each reduction step will be reduced by half (i.e., folded by shuffling as shown in FIG. 11) while keeping the original QBD structure unchanged, until deriving $(P_n, a_n)$ at the end of the reduction. The boundary vector $x^{(n)}$ will then be obtained upon solving the linear equation $x^{(n)}P_n = a_n$. The expansion phase consists of n steps. In the reverse order, the size of $x^{(n)}$ in each expansion step will be doubled (i.e. unfolded by reshuffling) until finding the full solution x. The detail operations in each of the reduction and expansion steps are described in FIG. 13. Hence, once the input CMPP model $(\alpha, \gamma)$, link capacity $\mu$ and buffer size K are provided, one can simply construct P and a and then use the generalized Folding-algorithm to derive the steady state, transient and spectral solutions of the queueing system as shown in the following sections.

A METHOD ACCORDING TO THE PREFERRED EMBODIMENT OF THE INVENTION

This section describes the basic functional block diagrams of the preferred embodiment of the present invention. It is noted that other embodiments may vary in some degree without departing from the spirit of the invention.

FIG. 14 shows the flow chart of the SMAQ main program which comprises four tool boxes: traffic input tool box, statistical matching tool box, queueing solution tool box and application tool box. In Block 201 the name of the program is displayed. In Block 202 system initialization occurs, including initializing the variables that are needed by the system. The main menu then appears which includes options for traffic input, statistical matching, queueing solutions, and applications.

FIG. 15 shows the functional block diagram of the traffic input tool box. The tool box accepts input traffic in any of the three different types: real finite sequence, analytical MMPP model or statistical functions $P(\omega)$ and $F(\chi)$. The tool box also allows traffic aggregation upon superposition of homogeneous/heterogeneous traffic streams of different types. The output of this tool box is the input power spectral function $P(\omega)$ and cumulative rate distribution function $F(\chi)$ in any form, which provides the input to the next statistical matching tool box. Consider video-on-demand as a major multimedia service in high speed networks. On example included in the preferred embodiment is the JPEG/MPEG video sequence of the movie *Star Wars*, collected by Bellcore, which is now available in the public domain, and has been widely used as a representative video-on-demand sequence. A special functional Block 213 can also be designed to extract video subsequences for video statistical analysis.

FIG. 16 shows the functional block diagram of the traffic statistical matching tool box. This tool box comprises three basic sequential steps: matching the power spectrum $P(\omega)$ in Block 218, constructing transition matrix Q in Block 219 and matching the distribution $F(\chi)$ in Block 220. Blocks 218–220 are performed sequentially. However, after matching in Block 220, each of Blocks 218–220 can be performed again, as necessary to adjust the statistical matching. In Block 218 for power spectral matching, the measured $P(\omega)$ is represented in analytical form by $(\lambda, \psi)$ based on the parametric signal processing method. In Block 219 for Q matrix construction after electing a set of key eigenvalues in $\lambda$, the solution Q (or $\alpha$) is obtained using the linear programming method, by adaptively changing the index vector i' and gradually expanding the input state space N. Once Q is obtained, one can minimize the mean square error between the measured $P(\omega)$ and the construed $P_c(\omega)$. In Block 219 for distribution matching, after partitioning the measured distribution function $F(\chi)$, the solution $F_c(\chi)$ (or $\gamma$) is obtained using the simplex search method by sorting the input rate vector $\gamma_\alpha$ and adaptively changing the phase vector $\theta_{eff}$. The operations necessary to perform the functions in Blocks 218–220 were described above. Other supporting functions in FIG. 16 are system parameter setting, result displaying and printing;

FIG. 17 shows the functional block diagram of the queueing solution tool box, which applies both analytical and simulation techniques. This tool box includes a Queueing Solutions (Folding) option in Block 226 for analytical solutions according to the present invention, using both the non-generalized and generalized Folding-algorithms; a Simulator in Block 227 which enables a user to compare the analytical solution with the simulation results based on the real sequence; a Set Queueing System Parameters option in Block 228 which allows a user to set queueing system parameters, such as buffer size, link capacity, congestion control, and delay/loss constraints; a Multiple Queueing Solutions option in Block 229 which is similar to Block 226 but obtains a wide range of solutions; a Multiple Simulation Solutions option in Block 230 which similar to Block 227 but provides a set of selective solutions; and a Comparing Queueing Solutions option in Block 231 for comparing the various solutions. The analytical technique perofrmed in Blocks 226, 229, and 231 is based on the generalized Folding-algorithm to provide various solutions of the queue/loss/output performance in a finite-buffer overload-controlled system. There are three solution types: steady state, transient and spectral performance. Blocks 229 and 230 are designed for traffic engineers to find multiple solutions under different system design conditions. In Block 231, one can also compare the solutions under different system conditions and supporting different traffic streams.

FIG. 18 shows the functional block diagram of the application tool box. The two most commonly used functions in network design are the link capacity allocation in Block 235 and buffer size design in Block 236, which provide optimal solutions of network node design for guaranteed quality services. The traffic generator in Block 237 is used to develop benchmark models from typical multimedia traffic statistics of different sources. The traffic generator can be widely used to generate various multimedia traffic streams within a high speed network. The spectral analysis in Block 238 is designed for the study of output traffic characteristics, which can be used to describe the traffic flow within a network and also to derive delay jitter performance. Block 239 is designed for each individual user to include its own local functions, which interact with the SMAQ via a standard user interface.

The following two sections provide comprehensive numerical examples and various applications, which are all derived by the preferred embodiment of the present invention.

NUMERICAL EXAMPLES

In this section, we provide comprehensive numerical examples to show the capability of the above method of the present invention in the design of CMPP to statistically match with $P(\omega)$ and $F(\chi)$ and the corresponding queueing performance evaluations. Consider a single-server finite-buffer queueing system. The service time is i.i.d. with exponential service at rate $\mu$. The buffer has the capacity to hold K messages, including the server. The whole system is therefore described by an MMPP/M/1/K queueing model, which has the structure of a finite quasi-birth-death process. The Folding-algorithm is used for queue length and loss rate performance evaluation. Choose K=250 unless otherwise specified.

Consider the superposition of n independent input processes. Their power spectra are directly additive except for the DC term. Denote the power spectrum of the k-th input process by $P_k(\omega)$ and its DC term by $2\pi\bar{\gamma}_k^2\delta(\omega)$, where $\bar{\gamma}_k$ represents the average input rate. Excludin the DC term, one can write the overall power spectrum by $$P(\omega) = P_1(\omega) + P_2(\omega) + \ldots + P_n(\omega). \tag{61}$$

Since the DC term in $P(\omega)$ is physically determined by the superimposed average input rate, we always have $2\pi\bar{\gamma}^2\delta(\omega)$ with $\bar{\gamma}=\Sigma_k\bar{\gamma}_k$. Let the k-th process be an MMPP defined by $\{Q_k,\gamma_k\}$; the overall input process is also MMPP and defined by $\{Q,\gamma\}$, with $$Q = Q_1 \oplus Q_2 \oplus \ldots \oplus Q_n, \quad \gamma = \gamma_1 \oplus \gamma_2 \oplus \ldots \oplus \gamma_n, \tag{62}$$

where $\oplus$ is the Kronecker sum operator. If the state space of the k-th MMPP is $N_i$, the overall input state space is $N=N_1 \times N_2 \times \ldots \times N_n$, which grows rapidly with n. n usually represents the number of sources multiplexed on a link; hence N can be significantly large, resulting in the input state space explosion. If the input rate density function of the k-th MMPP is denoted by $$f_k(x) = \frac{dF_k(x)}{dx},$$

the superimposed density function will be $$f(\chi) = f_1(\chi) * f_2(\chi) * \ldots * f_n(\chi), \tag{63}$$

where * is the convolutional operator.

To eliminate the input state space explosion, one can use the statistical matching method of the present invention to design a single CMPP to directly match with $F(\chi)$ and $P(\omega)$ of the aggregate input traffic. In the following subsections, we construct two random input processes. One process is superimposed by heterogeneous MMPP's, or directly collected from a real data sequence. Its steady-state and second-order statistics are represented by $F(\chi)$ and $P(\omega)$. The other one is a single CMPP designed by $F_c(\chi) \approx F(\chi)$ and $P_c(\omega) \approx P(\omega)$, using the SMAQ tool. The input state space of the designed CMPP can be much smaller than that of the superimposed one. Note that the higher order statistics of the two processes are completely different. As one will see, the steady-state and second-order input statistics strongly affect queueing performances, whereas the higher order input statistics to a large extent can be neglected. Hence, the difference in the queue length and loss rate solutions of the two input processes are insignificant.

Matching With Superposition Of Heterogeneous 2-State MMPP'S

The superposition of heterogeneous 2-state MMPP's is first considered. Note that the 2-state MMPP has been commonly used as a building block for the construction of various multimedia sources such as voice, video and file transfer. Since the only non-zero eigenvalue in a 2-state Markov chain must be real, the corresponding bell-shaped component in $P(\omega)$ is always centered at the zero-frequency. Let each 2-state MMPP alternate between ON and OFF periods. The k-th 2-state MMPP is defined by $$Q_k = \begin{bmatrix} -\beta_k & \beta_k \\ \alpha_k & -\alpha_k \end{bmatrix}, \gamma_k = [0, \gamma_{on_k}], \pi_k = [1-\epsilon_k, \epsilon_k],$$

where $\gamma_{on_k}$ is the Poisson input rate while in the ON-state and $\epsilon_k = \beta_k/(\beta_k+\alpha_k)$ is the steady-state probability in the ON-period. Its input rate power spectrum is expressed by $$P_k(\omega) = 2\pi\bar{\gamma}_k^2\delta(\omega) + \frac{-2\psi_k\lambda_k}{\lambda_k^2 + \omega^2}, \tag{64}$$

with $$\bar{\gamma}_k = \epsilon_k\gamma_{on_k}, \quad \lambda_k = -\alpha_k - \beta_k, \quad \psi_k = \epsilon_k(1-\epsilon_k)\bar{\gamma}_k^2,$$

where $\bar{\gamma}_k$ is the average input rate and $\gamma_k$ is the real eigenvalue. The single-bell spectrum in $P_k(\omega)$ is centered at the zero frequency with its average power equal to $\psi_k$. The half-power bandwidth of the bell is given by $-2\lambda_k$. The input rate distribution is Bernoulli with probability $\epsilon_k$ at rate $\gamma_{on_k}$ and probability $1-\epsilon_k$ at rate 0.

For the superposition of $m_k$ i.i.d. such 2-state MMPP elements, from (61) the aggregate power spectrum still contains a single-bell component $$P_{m_k}(\omega) = 2\pi m_k \bar{\gamma}_k^2 \delta(\omega) + \frac{-2m_k \psi_k \lambda_k}{\lambda_k^2 + \omega^2}, \quad (65)$$

and from (63) the distribution is binomial in units of $\gamma_{on^k}$ $$Pr(i_{t_{on_k}}) = \binom{m_k}{i} \epsilon_k^i (1-\epsilon_k)^{m_k-i} \text{ for } i = 0, 1, \ldots, m_k. \quad (66)$$

Further, when the overall traffic is superimposed by n such independent non-identical processes, its aggregate power spectrum becomes $$P(\omega) = 2\pi \left( \sum_{k=1}^{n} m_k \bar{\gamma}_k \right)^2 \delta(\omega) + \sum_{k=1}^{n} \frac{-2m_k \psi_k \lambda_k}{\lambda_k^2 + \omega^2}, \quad (67)$$

and distribution $F(\chi)$ is convoluted-binomial based on (66). According to the notations in Section 3, one can use $$\lambda = [\lambda_1, \lambda_2, \ldots, \lambda_n], \psi = [m_1 \psi_1, m_2 \psi_2, \ldots, m_k \psi_n]$$

to describe the multi-bell power spectrum in (67). Since all $\lambda_k$'s are real, $P(\omega)$ must be a monotonically decreasing function of $|\omega|$. In our study we first choose the superposition of three types of 2-state MMPP's, designed by $(\lambda_k, \epsilon_k, \gamma_{k_k})$ equal to (−100, 0.6, 0.5), (−150, 0.4, 0.3) and (−200, 0.5, 0.12), respectively. The value of $\lambda_k$ is measured in radian frequency, $\gamma_{on^k}$ in Mbps and the buffer size K in ATM cell units. Assume that each type has five i.i.d. 2-state MMPP elements, i.e., $m_k=5$. Note that $m_k$ cannot be large in order to keep the overall input state space N small. As its counterpart, the SMAQ tool is used to generate a single 100-state CMPP from the aggregate $P(\omega)$ and $F(\chi)$. The queue length distribution of the two input processes is plotted in FIG. 19 at utilization $\rho=0.7$, 0.8, 0.9. Although the higher order statistics of the two input processes are completely different, the two solutions agree very well.

To show the generality of the proposed statistical matching approach, we further consider the superposition of three types of 2-state MMPP's. Each type has its transition rate matrix equal to $Q_1=20\times Q$, $Q_2=40\times Q$ and $Q_3=60\times Q$, respectively, where matrix Q is randomly generated with uniform distribution. Correspondingly, the non-zero eigenvalue of each type is given by $\lambda_1=20\lambda$, $\lambda_2=40\lambda$ and $\lambda_3=60\lambda$, where $\lambda$ is the non-zero eigenvalue of the randomly generated Q. The input rate vector of i.i.d. elements in each type is designed by $\gamma_1=[0, 1.3]$, $\gamma_2=[0, 3.2]$ and $\gamma_3=[0, 1.14]$, measured in Mbps. Assume that each type has four elements. Let us randomly generate 200 such Q matrices, each of which leads to a new superimposed input process with different $P(\omega)$ and $F(\chi)$ functions. To each such process, we apply the SMAQ tool to automatically generate a 100-state CMPP with $P_c(\omega) \approx P(\omega)$ and $F_c(\chi) \approx F(\chi)$. The queueing solutions of the two matched input processes are then compared at $\rho=0.8$ and K=250. FIG. 20a shows the histogram of the relative difference in average queue length amongst 200 cases. The maximum relative difference is about 13%, which occurs only once. The average relative difference is 2.96%. The same observation is made in FIG. 20b for the logarithmic difference of the mean loss rates, whose average is only 0.14. Throughout these 200 comparison cases, the average queue length varies from 4 to 74, while the average loss rate is from $10^{-12}$ to $10^{-1}$. Our study covers a large range of queue length and loss rate. Obviously, the queueing difference of the two input processes is negligible. In fact, as we have seen, even these insignificant queueing differences are mainly caused by the matching errors in $P_c(\omega) \approx P(\omega)$ and $F_c(\chi) \approx F(\chi)$ rather than the higher-order input statistical difference. Consider another example of three types of 2-state MMPP's, each of which is designed by $(\lambda_k, \epsilon_k, \gamma_{on^k})$ equal to (−5 $\lambda$, 0.6, 0.45), (−7 $\lambda$, 0.5, 0.34) and (−10 $\lambda$, 0.4, 0.23), respectively. Assume $m_k=4$ in each type. Since the bell bandwidth of each type is given by −2 $\lambda_k$, changing the common bandwidth factor $\lambda$ has the effect of changing the bell bandwidth of each type proportionally. Similarly, a 100-state MMPP is designed to match with the superimposed MMPP at each given $\lambda$. FIG. 21 shows the queueing solutions of the two input processes at $\rho=0.7$ and 0.8 with K=250, as a function of the bandwidth factor $\lambda$. The two solutions are well matched in the entire range of the bandwidth. The same example at $\lambda=1$ is used to compare the queueing solutions as $m_k$ changes from 3 to 8 in each type. While the MMPP input state space expands rapidly with $m_k$, the matched CMPP state space remains unchanged at N=100. Queue length and loss rate solutions of the two input processes are compared in FIG. 22 as a function of the superimposed MMPP input state space. The solutions of the CMPP are generally matched very well with those of the MMPP. Clearly, our matching technique based on superimposed $P(\omega)$ and $f(\chi)$ effectively avoids a input state space explosion, which otherwise is inevitable with existing input modeling techniques. So far the buffer size has been fixed at K=250. Using the same two input processes as in FIG. 21 for the bandwidth factor $\lambda=1$, their queueing solutions in FIG. 23 are matched very well in the entire buffer range K$\in$[250, 2500]. Similar observations are made in our study with different input characteristics. Thus far we have applied the proposed matching techniques in a wide range of queueing conditions $\rho$, K and L.

Matching With Superposition Of Heterogeneous

Multi-State MMPP's Similar results are obtained when each individual MMPP element has more than two states. Consider the integration of three types of 3-state MMPP's. The transition matrix of each type is designed by $Q_1=Q$, $Q_2=5\times Q$ and $Q_3=20 Q$, where Q is a 3×3 Markov transition rate matrix randomly generated with uniform distribution. The corresponding input rate vectors are arbitrarily assigned by $\gamma_1=[0, 0.7, 0.3]$, $\gamma_2=[0, 1.2, 2.3]$, and $\gamma_3=[0, 1.5, 0.9]$. To present an input state space explosion, the superimposed MMPP is assumed to consist only of one type-1, two type-2 and one type-3 elements. Again, 200 such input processes are randomly generated with different characteristics of $P(\omega)$ and $F(\chi)$, each of which is statistically matched by a single 100-state CMPP using the SMAQ tool. For buffer size K=250 at utilization $\rho=0.8$, the average queue length and loss rate of these 400 input processes are in the range of $\bar{q} \in [7, 90]$ and L $\in [10^{-8}, 10^{-1}]$. FIG. 24 shows a histogram of the difference in average queue length and loss rate of the two input processes. The average relative difference of $\bar{q}$ in these 200 comparison cases is 3.09%, and the average difference of $\log_{10} L$ is 0.03. The study is then extended to the superposition of two types of 4-state MMPP elements. Each type is designed by $Q_1=10\times Q$ and $Q_2=30\times Q$, where Q is randomly generated with uniform distribution. The input rate vectors are $\gamma_1=[1, 32, 20, 40]$ and $\gamma_2=[2, 6, 23, 30]$, respectively. The input process comprises two i.i.d. elements of each type. As the number of states in each element increases, fewer elements can be selected for the superposition due to its rapid state space expansion. For the matched process generated by the SMAQ tool, we again construct a single 100-state CMPP. FIG. 25 shows the histogram of the difference in such 200 randomly generated comparison cases. Under the same queueing conditions K=250 and $\rho=0.8$, we found $\bar{q} \in [18, 87]$ and L $\in [10^{-1}, 10^{-4}]$. The average relative difference of $\bar{q}$ is 1.9% and the average different of $\log_{10} L$ is 0.02. For the last example in this subsection, we consider the superposition of three non-identical CMPP's. There are three bell components in $P(\omega)$ for $\omega \geq 0$, each of which is matched by an independent CMPP. From (4), each bell is described by $(\lambda_l, \psi_l)$ and its conjugate pair $(\lambda_{N-l}, \psi_{N-l})$ if $\lambda_l$ is complex. $\lambda_l$ provides the central frequency and bandwidth of each bell and $\psi_l$ gives the average power of each bell. In our study we choose $\lambda_l$ equal to $-50+80i$, $-200+450i$ and $-500+500i$, respectively, at $l=1,2,3$. The average power of each bell is expressed by $\psi_l = C_{\gamma l}^2 \bar{\gamma}_l^2$, where $\bar{\gamma}_l$ and $C_{\gamma l}$ are the average input rate and variation coefficient of each CMPP. Assume that the average input rate of each CMPP is identical, given by $\bar{\gamma}_1 = \bar{\gamma}_2 = \bar{\gamma}_3 = 10$ Mbps. The variation coefficients are assigned by $(C_{\gamma 1}, C_{\gamma 2}, C_{\gamma 3}) = (0.15, 0.15, 0.05)$. Since each individual CMPP contains only a single pair of effective eigenvalues, from (8) its input rate vector is constructed by two discrete sinusoidal terms, plus the constant $\bar{\gamma}_l$. All the phase angles, $\theta_l$ at $l=1,2,3$, are assumed to be zero in the input rate vector construction. Describe the lth CMPP by $(\alpha_l, \gamma_l)$ in the time-domain. The closed form solution of $(\alpha_l, \gamma_l)$ from $(\lambda_l, \psi_l, \theta_l)$ is given in [2]. As shown in [2], the size of each CMPP must be bounded by $-\text{Re}\{\lambda_i\}/\text{Im}\{\lambda_i\} \geq |\tan(\pi/N_i)|$, which in our case leads to the minimum state space: $N_1=10$, $N_2=10$ and $N_3=4$, respectively. Hence, from (13) the minimum size of the superimposed multi-dimensional CMPP is $N=N_1 \times N_2 \times N_3 = 400$. To avoid a state space explosion, one can also use the SMAQ tool to generate a single 85-state CMPP from $\lambda_c = (\lambda_1, \lambda_2, \lambda_3)$, $\psi_c = (\psi_1, \psi_2, \psi_3)$ and $\theta_c = (0,0,0)$. Again, FIG. 26 shows an excellent agreement between the two queueing solutions for $\rho \in [0.62, 0.9]$ with $K=250$.

Effect Of N, $\underline{i}$ And $\theta_c$ On Queueing Solutions

The solution of CMPP from $P(\omega)$ and $F(\chi)$ is not unique. As shown in Section 3, there is a large range of choices in the selection of input space N, eigenvalue index $\underline{i}$ and phase angle $\theta_i$, to achieve $P_c(\omega) \approx P(\omega)$ and $F_c(\chi) \approx F(\chi)$. In this subsection, we examine the input of N, $\underline{i}$ and $\theta_c$ of the matched CMPP on queueing solutions. Similar to the model used in Section 4.1, the original input process is superimposed by three types of 2-state MMPP's, each of which is designed by $(\lambda_k, \epsilon_k, \gamma_{on}{}^k)$ equal to $(-50, 0.6, 0.5)$, $(-200, 0.4, 0.3)$ and $(-300, 0.5, 0.12)$, respectively. Assume $m_k=4$ in each type. The size of the matched CMPP is increased from $N=20$ to $120$. Load the queueing system at $\rho=0.8$ and $0.9$ with $K=250$. FIG. 27 shows that the queueing solutions of the matched CMPP are virtually independent of N. Note that N also represents the resolution of the discrete function $F_c(\chi)$. The same example is used to investigate the effect of $\underline{i}$. The queueing solution of the superimposed MMPP input process at $\rho=0.9$ is given by $(\bar{q}, L) = (40.4, 9.0\, e{-}4)$. The matched CMPP's are chosen at $N=100$ with different selections of $\underline{i}$, 189 of which are generated by the SMAQ tool. FIG. 28 provides a histogram of the 189 collected queueing solutions in which $\bar{q} \in (39.2, 40.6)$ and $L \in (7.6\, e{-}4, 9.2\, e{-}4)$. The difference among the solutions is negligible, e.g., the maximum relative difference among the $\bar{q}$'s is less than 2%. A similar observation is made about the effect of $\theta_i$'s. In this case, we choose $N=100$ and a fixed $\underline{i}$ for the construction of the matched CMPP's, 79 of which are generated by different selections of $\theta_i$. FIG. 29 shows the histogram of the 79 collected queueing solutions where $\bar{q} \in (4.34, 4.46)$ and $L \in (1.5\, e{-}12, 4.7\, e{-}12)$, assuming $\rho=0.7$ and $K=250$. The corresponding queueing solution of the original MMPP input process is given by $(\bar{q}, L) = (4.16, 2.8\, e{-}13)$.

Notice that the selection of N, $\underline{i}$ and $\theta_c$ does not significantly change the matched $P(\omega)$ and $F(\chi)$ but directly reflects the change of the higher-order input statistics. The numerical examples provided in this subsection demonstrate that $P(\omega)$ and $F(\chi)$ are sufficient to characterize steady state queueing behavior, whereas the higher-order input statistics to a great extent can be neglected in steady state queueing analysis.

Matching With Real Traffic Sequence

Consider the origin of input modeling in queueing analysis. Since all input models are given in some analytical form, one may regard them as a parametric input model. In principle, a parametric input model should be constructed from a given realization of random input processes. In our case, both $P(\omega)$ and $F(\chi)$ should be collected from a finite traffic sequence (i.e., a sample path). Our concept of measurement-based input modeling is analogous to that of linear autoregressive modeling in signal processing, except that $F(\chi)$ can be in any form and $\chi$ is non-negative. The following issues are involved with measurement-based input modeling:

1. A real traffic stream to be measured may not be stationary. For a nonstationary process, the power spectral content of the signal changes in time. Yet, $P(\omega)$ describes only the steady-state distribution of signal energy in the frequency-domain, while $F(\chi)$ provides only the steady-state distribution of the signal in the time-domain.
2. Only a finite sequence can be taken by the measurement; thus the collected statistics, especially in the low frequency band, may not converge to the steady-state.
3. There will always be some measurement errors in the collection of $P(\omega)$ and $F(\chi)$, especially $P(\omega)$. Moreover, using eigenvalue-based parametric signal processing methods such as Prony, MUSIC and ESPIRIT, $P(\omega)$ is assumed to be a rational function as constructed by $(\lambda, \psi)$ in (4).
4. There can also be matching errors in the design of CMPP: $P_c(\omega) \approx P(\omega)$ and $F_c(\chi) \approx F(\chi)$. $\psi_c$ must be non-negative real, whereas $\psi$ can be complex. Further, if the number of effective eigenvalues in $\lambda_c$ is too large, the matching complexity and input state space N are substantially increased.

Despite of these issues, in this subsection we take several real traffic sample paths, collected from representative video and data sources. The corresponding CMPPs are constructed to match with the statistics of each individual finite traffic sequence. The analytical queueing solution of the matched CMPP are then compared with the simulation result of the original traffic sequence. Although the comparison of the analytical steady-state solution with the simulated sample path result seems unrealistic, the difference between the two solutions is surprisingly small. First, we choose a typical JPEG video sequence coded from two hours of the movie *Star Wars*. Its original bit stream is generated by a simulated coder using DCT and Huffman coding without motion compensation (available from Bellcore in public domain). The data is recorded in bytes per slice time unit $\tau=1.4$ msec; the bytes are then converted into cells. Each cell comprises 44 bytes of video information plus 9 bytes of ATM-layer and adaptation-layer protocol overhead. There are 30 slices per frame and 24 frames per second. FIGS. 30a,b show a typical 2-minute video sequence measured in slice time units and its power spectral and autocorrelation functions measured by FFT (i.e., a non-parametric method). Two key observations can be made about the video power spectrum. First, the spikes that appear at the frame frequency 24×2 π and its harmonics 24×2 π×k exhibit the feature of strong frame correlation. Second, the rest of the video input power is located in a very low frequency band, capturing the slow time-variation of consecutive scene changes (scene correlation). The same observations can be made throughout the entire two-hour video spectral analysis. Since the time scale of scene changes is most likely longer than a second, the low frequency video power always stays in a well-founded low frequency band ω<2 π.

Queueing performance is dominated by low frequency input statistics, whereas high frequency input statistics to a large extent can be neglected. Hence, in our video input modeling, the high frequency power with respect to the frame correlation is completely removed. FIGS. 31c,d show the corresponding accumulated input rate distribution $F(\chi)$ and power spectrum $P(\omega)$. $F(\chi)$ is collected from the rate histogram and $P(\omega)$ is constructed using the Prony parametric signal processing method. FIGS. 31a,b also show the matched CMPP solutions of $F_c(\chi)$ and $P_c(\omega)$ as generated by the SMAQ tool. As one can see, while $P_c(\omega)$ is slightly different from $P(\omega)$, $F_c(\chi)$ is exactly matched with $F(\chi)$. The constructed analytical video input model is a 100-state CMPP. Assume buffer capacity K=250 in cell units. In FIGS. 31c,d, we compare the analytical queueing solution of the CMPP model with the simulated one of the real video sequence for different link utilizations. While the video sequence is recorded in slice units, the queueing process in the computer simulation must be evolved in cell transmission (slot) units. In converting the input time unit of slice into slot, our simulated study considers both the worst and best scenarios. In the worst scenario, all the cells generated in each slice are assumed to arrive at the beginning of the first slot in that slice. In the best scenario, all the cell arrivals are evenly distributed within the entire slice interval. As compared in FIG. 31c,d, both worst and best queueing solutions to a certain degree are well matched with the analytical one. The same observation is made in FIG. 32 when a different 2-minute video sequence (*Star Wars*, page 29) is selected.

Next, we chose a 3.5-minute Ethernet data sequence (available from Bellcore in public domain). FIG. 33a shows the bursty data sequence with its average input rate equal to 2.04 Mbps and peak input rate equal to 10 Mbps. The rate density function $f(\chi)$ and input correlation function $R(\tau)$ of the 3.5-minute data sequence are collected in FIG. 33b,c. The corresponding $F(\chi)$ and $P(\omega)$ are shown in FIG. 34a,b with their matched counterparts $F_c(\chi)$ and $P_c(\omega)$. Notice that the long time-lag in $R(\tau)$ corresponds to the low-frequency spike in $P(\omega)$. Similarly, the near-zero-time spike in $R(\tau)$ is captured by the long frequency-lag in $P(\omega)$. The constructed analytical data input model is a 160-state CMPP. Assume K=1000 cells for the data buffered capacity. FIG. 34c,d compares the simulated queueing solution using the real data sequence to the analytical one derived by the SMAQ tool. Again, we have a good agreement between the two solutions. When ρ is small, the simulated loss rate solutions are not included in FIG. 34d simply because the 3.5-minute data sequence contains only about $10^6$ cells.

Although the above examples show the great potential of the SMAQ tool to solve real traffic engineering problems, it should be pointed out that many data sequences in the real world may not be stationary. Also, in order to design a buffer system with average loss rate less than $10^{-6}$, the total number of cells in the collected data sequence must be substantially longer than $10^6$. Furthermore, some detailed design issues are also considered by the SMAQ tool, including: (a) the selection of the maximum time interval in $R(\tau)$ and the maximum frequency in $P(\omega)$ for traffic measurement; (b) identification of the number of eigenvalues in $P(\omega)$ for statistical matching; (c) the neglect of high frequency input statistics for model simplification, and so on.

APPLICATIONS

This section provides a wide range of network applications based on the preferred embodiment of the present invention.

Congestion Control

So far we have only considered the packet loss caused by buffer blocking. One effective control mechanism proposed in high speed networks is to selectively discard arriving packets during system congestions. The congestion status in a queueing system is usually measured by the present buffer occupancy q(t). The sojourn time for q(t) to exceed a pre-assigned buffer threshold $K_c$ is called congestion period. In order to provide guaranteed quality of services, packets arriving in a congestion period will also be selectively discarded. Such a control policy is necessary and important to reduce the recurrence of buffer blocking and to protect high priority services against low ones in competition for buffer room. It can also prevent packets of real-time services from being excessively delayed. FIG. 35 shows the level transition diagram of such a one-level-control queueing system. It has the structure of a typical finite stationary QBD process with level-dependent transitions. Before entering the congestion period, i.e., $q(t)<K_c$, we have $\underline{\alpha}=\text{diag}[(\gamma_k-\mu)^+]$ for queue expansion and $\underline{\beta}=\text{diag}[(\mu-\gamma_k)^+]$ for queue reduction, as defined in Section 4. Once in the congestion period, we have $\underline{a}_c=\text{diag}[(\gamma_{ck}-\mu)^+]$ and $\underline{\beta}_c=\text{diag}[(\mu-\gamma_{ck})^+]$ where $\gamma_{ck}$ is the controlled input rate while in input phase $\underline{k}$. By selective discarding we must have $\gamma_{ck} \leq \gamma_k$. It is assumed that the loss only occurs upon the arrival of a(t), which is caused by buffer blocking or selective discarding in the congestion period. An extension can also be made for the modeling of a multi-level-control queueing system. The Folding algorithm is used for the control performance evaluation. For many real-time applications like voice and video, the source input can naturally be partitioned into packets of different priorities; the high priority packets themselves may provide a sufficient approximation to the original input. For the best quality of services, no high priority packets should be blocked unless all the lower priority packets have been discarded. If the loss only occurs among the low priority packets, the network congestion will have the minimum impact on service qualities. Obviously, by a proper design of the buffer threshold $K_c$ to discard the low priority packets in a congestion period, one can substantially reduce the loss probability of the high priority packets. For simplicity we consider a single traffic type with its input rate α(t) divided into M priority streams: $\alpha(t)=\Sigma_{i=0}^{M-1}\alpha_i(t)$ with $\alpha_i(t)=\xi_i\alpha(t)$ and $\Sigma_{i=0}^{M-1}\xi_i=1$. $\xi_i$ is the percentage of the i-th priority in the overall input α(t). The priority index is assigned in descending order, with i=0 to represent the highest priority class. Define the loss fraction in α(t) by θ(t), which is also called the instantaneous loss rate. Introduce $\chi_m\Sigma_{i=m+1}^{M-1}\xi_i$ for the overall fraction of the traffic with priority classes greater than m. Under the priority control scheme, no arriving packets with their priority class less than or equal to m will be lost at time t unless $\theta(t)>\chi_m$, w.r.t. m=0,1, . . . , M−2. The service quality can then be measured by the steady state loss rate distribution $P\tau(\theta>\chi)$ for $0\leq\chi\leq 1$. Ideally, one wold expect $P\tau(\theta>\chi)$ to be a piece-wise step function shown by the broken line in FIG. 36 where all the segments are divided at $\chi=\chi_m$ with $0 \leq m < M-1$. Without the congestion control, we will get $\theta(t)=[\alpha(t)-\mu]^+/\alpha(t)$ which is caused by blocking when the buffer is full. The loss rate distribution is then expressed by $P\tau(\theta>\chi)=\Sigma_n \epsilon \Omega_\chi \rho \underline{n}k$ where $\Omega_\chi=\{\underline{n}|(\gamma_{\underline{n}}-\mu)\gamma_{\underline{n}}^{-1} > \chi\}$, which is a smooth function as plotted by the solid line in FIG. 36. Having the congestion control, the loss rate distribution curve can then be tuned by the proper design of a buffer threshold with each priority class. Denote the buffer threshold for the i-th priority class by $K_i$. That is, the arriving packets of the i-th priority class will be discarded once $q(t) \geq K_i$. Because the priority of class i+1 is lower than that of class i, we must have $K_{i+1} \leq K_i$. In addition, we have $K_0=K$ since the arriving packets of the highest priority class 0 should not be dropped unless the buffer is full. FIG. 37 shows the block diagram of such a multi-level control system.

Denote the steady state solution of the controlled QBD process by $\rho_{\underline{n}}k$ as in the non-controlled case. The loss rate distribution will then be evaluated by $$Pr(\theta > x) = \begin{cases} \sum_{\underline{n}} \sum_{k=K_m}^{K} p\underline{n}k & \text{when } \chi_m < x \leq \chi_{m-1} \\ & \text{at } m=1,2,\ldots,M-2 \\ \sum_{\underline{n}} \epsilon \Omega_x p\underline{n}K & \text{when } \chi_m < x \leq 1 \\ & \text{at } m=0 \end{cases}$$

which forms a piece wise step function except when the buffer is full (i.e., at m=0). Likewise, the average loss rate of priority class m is given by $$L_m = \begin{cases} \dfrac{1}{\xi_m \bar{\gamma}} \sum_{\underline{n}} \sum_{k=K_M}^{K} \xi_m \gamma_{\underline{n}} p_{\underline{n}k} & \text{at } m=1,2,\ldots,M-1 \\ \dfrac{1}{\xi_m \bar{\gamma}} \sum_{\underline{n}} (\xi_m \gamma_{\underline{n}} - \mu)^+ p_{\underline{n}K} & \text{at } m=0. \end{cases}$$

Note that only the loss of the priority class 0, $L_0$, is caused by buffer blocking. The overall average loss rate is then measured by $$L = \sum_{m=0}^{M-1} \xi_m L_m$$

In numerical study we consider an input rate process constructed by 50 i.i.d. 2-state MCs, each of which represents a packet voice source and defined by $(\lambda_k, \epsilon_k, \gamma_{on_k}) = (-5, 0.4, 0.064)$. The queue is loaded at $\rho=0.85$ with buffer capacity K=200. Assume that the traffic is classified into three priority classes, given by $(\xi_0, \xi_1, \xi_2) = (60\%, 20\%, 20\%)$. To minimize the loss impact on service quality, the criterion for the average loss rate of each class is set by $(L_0, L_1, L_2) \leq (1.0\text{ e}-12, 1.0\text{ e}-6, 5.0\text{ e}-2)$. What we need is to find a proper buffer threshold for the control of each priority class. When no control is applied, we get $L_0 = L_1 = L_2 = L = 8.4\text{ e}-4$ since the blocked packets are evenly distributed among the three classes. Obviously, one should trade more loss of class 2 for less loss of classes 0 and 1. Design a one-level-control system at $K_2=40$, such that all the packet arrivals of class 2 will be discarded once $q(t) \geq K_2$. Correspondingly, we get $(L_0, L_1, L_2) = (4.2\text{ e}-8, 4.2\text{ e}-8, 3.2\text{ e}-2)$. As a result, the service criteria of both $L_1$ and $L_2$ are now satisfied, although the overall average loss rate L is increased from 8.4 e–4 to 6.4 e–3. In order to further reduce $L_0$, the second level control is required at $K_1=180$, such that all the packet arrivals of class 1 will also be dropped once $q(t) \geq K_1$. With this two-level-control system, one can achieve $(L_0, L_1, L_2) = (1.3\text{ e}-13, 7.8\text{ e}-7, 3.2\text{ e}-2)$ to satisfy the above service criteria. For comparison purposes, the results of this example are summarized in Table 2. Also plotted in FIG. 38 are the corresponding loss rate distributions. Hence, by design of a multi-level-control system one can tune the loss rate steady state distribution to a piece wise step function which minimizes the packet loss impact on service qualities.

Link Capacity Allocation

The central objective of link capacity allocation is two-fold: to take advantage of statistical multiplexing and finite buffering for transmission efficiency, and to avoid nodal congestion caused by the arrival of unpredicted bursty traffic. The SMAQ tool can be used to find the minimum link capacity (or the maximum throughput) required by a traffic stream $P(\omega)$, $f(\chi)$ for guaranteed

TABLE 2

Effect of priority control on average loss rate

| | Priority Class | | | |
|---|---|---|---|---|
| | 0<br>$\xi_0 = 60(\%)$<br>$L_o$ | 1<br>$\xi_1 = 20(\%)$<br>$L_1$ | 2<br>$\xi_2 = 20(\%)$<br>$L_2$ | Overall<br>100(%)<br>L |
| Required | 1.0 e – 12 | 1.0 e – 6 | 5.0 e – 2 | |
| No Control | 8.4 e – 4 | 8.4 e – 4 | 8.4 e – 4 | 8.4 e – 4 |
| One Level Control $K_2 = 40$ | 4.2 e – 8 | 4.2 e – 8 | 3.2 e – 2 | 6.4 e – 3 |
| Two Level Control $K_2 = 40$, $K_1 = 180$ | 1.3 e – 13 | 7.8 e – 7 | 3.2 e – 2 | 6.4 e – 3 | quality services. For a finite-buffer system, a typical service quality is measured by the average loss rate L. Let us define the maximum throughput, $$\rho = \dfrac{\bar{\gamma}}{\mu_{min}},$$

subject to a desired average loss rate L at buffer size K, as described in FIG. 39. For instance, we choose $L=10^{-6}$ to represent a virtually no-loss finite-buffer system. The numerical solution of $\rho$ is obtained recursively by the Folding-Algorithm with respect to input statistical functions $P(\omega)$ and $f(\chi)$, subject to (L, K). Similarly, we use the superposition of 150 i.i.d. two-state MCs to construct $P(\omega)$ and $f(\chi)$. The power spectrum $P(\omega)$ comprises a single-bell component centered at zero frequency with its bell-bandwidth denoted by B. The corresponding input rate density function $f(\chi)$ is binomial. The average power, excluding the DC component, is given by $C^2$ which is also equal to the squared variation coefficient of the input rate. FIG. 40 shows the results of $\rho$ as a function of $$\dfrac{B}{2\pi\mu} \in [10^{-7}, 10^1]$$

and $C \in (0; 0.6]$ with K=250. Obviously, increasing C means up-scaling the input power in the entire frequency band; hence less $\rho$ is achieved. Similarly, reducing $$\dfrac{B}{2\pi\mu}$$

has the effect of shifting input power from the high frequency band to the low frequency band, which also causes the reduction of ρ. The effect of $$\frac{B}{2\pi\mu}$$

on ρ at each given C is divided into three regions when K=250:
In high-frequency region $$\frac{B}{2\pi\mu} \in [1,\infty]:$$

ρ is close to 1, much less dependent on $$\frac{B}{2\pi\mu}$$

and C.
In mid-frequency region $$\frac{B}{2\pi\mu} \in (10^{-4}, 1):$$

ρ changes rapidly with $$\frac{B}{2\pi\mu}$$

and C.
In low-frequency region $$\frac{B}{2\pi\mu} \in (0, 10^{-4}]:$$

ρ is much less dependent on $$\frac{B}{2\pi\mu}$$

at each given C.
In the high-frequency region, most input power is in the high frequency band. Especially as $$\frac{B}{2\pi\mu} \to \infty,$$

the input process becomes a white noise, where the random input rate becomes renewable with its distribution function f(χ). In this region, the queueing system can always operate in near full load range to achieve L=$10^{-6}$ at K=250, independently of C and $$\frac{B}{2\pi\mu}.$$

In the mid-frequency region, ρ changes in the range of 0.3 to 1.0 and is highly affected by both $$\frac{B}{2\pi\mu}$$

and C. Yet, once $$\frac{B}{2\pi\mu}$$

is moved to the low-frequency region, ρ becomes largely independent of $$\frac{B}{2\pi\mu}$$

at each given C. A similar frequency division for the solution of ρ can be found when K and L are changed, as extensively studied by the applicants in "On Input State Space Reduction and Buffer Noneffective Region," *Proc. IEEE Infocom '94 Conference*, June 1994. It is important to understand the convergence of ρ as $$\frac{B}{2\pi\mu}$$

moves to the low-frequency region. Let us consider an extreme case, called a "zero-buffer" system, where the average loss rate L is simply determined by f(χ). As described in FIG. 41a, the loss occurs whenever the input rate χ exceeds the service rate μ; hence L is equal to the tail portion of f(χ) with χ>μ. Finding ρ for such a "zero-buffer" system is equivalent to finding the minimum service rate μ from f(χ) at a fixed L. In reality, the actual buffer size of this "zero-buffer" system should not be zero. A small amount of buffer size is always needed to absorb the local dynamics of Poisson arrivals and exponential service time, in order for L to be determined by f(χ). For simplicity we refer to such a system by K≈0. This is analogous to the fluid-flow approximation in queueing analysis. In this case, f(χ) is binomial as defined by ($\bar{\gamma}$, C, M); thus finding ρ at K≈0 is straightforward. FIG. 41b compares the two solution curves of ρ at K≈0 and K=250, respectively. The curve at K=250 is identical to the one at $$\frac{B}{2\pi\mu} = 10^{-7}$$

in FIG. 40. The margin between the two curves represents the link capacity improvement in the low-frequency region by increasing the buffer size from K≈0 to K=250, under the same loss rate condition L=$10^{-6}$. Of course, the gap between the two curves will become smaller when $$\frac{B}{2\pi\mu}$$

is further reduced. The key point here is that, once the input power P(ω) is located in a well-founded low-frequency region, ρ is essentially characterized by the tail portion of f(χ) and is much less dependent on the shape of P(ω).

Low Pass Filtering in Traffic Measurement

Since the low frequency input power has a dominant impact on queueing performance, the high frequency power to a large extent can be neglected. Hence, a low pass filtering technique can be widely used in traffic measurement.

For example, consider a multi-rate packet video source, whose input rate process possesses

TABLE 3

| | | Queue response to video input with three eigenvalues | | |
|---|---|---|---|---|
| ρ | | 3-eig. case $(\lambda_{i1}, \lambda_{i2}, \lambda_{i3})$ | 2-eig. case $(\lambda_{i1}, \lambda_{i2})$ | 1-eig. case $(\lambda_{i1})$ |
| 0.6 | $\bar{q}$ | 3.42 | 3.40 | 3.19 |
| | $\sigma_q$ | 6.55 | 6.52 | 6.15 |
| | L | 4.48e-13 | 4.05e-13 | 9.49e-14 |
| 0.7 | $\bar{q}$ | 18.22 | 18.19 | 17.84 |

TABLE 3-continued

Queue response to video input with three eigenvalues

| p | | 3-eig. case $(\lambda_{i1},\lambda_{i2},\lambda_{i3})$ | 2-eig. case $(\lambda_{i1},\lambda_{i2})$ | 1-eig. case $(\lambda_{i1})$ |
|---|---|---|---|---|
|  | $\sigma_q$ | 37.40 | 37.37 | 36.96 |
|  | L | 3.27e-4 | 3.25e-4 | 3.00e-4 |
| 0.8 | $\bar{q}$ | 50.46 | 50.44 | 50.16 |
|  | $\sigma_q$ | 75.55 | 75.55 | 75.55 |
|  | L | 1.20e-2 | 1.20e-2 | 1.19e-2 |
| 0.9 | $\bar{q}$ | 85.62 | 85.60 | 85.34 |
|  | $\sigma_q$ | 93.69 | 93.70 | 93.86 |
|  | L | 3.94e-2 | 3.94e-2 | 3.91e-2 | strong autocorrelations at three substantially different time scales, i.e., in adjacent frames, lines and packets. In a typical example, the video source generates 25 frames per second, 256 lines per frame and 256 pixels per line. For one byte per pixel at full rate we get the maximum input rate equal to 13.1 Mbps. For 44 bytes per packet, it corresponds to 37,216 packets per second, which is about 6 packets per line. The average input rate is given by $\bar{\gamma}=20{,}000$ packets per second. Three fundamental time scales are then derived at $T_f=40$ ms per frame, $T_l=T_f/256=156$ μs per line, and $T_p=T_l/6=26$ μs per packet. Its input power spectrum is expected to consist of three bell-shaped components, each corresponding to one of the above time scales, i.e., we obtain $\text{Im}\{\lambda_{i1},\lambda_{i2},\lambda_{i3}\}=2\pi(T_f^{-1},T_l^{-1},T_p^{-1})$, which is equivalent to $(\omega_{i1},\omega_{i2},\omega_{i3})=50\pi(1,256,1536)$ in radian frequencies. The bandwidth of each bell is designed by $(B_{i1},B_{i2},B_{i3})=B(1,75,250)$, assuming $B=200\pi$ in radian frequency. Let the total input power be distributed among the three bells according to $(\psi_{i1},\psi_{i2},\psi_{i3})=\psi(1,\frac{1}{2},\frac{1}{3})$, where $\psi$ is a common factor directly related to the input rate variation coefficient $C_\gamma$. Choose $C_\gamma=0.5$. One can therefore construct a circulant for each bell component. The size of the three circulants is given by $(N_1,N_2,N_3)=(4,6,10)$, respectively, which leads to $N=240$ for the superimposed circulant. FIG. 42 shows the corresponding input power spectrum, characterized by the above three eigenvalues $(\lambda_{i1},\lambda_{i2},\lambda_{i3})$. Consider a queueing system with $K=255$ to support such a single video source. The corresponding queueing results are listed in Table 3 as a function of $\rho$, where $\rho$ is adjusted by the link capacity $\mu$.

Since the input power in the high-frequency band has an insignificant effect on queue, one may eliminate the third circulant to completely remove $\lambda_{i3}$, whic his contributed by the packet (or pixel) autocorrelation. The remaining power spectrum will then be constructed by $(\lambda_{i1},\lambda_{i2})$. As a result, N is reduced from 240 to 24, which significantly simplifies the numerical analysis. Notice that removing $\lambda_{i3}$ is similar to implementing a low pass filtering function at the input process. Also listed in Table 3 is the queue response to the remaining $(\lambda_{i1},\lambda_{i2})$. Similarly, one may further remove $\lambda_{i2}$. Thus, the line autocorrelation of the video stream is eliminated. Only a single input eigenvalue $\lambda_{i1}$ will be left in the video power spectrum. The inspection of data in Table 3 shows hardly any difference in queue response to the above three sets of input eigenvalues. This example shows the significance of using a low-pass filtering function to simplify traffic measurement and to reduce the complexity of the queueing analysis. In practice, the filtering operation can be implemented in many different ways, either in the frequency domain or in the time domain.

Transient Performance

The steady-state performance of a finite QBD process is characterized by the unique solution of $\pi G=0$ at $\pi e=1$ with $e=[1,1,\ldots,1]^T$ and $\pi=[\pi_0,\pi_1,\ldots,\pi_K]$, where $\pi_i$ is a sub-row-vector for the steady-state solution on level i. $\pi$ is found by using the original Folding-algorithm. For transient performance, let us now divide the state space of the above QBD process, $\Omega$, into two disjoint subsets: $\Omega_u$ for underload and $\Omega_o$ for overload. Such a partition is typically done by a buffer threshold $K_o$ for $0<K_o\leq K$ as described in FIG. 43. The buffer occupancy at time t is represented by the level q(t). Hence, $q(t)<K_o$ in $\Omega_u$ and $q(t)\geq K_o$ in $\Omega_o$. The sojourn time performance in each subset provides significant information on the queue transient behavior. The sojourn time in $\Omega_o$ is called the overload period and the sojourn time in $\Omega_u$ is called the underload period, denoted by $t_o$ and $t_u$, respectively. At $K_o=1$, $t_o$ and $t_u$ correspond to busy periods and empty periods. At $K_o=K-1$, they represent buffer blocking periods and nonblocking periods. One can also have $K_o$ represent a level of buffer control, such that both input and service rates are to be regulated whenever $q(t)\geq K_o$. In this case, one may refer to $t_o$ and $t_u$, respectively, as the control periods and non-control periods.

Since $\Omega_u$ and $\Omega_o$ are disjoint, the original stationary QBD process can be divided into two alternating transient QBD processes with their generator matrices denoted by $G_u$ and $G_o$, respectively. Hence, taking $P=G_u^T$ and $P=G_o^T$ into (20)–(23), one can use the generalized Folding-algorithm to recursively derive the higher moment sojourn time vectors of both underload and overload periods. Denote the solution of the i-th moment sojourn time vector in underload period by $\bar{x}_u^i$ and in overload period by $\bar{x}_o^i$. Since the overload period can only be entered from level $K_o-1$, the initial state probability of the overload period will be given by a row vector $\alpha=[\alpha_o,0,\ldots,0]$ which has all zero elements except the first one:

$$\alpha_o = \frac{\pi_{K_o-1}\text{diag}\{\gamma\}}{\pi_{K_o-1}\text{diag}\{\gamma\}e} \qquad (68)$$

$\alpha$ is a sub-row-vector. In (68), $\text{diag}\{\gamma\}$ is the transition rate block from level $K_o-1$ to level $K_o$ upon the new arrival, and $\pi_{K_o-1}\text{diag}\{\gamma\}e$ is the normalization factor to ensure $\alpha_o e=1$, where e is a unit sub-column-vector. Similarly, since each underload period can only be entered from level $K_o$, we get its initial state probability vector $\beta=[0,\ldots,0,\beta_u]$, where the only nonzero element, the last one, is equal to $$\beta_u = \frac{\pi_{K_o}\mu I}{\mu\pi_{K_o}e} \ .$$

Note that $\mu I$ represents the transition rate block from level $K_o$ to level $K_o-1$ upon the new departure. Again, $\mu\pi_{K_o}e$ is the normalization factor. One can simply write $$\beta_u = \frac{\pi_{K_o}}{\pi_{K_o}e} \ .$$

Thus, for the i-th moment of the underload and overload periods, we have $$\bar{t}_u^i = \bar{x}_u^i \alpha, \quad \bar{t}_o^i = \bar{x}_o^i \beta.$$

In our numerical study, we choose the level space $K=200$ for buffer size and the phase space $N=100$ for the input Markov chain. The emphasis is placed on the queue transient response to input power spectrum $P(\omega)$. For simplicity, we again choose single-bell power spectrum defined by ($\bar{\gamma},C,BW,\omega_o$), where BW is the bell bandwidth, $\omega_o$ is the bell central frequency and $C^2$ is the power average. The construction of CMPP for such a single-bell spectrum is straightforward as described in (11). Let us construct four CMPP's, each of which has a very different single-bell power spectrum (second-order statistics) but identical rate distribution (steady-state statistics). The steady-state statistics are fixed by $(\bar{\gamma},C)$ (refer to [2] for the detailed construction of CMPP's input rate distribution). In our case, we choose $(\bar{\gamma},C)=(1, 0.7)$, such that every single-bell spectrum is defined by different values of $(\omega_o,BW)$. For queueing analysis, the input power spectrum must be normalized by the average service rate $\mu$ (see [2]). This is equivalent to normalizing the MMPP input process $(Q,\gamma)$ to $1/\mu(Q,\gamma)$ in queueing analysis. Hence, $(\omega_o,BW)$ is replaced with $1/\mu(\omega_o, BW)$. Assume that the queueing system is loaded by $\rho= \bar{\gamma}/\mu=0.7$. The queue transient response is then measured by ( $\bar{t}_u^i, \bar{t}_o^i$) as a function of $1/\mu(\omega_o,BW)$ at each given $K_o$. For the sake of convenience one may further denote $1/\mu$ by $\Delta$, hence both $t_u$ and $t_o$ will be measured as units of $\Delta$. Displayed in FIG. 44 are the four single-bell input power spectra, as defined by $1/\mu(\omega_o,BW)$, respectively, equal to $(0, 1.7 \text{ e}-3)$, $(1.7 \text{ e}-3, 3.5 \text{ e}-3)$, $(0, 7.0 \text{ e}-2)$ and $(1.4 \text{ e}-2, 3.5 \text{ e}-3)$ (denoted correspondingly by $e\chi 1, e\chi 2, e\chi 3$ and $e\chi 4$). The average power of each bell is identical and equal to $(\bar{\gamma}C)^2=0.5$.

FIG. 45a shows the solution of the mean sojourn time in overload period as a function of buffer threshold $K_o$. Note in FIG. 44 that the power spectrum of $e\chi 1$ and $e\chi 2$ contains more input power in the low frequency band than that of $e\chi 3$ and $3 \times 4$. In other words, the time variation of $e\chi 1$ and $e\chi 2$ traffic is much slower than that of $e\chi 3$ and $e\chi 4$ traffic. That is why $\bar{t}_o$ in $e\chi 1$ and $e\chi 2$ tends to be much longer than $\bar{t}_o$ in $e\chi 3$ and $e\chi 4$, except when $K_o$ is close to either end. At one end $K_o=200$, $\bar{t}_o$ represents the average blocking period, which should always be equal to the average service time and independent of $P(\omega)$ using the MMPP/M/1/K model. At the other end $K_o=1$, $\bar{t}_o$ represents the average busy period. The significant reduction of $\bar{t}_o$, as $K_o$ is close to either end, is due to the frequent switching between overload and underload periods. When the queue is in the middle range $K_o \in [25, 175]$, however, $\bar{t}_o$ becomes much less dependent on $K_o$. It means that most sojourn time in the overload period is actually spent on the last few levels where the buffer is nearly full. By contrast, the sojourn time spent in the buffer middle range is significantly less. Displayed in FIG. 45b are the corresponding solutions of the underload period. With less input power in low frequency band, as in $e\chi 3$ and $3 \times 4$, $\bar{t}_u$ tends to increase with $K_o$. This is generally expected. On the contrary, however, when more input power is in the low frequency band, as in $e\chi 1$ and $e\chi 2$, $\bar{t}_u$ tends to be independent of $K_o$ unless $K_o$ is close to either end. Similar to the behavior of $\bar{t}_o$ in FIG. 45a, most sojourn time in the underload period is actually spent at the first few levels where the buffer is nearly empty. At $K_o=1$, $\bar{t}_u$ represents the average empty period; it is directly related to the packet interarrival time and is much less dependent on $P(\omega)$. At $K_o=200$, $\bar{t}_u$ is the average nonblocking period. Again, the significant reduction of $\bar{t}_u$ for $e\chi 1$ and $e\chi 2$, where $K_o$ is close to either end, is due to the frequent switching between underload and overload periods.

Therefore, as more input power is moved into the low frequency band, the queueing process will be running back and forth between the two ends of the buffer and spend little time in the intermediate range. For comparison, shown in FIGS. 45a,b are the corresponding solutions of the M/M/1/K system. The variation coefficient of both periods, denoted by $C_{t_o}$ and $C_{t_u}$, is displayed in FIGS. 45c,d. As one can see, both $C_{t_o}$ and $C_{t_u}$ are relatively independent of $K_o$ in the middle range, but vastly change as $K_o$ is close to either end. The smaller the $C_{t_o}$ or $C_{t_u}$, the less the fluctuation of overload or underload period.

So far we have only calculated the overall sojourn time performance in a transient QBD process, namely, the moments of $t_u$ or $t_o$. In certain cases, one may desire to find the sojourn time performance at each individual state of a transient QBD process. Consider a general transient process, described by a generator matrix G with N phases and K levels. Suppose the process starts on a certain level k. The average sojourn time on level i, given the initial level k, will then be described by a submatrix $x_i \in R^{N \times N}$. Define a K-vector $x=[x_0,x_1, \ldots, x_{K-1}]$ with $x \in R^{N \times NK}$. Its solution will then be given by $xP=a$ with $P=G$ and $a=[0, \ldots, 0, -I, 0, \ldots, 0]$. Note that a is also a K-vector with all zero elements except the k-th element equal to a negative identity block because the process starts on level k. One can use such a transient solution vector x to construct both transient and equilibrium solutions of a two-level controlled queueing system, using the technique developed by Li in "Overload Control in a Finite Message Storage Buffer," IEEE Trans. Commu., Vol. 37, No. 12 Dec. 1989, pp. 1192–1202.

Spectral Performance

The spectral analysis is to evaluate the time autocorrelation of input, queue, output and loss processes which are involved in a finite buffer system, and also the cross-correlation among the four processes.

For example, consider a single-bell input power spectrum $P_i(\omega)$ with its normalized bandwidth and central frequency defined by $$\left( \frac{BW_1}{2\pi\bar{\gamma}}, \frac{\omega_1}{2\pi\bar{\gamma}} \right) = (10^{-3}, 10^{-3}).$$

The average input power is represented by the variation coefficient $C=0.3$. Such a CMPP input process is applied to a finite-buffer system with single exponential server. As in the link capacity allocation examples, the link utilization $\rho$ is designed to achieve the average loss rate $L=10^{-6}$ for a given buffer size K. FIG. 46 shows the input power spectrum and its associated output power spectra at $K=63, 255, 1023$. As one can see, by increasing the buffer size K, fewer loss frequency powers pas through the queueing system. More importantly, we get $P_i(\omega) \approx P_o(\omega)$ in a well-founded low frequency band. Such a low-frequency input-output linearity is further verified by the input-output coherence function in FIG. 47. It is important to understand the output statistics of a queueing system. Within a network, the "upstream" output low frequency characteristics obviously plays an important role in the "downstream" queueing performance. Also shown in FIG. 48 and FIG. 49 are the queue length and loss rate spectra, respectively. When K increases, the queue tends to be longer subject to the same average loss rate. Especially, the low frequency power of the queue becomes substantially lifted as the buffer size increases. Similarly, there will be more low frequency losses as K increases under the same average loss rate.

One can therefore use the spectral analysis to describe the time dynamics of the traffic flow within a network.

Solutions thereby determined by the method of the present invention are used to construct or modify a network node design with respect to link capacity, buffer size, congestion control and service scheduling.

Various other techniques and alternative ways can be used without departing from the spirit and scope of the invention as defined by the appended claims.

We claim:

1. A computer-implemented method for modeling and analyzing traffic flow in a network node, comprising the steps of:

receiving real traffic data;

computing a steady state distribution function and power spectral function from said real traffic data;

generating a stochastic model of a nonnegative rate random process using frequency domain techniques, wherein said stochastic model matches said computed steady state distribution function and power spectral function, wherein said step of generating uses linear programming techniques;

inputting said nonnegative rate random process in a queue of said network node after said step of generating;

performing queuing analysis on said queue to determine a design of the network node; and constructing said network node using said design.

2. The method of claim 1, wherein said step of generating comprises:

constructing a transition rate vector $\alpha$ of a circulant-modulated-rate process to statistically match said power spectral function; and constructing an input rate vector $\gamma$ of said circulant-modulated-rate process to statistically match said steady state distribution function.

3. The method of claim 2, wherein said step of constructing said transition rate vector $\alpha$ comprises the steps of:

a. performing parametric signal processing methods to express said power spectral function in analytical form defined by vectors $(\lambda, \psi)$;

b. adjusting and expanding said vectors $(\lambda, \psi)$ to new vectors $(\lambda_E, \psi_E)$, wherein $\psi_E$ is a non-negative real vector, wherein said new vectors define an adjusted power spectral function, and wherein said step of adjusting and expanding minimizes the difference between said power spectral function of $(\lambda, \psi)$ and said adjusted power spectral function of $(\lambda_E, \psi_E)$;

c. eliminating bell components of said adjusted power spectral function that are either in the high frequency band or that have negligible power, wherein said step of eliminating produces a new vector of key eigenvalues, $\lambda_{key} \subset \lambda_E$;

d. expanding said vector $\lambda_{key}$ to an expanded new vector $\lambda_c$ with $\lambda_c \supset \lambda_{key}$ adding noneffective eigenvalues, wherein the power of said noneffective eigenvalues are set at zero as defined in a power vector $\psi_c$, to obtain said transition rate vector $\alpha$ of a discrete Fourier transform problem $$a = \frac{1}{\sqrt{N}} \lambda_c F$$

subject to $\alpha_j \geq 0$ for $j > 0$ and $\alpha_0 = -\Sigma_{j=1}^{N-1} \alpha_j$;

e. transforming said problem of finding $\alpha$ into a linear programming problem under the condition of said vector $\lambda_{key}$;

f. obtaining a solution of $\alpha$, wherein said step of obtaining comprises one or more of the steps of:

adaptively changing indices of said key eigenvalues in $\lambda_c$; and gradually expanding the dimension of $\lambda_c$;

g. obtaining one or more solutions of $\alpha$, h. determining a solution of $\alpha$ having a reasonable dimension, wherein said solution of $\alpha$ produces a solution of $\lambda_c$;

i. determining said power vector $\psi_c$ using said solution of $\lambda_c$, wherein said power vector $\psi_c$ minimizes the difference between said power spectral function of $(\lambda, \psi)$ and a constructed power spectral function of $(\lambda_c, \psi_c)$.

4. The method of claim 3, wherein said steady state distribution function includes a steady state rate density function $f(\chi)$ and a steady state cumulative function $F(\chi)$, wherein said steady state rate density function and said steady state cumulative function are functions of a rate $\chi$:

wherein said step of constructing said input rate vector $\gamma$ comprises constructing said input rate vector $\gamma$ of said circulant-modulated-rate process to statistically match said steady state rate cumulative function.

5. The method of claim 4, wherein said step of constructing said input rate vector $\gamma$ comprises the steps of:

a. discretizing said steady state rate cumulative function $F(\chi)$ by partitioning a range of $\chi$ into a set of N equal-probability rates, denoted by a distribution vector $\gamma'$ in ascending order;

b. determining said input rate vector $\gamma$ by taking discrete Fourier transform, $\gamma = \sqrt{N} \beta F$, subject to $\gamma_j \geq 0$, $\forall j$ with $\beta_j = \sqrt{\psi_j} e^{\sqrt{-1} \theta_j}$, with respect to one or more selected phase vectors $\theta_c$ for said power vector $\psi_c$;

c. adjusting said one or more phase vectors $\theta_c$ to determine said input rate vector $\gamma$ that minimizes the difference between said steady state rate cumulative function $F(\chi)$ of said distribution vector $\gamma'$ and a distribution function $F_c(\chi)$ constructed from said input rate vector $\gamma$, wherein said step of adjusting said phase vectors $\theta_c$ to determine said input rate vector $\gamma$ is formulated into a minimization problem: $\min_{\theta_c} \|\gamma' - \gamma_p\|$ subject to $\gamma_p \geq 0$ where $\gamma_p$ is a sorted vector of said input rate vector $\gamma$ in ascending order;

d. obtaining one or more solutions of said phase vector $\theta_c$;

e. determining a solution from said one or more solutions of said phase vector $\theta_c$ which provides an acceptable matching error.

6. The method of claim 5, further comprising the steps of:

readjusting said power of said noneffective eigenvalues in said power vector $\psi_c$ to further reduce distribution matching error after said step of determining a solution from said one or more solutions of said phase vector, wherein said step of readjusting does not cause significant impact on power spectral matching;

assigning said sorted vector $\gamma_p$ equal to said distribution vector $\gamma'$ after said step of determining a solution from said one or more solutions of said phase vector, wherein said step of assigning alters said power vector $\psi_c$ in some degree without changing said phase vector $\theta_c$, wherein said step of assigning introduces extra power spectral matching errors; and partitioning a pair of said power vector and said phase vector $(\psi_c, \theta_c)$ into two parts, comprising a pair of a low frequency power vector and a low frequency phase vector $(\psi_l, \theta_l)$, and a pair of high frequency power vector and a high frequency phase vector $(\psi_h, \theta_h)$, such that said pair of low frequency power vector and said low frequency phase vector $(\psi_l, \theta_l)$ are used to match input rate distribution of said steady state cumulative rate function $F(\chi)$ in the low frequency band and said pair of said high frequency power vector and said high frequency phase vector $(\psi_h, \theta_h)$ are used to match input rate distribution of said steady state rate cumulative function $F(\chi)$ in the high frequency band.

7. The method of claim 1, wherein said step of performing comprises performing queueing analysis to determine optimal design of link capacity and buffer size of the network node.

8. The method of claim 1, wherein said step of computing includes filtering out unwanted statistical data.

9. The method of claim 1, wherein said step of performing queueing analysis uses a generalized Folding-algorithm.

10. The method of claim 9, wherein said step of performing queueing analysis using said generalized Folding-algorithm comprises the steps of:

performing transient and time-dependent analysis of said network queue.

11. The method of claim 10, wherein said step of performing queueing analysis generates a K-level block tri-diagonal matrix and a K-level vector; and wherein said step of performing queueing analysis using said generalized Folding-algorithm comprises the steps of:

performing a reduction phase which reduces said K-level block tri-diagonal matrix and said K-level vector to a one-level block matrix and a one-level vector by a sequence of permutation-reduction steps;

determining a boundary solution vector from said one-level block matrix and said one-level vector;

performing an expansion phase which is a reverse process of said reduction phase to obtain a sequence of expansion factors;

determining a final solution as a product of said boundary solution vector and said expansion factors.

12. The method of claim 1, wherein said step of performing queueing analysis uses a non-generalized Folding-algorithm.

13. The method of claim 1, wherein said step of performing queueing analysis uses computer simulation methods.

14. A computer-implemented method for modeling and analyzing traffic flow in a network of multiple interconnected nodes, comprising the steps of:

receiving real traffic data;

computing a steady state distribution function and power spectral function from said real traffic data;

generating a stochastic model of a nonnegative rate random process using frequency domain techniques, wherein said stochastic model matches said computed steady state distribution function and power spectral function, wherein said step of generating uses linear programming techniques;

inputting said nonnegative rate random process in a queue of each of said multiple interconnected nodes after said step of generating;

performing network analysis on one or more of said multiple interconnected nodes to determine information regarding design of said network of multiple interconnected nodes; and constructing said network of multiple interconnected nodes using said determined information.

15. The method of claim 14, wherein said step of performing comprises determining routing, call admission, and load balancing information about said network of multiple interconnected nodes.

16. A computer-implemented method for generating traffic in a network for network simulation and performance evaluation, comprising the steps of:

receiving real traffic data;

computing a steady state distribution function and power spectral function from said real traffic data;

generating a stochastic model of a nonnegative rate random process using frequency domain techniques, wherein said stochastic model matches said computed steady state distribution function and power spectral function, wherein said step of generating uses linear programming techniques, wherein said nonnegative rate random process comprise network traffic which may be input to a network for network simulation and performance evaluation; and inputting said nonnegative rate random process in said network after said step of generating.

17. A computer-implemented method for modeling and analyzing traffic flow in a network node, comprising the steps of:

receiving real traffic data;

computing a steady state distribution function and power spectral/correlation function from said real traffic data;

generating a stochastic model of a nonnegative rate random process using time domain techniques, wherein said stochastic model matches said computed steady state distribution function and power spectral/correlation function, wherein said step of generating uses linear programming techniques;

inputting said nonnegative rate random process in a queue of said network node after said step of generating;

performing queuing analysis on said queue to determine a design of the network node; and constructing said network node using said design.

18. The method of claim 17, wherein said step of generating comprises:

constructing a transition rate vector $\alpha$ of a circulant-modulated-rate process to statistically match said power spectral/correlation function; and constructing an input rate vector $\gamma$ of said circulant-modulated-rate process to statistically match said steady state distribution function.

19. The method of claim 18, wherein said step of constructing said transition rate vector $\alpha$ comprises the steps of:

a. performing parametric signal processing methods to express said power spectral/correlation function in analytical form defined by vectors $(\lambda, \psi)$;

b. adjusting and expanding said vectors $(\lambda, \psi)$ to new vectors $(\lambda_E, \psi_E)$, wherein $\psi_E$ is a non-negative real vector, wherein said new vectors define an adjusted power spectral/correlation function, and wherein said step of adjusting and expanding minimizes the difference between said power spectral/correlation function of $(\lambda, \psi)$ and said adjusted power spectral/correlation function of $(\lambda_E, \psi_E)$;

c. eliminating bell components of said adjusted power spectral/correlation function that are either in the high frequency band or that have negligible power, wherein said step of eliminating produces a new vector of key eigenvalues, $\lambda_{key} \subset \lambda_E$;

d. expanding said vector $\lambda_{key}$ to an expanded new vector $\lambda_C$ with $\lambda_C \supset \lambda_{key}$ by adding noneffective eigenvalues, wherein the power of said noneffective eigenvalues are set at zero as defined in a power vector $\psi_c$, to obtain said transition rate vector $\alpha$ of a discrete Fourier transform problem $$a = \frac{1}{\sqrt{N}} \lambda_C F$$

subject to $\alpha_j \geq 0$ for $j > 0$ and $\alpha_0 = -\Sigma_{j=1}^{N-1} \alpha_j$;

e. transforming said problem of finding $\alpha$ into a linear programming problem under the condition of said vector $\lambda_{key}$;

f. obtaining a solution of α, wherein said step of obtaining comprises one or more of the steps of:
   adaptively changing indices of said key eigenvalues in $\lambda_c$; and
   gradually expanding the dimension of $\lambda_c$;

g. obtaining one or more solutions of α;

h. determining a solution of α having a reasonable dimension, wherein said solution of α produces a solution of $\lambda_c$; and i. determining said power vector $\psi_c$ using said solution of $\lambda_c$, wherein said power vector $\psi_c$ minimizes the difference between said power spectral/correlation function of $(\lambda,\psi)$ and a constructed power spectral/correlation function of $(\lambda_c, \psi_c)$.

20. The method of claim 19, wherein said steady state distribution function includes a steady state rate density function $f(\chi)$ and a steady state rate cumulative function $F(\chi)$, wherein said steady rate density function and said steady state rate cumulative function are functions of a rate $\chi$;

wherein said step of constructing said input rate vector γ comprises constructing said input rate vector γ of said circulant-modulated-rate process to statistically match said steady state rate cumulative function.

21. The method of claim 20, wherein said step of constructing said input rate vector γ comprises the steps of:

a. discretizing said steady state rate cumulative function $F(\chi)$ by partitioning a range of χ into a set of N equal-probability rates, denoted by a distribution vector γ' in ascending order;

b. determining said input rate vector γ by taking discrete Fourier transform, $\gamma=\sqrt{N}\beta F$, subject to $\gamma_j \geq 0$, $\forall j$ with $\beta_j = \sqrt{\psi_j} e^{\sqrt{-1}\theta_j}$, with respect to one or more selected phase vectors $\theta_c$ for said power vector $\psi_c$;

c. adjusting said one or more phase vectors $\theta_c$ to determine said input rate vector γ that minimizes the difference between said steady state rate cumulative function $F(\chi)$ of said distribution vector γ' and a distribution function $F_c(\chi)$ constructed from said input rate vector γ, wherein said step of adjusting said phase vectors $\theta_c$ to determine said input rate vector γ is formulated into a minimization problem: $\min\theta_c\|\gamma'-\gamma_p\|$ subject to $\gamma_p \geq 0$ where $\gamma_p$ is a sorted vector of said input rate vector γ in ascending order;

d. obtaining one or more solutions of said phase vector $\theta_c$;

e. determining a solution from said one or more solutions of said phase vector $\theta_c$ which provides an acceptable matching error.

22. The method of claim 21, further comprising the steps of:

readjusting said power of said noneffective eigenvalues in said power vector $\psi_c$ to further reduce distribution matching error after said step of determining a solution from said one or more solutions of said phase vector, wherein said step of readjusting does not cause significant impact on power spectral/correlation matching;

assigning said sorted vector $\gamma_p$ equal to said distribution vector γ' after said step of determining a solution from said one or more solutions of said phase vector, wherein said step of assigning alters said power vector $\psi_c$ in some degree without changing said phase vector $\theta_c$, wherein said step of assigning introduces extra power spectral/correlation matching errors; and partitioning a pair of said power vector and said phase vector $(\psi_c,\theta_c)$ into two parts, comprising a pair of a low frequency power and a low frequency phase vector $(\psi_l,\theta_l)$, and a pair of high frequency power vector and a high frequency phase vector $(\psi_h,\theta_h)$, such that said pair of low frequency power vector and said low frequency phase vector $(\psi_l,\theta_l)$ are used to match input rate distribution of said steady state cumulative rate function $F(\chi)$ in the low frequency band and said pair of said high frequency power vector and said high frequency phase vector $(\psi_h,\theta_h)$ are used to match input rate distribution of said steady state rate cumulative function $F(\chi)$ in the high frequency band.

23. The method of claim 17, wherein said step of performing comprises performing queueing analysis to determine optimal design of link capacity and buffer size of the network node.

24. The method of claim 17, wherein said step of performing includes filtering out unwanted statistical data.

25. The method of claim 17, wherein said step of performing queueing analysis uses a generalized Folding-algorithm.

26. The method of claim 25, wherein said step of performing queueing analysis using said generalized Folding-algorithm comprises the steps of:

performing transient and time-dependent analysis of said network queue.

27. The method of claim 26, wherein said step of performing queueing analysis generates a K-level block tri-diagonal matrix and a K-level vector and wherein said step of performing queueing analysis using said generalized Folding-algorithm comprises the steps of:

performing a reduction phase which reduces said K-level block tri-diagonal matrix and said k-level vector to a one-level block matrix and a one-level vector by a sequence of permutation-reduction steps;

determining a boundary solution vector from said one-level block matrix and said one-level vector;

performing an expansion phase which is a reverse process of said reduction phase to obtain a sequence of expansion factors;

determining a final solution as a product of said boundary solution vector and said expansion factors.

28. The method of claim 17, wherein said step of performing queueing analysis uses a non-generalized Folding-algorithm.

29. The method of claim 17, wherein said step of performing queueing analysis uses computer simulation methods.

30. A computer-implemented method for modeling and analyzing traffic flow in a network of multiple interconnected nodes, comprising the steps of:

receiving real traffic data;

computing a steady state distribution function and power spectral/correlation function from said real traffic data;

generating a stochastic model of a nonnegative rate random process using time domain techniques, wherein said stochastic model matches said computed steady state distribution function and power spectral/correlation function, wherein said step of generating uses linear programming techniques;

inputting said nonnegative rate random process in a queue of each of said multiple interconnected nodes after said step of generating;

performing network analysis on one or more of said multiple interconnected nodes to determine information regarding design of said network of said multiple interconnected nodes; and constructing said network of multiple interconnected nodes using said determined information.

31. The method of claim 30, wherein said step of performing comprises determining routing, call admission, and load balancing information about said network of multiple interconnected nodes.

32. A computer-implemented method for generating traffic in a network for network simulation and performance evaluation, comprising the steps of:

receiving real traffic data;

computing a steady state distribution function and power spectral/correlation function from said real traffic data;

generating a stochastic model of a nonnegative rate random process using time domain techniques, wherein said stochastic model matches said computed steady state distribution function and power spectral/correlation function, wherein said step of generating uses linear programming techniques, wherein said nonnegative rate random process comprises network traffic which may be input to a network for network simulation and performance evaluation; and inputting said nonnegative rate random process in said network after said step of generating.

* * * * *

UNITED STATES PATENT AND TRADEMARK OFFICE
CERTIFICATE OF CORRECTION

PATENT NO. : 5,583,792

DATED : December 10, 1996

INVENTOR(S) : San-Qi Li et al.

It is certified that error appears in the above-indentified patent and that said Letters Patent is hereby corrected as shown below:

Claim 3, col. 51, line 45, please delete "adding noneffective," and substitute therefor -- by adding noneffective --.

Claim 4, col. 52, line 7, please delete "steady state cumulative" and substitute therefor -- steady state rate cumulative --.

Claim 4, col. 52, line 9, please delete "steady state cumulative" and substitute therefor -- steady state rate cumulative --.

Claim 6, col. 52, line 56, please delete "of high frequency" and substitute therefor -- of a high frequency --.

Claim 6, col. 52, line 58, please delete "pair of low frequency" and substitute therefor -- pair of said low frequency --.

UNITED STATES PATENT AND TRADEMARK OFFICE
CERTIFICATE OF CORRECTION

PATENT NO. : 5,583,792
DATED : December 10, 1996
INVENTOR(S) : San-Qi Li et al

It is certified that error appears in the above-indentified patent and that said Letters Patent is hereby corrected as shown below:

Claim 16, col. 54, line 5, please delete "process comprise network" and substitute therefor -- process comprises network --.

Claim 22, col. 56, line 2, please delete "and a pair of high frequency" and substitute therefor -- and a pair of a high frequency --.

Claim 22, col. 56, line 4, please delete "pair of low frequency" and substitute therefor -- pair of said low frequency --.

Claim 24, col. 56, lines 16 - 17, please delete "step of performing includes" and substitute therefor -- step of computing includes --.

Claim 27, col. 56, line 33, please delete "k-level" and substitute therefor -- K-level --.

Claim 30, col. 57, line 1, please delete "network of said multiple" and substitute therefor -- network of multiple --.

Signed and Sealed this

Fourth Day of March, 1997

Attest:

BRUCE LEHMAN

*Attesting Officer*  *Commissioner of Patents and Trademarks*